US010353911B2

(12) United States Patent
Reynolds et al.

(10) Patent No.: US 10,353,911 B2
(45) Date of Patent: Jul. 16, 2019

(54) COMPUTERIZED TOOLS TO DISCOVER, FORM, AND ANALYZE DATASET INTERRELATIONS AMONG A SYSTEM OF NETWORKED COLLABORATIVE DATASETS

(71) Applicants: Shad William Reynolds, Austin, TX (US); Bryon Kristen Jacob, Austin, TX (US); Jon Loyens, Austin, TX (US); David Lee Griffith, Austin, TX (US); Triet Minh Le, Austin, TX (US); Joseph Boutros, Austin, TX (US)

(72) Inventors: Shad William Reynolds, Austin, TX (US); Bryon Kristen Jacob, Austin, TX (US); Jon Loyens, Austin, TX (US); David Lee Griffith, Austin, TX (US); Triet Minh Le, Austin, TX (US); Joseph Boutros, Austin, TX (US)

(73) Assignee: data.world, Inc., Austin, TX (US)

( * ) Notice: Subject to any disclaimer, the term of this patent is extended or adjusted under 35 U.S.C. 154(b) by 175 days.

(21) Appl. No.: 15/454,923

(22) Filed: Mar. 9, 2017

(65) Prior Publication Data
US 2017/0371881 A1 Dec. 28, 2017

Related U.S. Application Data

(63) Continuation-in-part of application No. 15/186,514, filed on Jun. 19, 2016, now Pat. No. 10,102,258.

(51) Int. Cl.
*G06F 17/30* (2006.01)
*G06F 16/25* (2019.01)
(Continued)

(52) U.S. Cl.
CPC .............. *G06F 16/252* (2019.01); *G06F 9/54* (2013.01); *G06F 16/21* (2019.01); *G06F 16/248* (2019.01); *G06F 16/256* (2019.01); *G06F 16/258* (2019.01)

(58) Field of Classification Search
USPC ........................................................ 707/756
See application file for complete search history.

(56) References Cited

U.S. PATENT DOCUMENTS

| 6,144,962 | A | 11/2000 | Weinberg et al. |
| 6,317,752 | B1 | 11/2001 | Lee et al. |

(Continued)

FOREIGN PATENT DOCUMENTS

| WO | 2012054860 A1 | 4/2012 |
| WO | 2017190153 A1 | 11/2017 |

(Continued)

OTHER PUBLICATIONS

Bullock, Joshua, Non-Final Office Action dated Jul. 12, 2018 for U.S. Appl. No. 15/186,517.

(Continued)

*Primary Examiner* — Kim T Nguyen
(74) *Attorney, Agent, or Firm* — Kokka & Backus, PC

(57) ABSTRACT

Various embodiments relate generally to data science and data analysis, computer software and systems, and wired and wireless network communications to provide an interface between repositories of disparate datasets and computing machine-based entities that seek access to the datasets, and, more specifically, to a computing and data storage platform that facilitates consolidation of one or more datasets, whereby one or more computerized tools may be configured to discover, form, and analyze, for example, via one or more user interface applications, interrelations among a system of networked collaborative datasets In some examples, a (Continued)

method may include causing transformation of a set of data to an atomized format to form an atomized dataset, monitoring creation of a dataset, and presenting data representing a status of a portion of the creation of the dataset. The status may depict an atomized dataset linked to at least one other dataset.

20 Claims, 36 Drawing Sheets

(51) Int. Cl.
  *G06F 9/54* (2006.01)
  *G06F 16/21* (2019.01)
  *G06F 16/248* (2019.01)

(56) References Cited

U.S. PATENT DOCUMENTS

| | | | |
|---|---|---|---|
| 6,529,909 B1 | 3/2003 | Bowman-Amuah | |
| 6,768,986 B2 | 7/2004 | Cras et al. | |
| 6,961,728 B2 | 11/2005 | Wynblatt et al. | |
| 7,080,090 B2 | 7/2006 | Shah et al. | |
| 7,146,375 B2 | 12/2006 | Egilsson et al. | |
| 7,680,862 B2 | 3/2010 | Chong et al. | |
| 7,761,407 B1 | 7/2010 | Stern | |
| 7,836,063 B2 * | 11/2010 | Salazar | G06F 16/258 707/756 |
| 7,853,081 B2 | 12/2010 | Thint | |
| 7,856,416 B2 | 12/2010 | Hoffman et al. | |
| 7,877,350 B2 * | 1/2011 | Stanfill | G06F 8/51 707/609 |
| 7,953,695 B2 | 5/2011 | Roller et al. | |
| 7,987,179 B2 | 7/2011 | Ma et al. | |
| 8,037,108 B1 | 10/2011 | Chang | |
| 8,060,472 B2 | 11/2011 | Itai et al. | |
| 8,099,382 B2 | 1/2012 | Liu et al. | |
| 8,170,981 B1 | 5/2012 | Tewksbary | |
| 8,275,784 B2 | 9/2012 | Cao et al. | |
| 8,429,179 B1 | 4/2013 | Mirhaji | |
| 8,521,565 B2 | 8/2013 | Faulkner et al. | |
| 8,538,985 B2 | 9/2013 | Betawadkar-Norwood et al. | |
| 8,583,631 B1 | 11/2013 | Ganapathi et al. | |
| 8,616,443 B2 | 12/2013 | Butt et al. | |
| 8,719,252 B2 | 5/2014 | Miranker et al. | |
| 8,762,160 B2 | 6/2014 | Lulla | |
| 8,799,240 B2 | 8/2014 | Stowe et al. | |
| 8,831,070 B2 | 9/2014 | Huang et al. | |
| 8,843,502 B2 | 9/2014 | Elson et al. | |
| 8,892,513 B2 | 11/2014 | Forsythe | |
| 8,935,272 B2 | 1/2015 | Ganti et al. | |
| 8,943,313 B2 | 1/2015 | Glew et al. | |
| 8,965,915 B2 | 2/2015 | Ganti et al. | |
| 8,990,236 B2 | 3/2015 | Mizrahy et al. | |
| 8,996,559 B2 | 3/2015 | Ganti et al. | |
| 9,002,860 B1 | 4/2015 | Ghemawat | |
| 9,218,365 B2 | 12/2015 | Irani et al. | |
| 9,244,952 B2 | 1/2016 | Ganti et al. | |
| 9,396,283 B2 | 7/2016 | Miranker et al. | |
| 9,495,429 B2 | 11/2016 | Miranker | |
| 9,607,042 B2 | 3/2017 | Long | |
| 9,690,792 B2 | 6/2017 | Bartlett et al. | |
| 9,696,981 B2 | 7/2017 | Martin et al. | |
| 9,710,526 B2 | 7/2017 | Couris et al. | |
| 9,710,568 B2 | 7/2017 | Srinivasan et al. | |
| 9,720,958 B2 | 8/2017 | Bagehorn et al. | |
| 9,798,737 B2 | 10/2017 | Palmer | |
| 10,102,258 B2 | 10/2018 | Jacob et al. | |
| 10,176,234 B2 * | 1/2019 | Gould | G06F 16/2465 |
| 10,216,860 B2 | 2/2019 | Miranker et al. | |
| 2002/0143755 A1 | 10/2002 | Wynblatt et al. | |
| 2003/0120681 A1 | 6/2003 | Baclawski | |
| 2003/0208506 A1 | 11/2003 | Greenfield et al. | |
| 2004/0064456 A1 | 4/2004 | Fong et al. | |
| 2005/0010550 A1 | 1/2005 | Potter et al. | |
| 2005/0010566 A1 | 1/2005 | Cushing et al. | |
| 2005/0234957 A1 | 10/2005 | Olson et al. | |
| 2005/0246357 A1 | 11/2005 | Geary et al. | |
| 2005/0278139 A1 | 12/2005 | Glaenzer et al. | |
| 2006/0129605 A1 | 6/2006 | Doshi | |
| 2006/0168002 A1 | 7/2006 | Chesley | |
| 2006/0218024 A1 | 9/2006 | Lulla | |
| 2006/0235837 A1 | 10/2006 | Chong et al. | |
| 2007/0027904 A1 | 2/2007 | Chow et al. | |
| 2007/0179760 A1 | 8/2007 | Smith | |
| 2007/0203933 A1 | 8/2007 | Iversen et al. | |
| 2008/0046427 A1 | 2/2008 | Lee et al. | |
| 2008/0091634 A1 | 4/2008 | Seeman | |
| 2008/0162550 A1 | 7/2008 | Fey | |
| 2008/0162999 A1 | 7/2008 | Schlueter et al. | |
| 2008/0216060 A1 | 9/2008 | Vargas | |
| 2008/0240566 A1 | 10/2008 | Thint | |
| 2008/0256026 A1 | 10/2008 | Hays | |
| 2008/0294996 A1 * | 11/2008 | Hunt | G06Q 30/02 715/739 |
| 2008/0319829 A1 * | 12/2008 | Hunt | G06Q 30/02 705/7.29 |
| 2009/0006156 A1 * | 1/2009 | Hunt | G06Q 10/063 705/7.11 |
| 2009/0018996 A1 * | 1/2009 | Hunt | G06Q 30/02 |
| 2009/0106734 A1 * | 4/2009 | Riesen | G06N 7/005 717/104 |
| 2009/0132474 A1 | 5/2009 | Ma et al. | |
| 2009/0132503 A1 | 5/2009 | Sun et al. | |
| 2009/0138437 A1 | 5/2009 | Krishnamoorthy et al. | |
| 2009/0150313 A1 | 6/2009 | Heilper et al. | |
| 2009/0157630 A1 | 6/2009 | Yuan | |
| 2009/0182710 A1 | 7/2009 | Short et al. | |
| 2009/0234799 A1 | 9/2009 | Betawadkar-Norwood et al. | |
| 2009/0300054 A1 | 12/2009 | Fisher et al. | |
| 2010/0114885 A1 | 5/2010 | Bowers et al. | |
| 2010/0235384 A1 | 9/2010 | Itai et al. | |
| 2010/0241644 A1 | 9/2010 | Jackson et al. | |
| 2010/0250576 A1 | 9/2010 | Bowers et al. | |
| 2010/0250577 A1 | 9/2010 | Cao et al. | |
| 2011/0202560 A1 | 8/2011 | Bowers et al. | |
| 2012/0016895 A1 | 1/2012 | Butt et al. | |
| 2012/0036162 A1 | 2/2012 | Gimbel | |
| 2012/0102022 A1 | 4/2012 | Miranker et al. | |
| 2012/0154633 A1 | 6/2012 | Rodriguez | |
| 2012/0179644 A1 | 7/2012 | Miranker | |
| 2012/0254192 A1 * | 10/2012 | Gelbard | G06F 16/2237 707/745 |
| 2012/0278902 A1 | 11/2012 | Martin et al. | |
| 2012/0284301 A1 | 11/2012 | Mizrahy et al. | |
| 2012/0310674 A1 | 12/2012 | Faulkner et al. | |
| 2012/0330908 A1 | 12/2012 | Stowe et al. | |
| 2012/0330979 A1 | 12/2012 | Elson et al. | |
| 2013/0031208 A1 | 1/2013 | Linton et al. | |
| 2013/0031364 A1 | 1/2013 | Glew et al. | |
| 2013/0110775 A1 | 5/2013 | Forsythe | |
| 2013/0114645 A1 | 5/2013 | Huang et al. | |
| 2013/0138681 A1 | 5/2013 | Abrams et al. | |
| 2013/0156348 A1 | 6/2013 | Irani et al. | |
| 2014/0006448 A1 | 1/2014 | McCall | |
| 2014/0019426 A1 | 1/2014 | Palmer | |
| 2014/0198097 A1 | 7/2014 | Evans | |
| 2014/0214857 A1 | 7/2014 | Srinivasan et al. | |
| 2014/0279640 A1 | 9/2014 | Moreno et al. | |
| 2014/0279845 A1 | 9/2014 | Ganti et al. | |
| 2014/0280067 A1 | 9/2014 | Ganti et al. | |
| 2014/0280286 A1 | 9/2014 | Ganti et al. | |
| 2014/0280287 A1 | 9/2014 | Ganti et al. | |
| 2014/0337331 A1 | 11/2014 | Hassanzadeh et al. | |
| 2015/0081666 A1 | 3/2015 | Long | |
| 2015/0095391 A1 | 4/2015 | Gajjar et al. | |
| 2015/0142829 A1 | 5/2015 | Lee et al. | |
| 2015/0186653 A1 | 7/2015 | Gkoulalas-Divanis et al. | |
| 2015/0213109 A1 | 7/2015 | Kassko et al. | |
| 2015/0234884 A1 | 8/2015 | Henriksen | |
| 2015/0269223 A1 | 9/2015 | Miranker et al. | |
| 2016/0055184 A1 | 2/2016 | Fokoue-Nkoutche et al. | |
| 2016/0063017 A1 | 3/2016 | Bartlett et al. | |
| 2016/0092090 A1 | 3/2016 | Stojanovic et al. | |

(56) References Cited

U.S. PATENT DOCUMENTS

| | | |
|---|---|---|
| 2016/0092474 A1 | 3/2016 | Stojanovic et al. |
| 2016/0092475 A1 | 3/2016 | Stojanovic et al. |
| 2016/0117362 A1 | 4/2016 | Bagehorn et al. |
| 2016/0132572 A1 | 5/2016 | Chang et al. |
| 2016/0147837 A1 | 5/2016 | Nguyen et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0371355 A1 | 12/2016 | Massari et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0228405 A1 | 8/2017 | Ward et al. |
| 2017/0316070 A1 | 11/2017 | Krishnan et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2018/0032327 A1 | 2/2018 | Adami et al. |
| 2018/0210936 A1 | 7/2018 | Reynolds et al. |
| 2018/0262864 A1 | 9/2018 | Reynolds et al. |
| 2018/0314705 A1 | 11/2018 | Griffith et al. |
| 2019/0005104 A1 | 1/2019 | Prabhu et al. |

FOREIGN PATENT DOCUMENTS

| | | |
|---|---|---|
| WO | 2017222927 A1 | 12/2017 |
| WO | 2018156551 A1 | 8/2018 |
| WO | 2018164971 A1 | 9/2018 |

OTHER PUBLICATIONS

Jacob et al., "Collaborative Dataset Consolidation Via Distributed Computer Networks," U.S. Appl. No. 16/120,057, filed Aug. 31, 2018.

Young, Lee W., International Searching Authority, Notification of Transmittal of the International Search Report and the Written Opinion of the International Searching Authority, or the Declaration for International Patent Application No. PCT/US2018/020812, dated Aug. 8, 2018.

Bullock, Joshua, Final Office Action dated Oct. 30, 2018 for U.S. Appl. No. 15/186,517.

Ganti et al., U.S. Appl. No. 14/058,184, filed Oct. 18, 2013 and entitled, "Assisted Query Formation, Validation, and Result Previewing in a Database Having a Complex Schema."

Ganti et al., U.S. Appl. No. 14/058,189, filed Oct. 18, 2013 and entitled, "Assisted Query Formation, Validation, and Result Previewing in a Database Having a Complex Schema."

Ganti et al., U.S. Appl. No. 14/058,206, filed Oct. 18, 2013 and entitled, "Curated Answers Community Automatically Populated Through User Query Monitoring."

Ganti et al., U.S. Appl. No. 14/058,208, filed Oct. 18, 2013 and entitled, "Editable and Searchable Markup Pages Automatically Populated Through User Query Monitoring."

Ganti et al., U.S. Appl. No. 61/802,716, filed Mar. 17, 2013 and entitled, "Data Profile Driven Query Builder."

Ganti et al., U.S. Appl. No. 61/802,742, filed Mar. 18, 2013 and entitled, "Developing a Social Data Catalog by Crowd-Sourcing."

Ganti et al., U.S. Appl. No. 61/802,743, filed Mar. 18, 2013 and entitled, "Creating a Data Catalog by Mining Queries."

Ganti et al., U.S. Appl. No. 61/802,744, filed Mar. 18, 2013 and entitled, "Auto-Completion of Queries With Data Object Names and Data Profiles."

Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.

Griffith et al., "Localized Link Formation to Perform Implicitly Federated Queries Using Extended Computerized Query Language Syntax," U.S. Appl. No. 16/036,836, filed Jul. 16, 2018.

Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.

Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.

Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.

Haveliwala et al., "Evaluating Strategies for Similarity Search on the Web," Proceedings of the 11th international conference on World Wide Web, May 7-11, 2002, Honolulu, Hawaii, USA (ACM), p. 432-442.

Hoang, Hau Hai, Final Office Action dated Nov. 26, 2018 for U.S. Appl. No. 15/186,515.

Htay, Lin Lin M., Non-Final Office Action dated Sep. 14, 2018 for U.S. Appl. No. 15/186,516.

Hu, Xiaoqin, Non-Final Office Action for U.S. Appl. No. 15/454,969 dated Dec. 7, 2018.

Hu, Xiaoqin, Non-Final Office Action for U.S. Appl. No. 15/454,981 dated Dec. 12, 2018.

Pandit et al., "Using Ontology Design Patterns to Define SHACL Shapes," CEUR Workshop Proceedings, Proceedings of the 9th Workshop on Ontology Design and Patterns (WOP 2018), Monterey, USA, Oct. 9, 2018.

Raab, Christopher J., Notice of Allowance and Fee(s) Due and Notice of Allowability for U.S. Appl. No. 15/186,520, dated Jan. 2, 2019.

Young, Lee W., Invitation to Pay Additional Fees and, Where Applicable, Protest Fee, dated Jun. 14, 2018 for International Application No. PCT/US2018/020812.

Griffith et al., "Aggregation of Ancillary Data Associated With Source Data in a System of Networked Collaborative Datasets," U.S. Appl. No. 15/927,006, filed Mar. 20, 2018.

Griffith et al., "Data Ingestion to Generate Layered Dataset Interrelations to Form a System of Networked Collaborative Datasets," U.S. Appl. No. 15/926,999, filed Mar. 20, 2018.

Griffith et al., "Layered Data Generation and Data Remediation to Facilitate Formation of Interrelated Data in a System of Networked Collaborative Datasets," U.S. Appl. No. 15/927,004, filed Mar. 20, 2018.

Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.

Griffith et al., "Transmuting Data Associations Among Data Arrangements to Facilitate Data Operations in a System of Networked Collaborative Datasets," U.S. Appl. No. 15/943,629, filed Apr. 2, 2018.

Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.

Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.

Reynolds et al., "Computerized Tools to Discover, Form, and Analyze Dataset Interrelations Among a System of Networked Collaborative Datasets," International Patent Application No. PCT/US2018/020812 filed Mar. 3, 2018.

(56) References Cited

OTHER PUBLICATIONS

Reynolds et al., "Interactive Interfaces to Present Data Arrangement Overviews and Summarized Dataset Attributes for Collaborative Datasets," U.S. Appl. No. 15/454,969, filed Mar. 9, 2017.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Boutros et al., "Computerized Tools to Develop and Manage Data-Driven Projects Collaboratively Via a Networked Computing Platform and Collaborative Datasets," U.S. Appl. No. 15/985,702, filed May 22, 2018.
Boutros et al., "Computerized Tools to Facilitate Data Project Development Via Data Access Layering Logic in a Networked Computing Platform Including Collaborative Datasets," U.S. Appl. No. 15/985,704, filed May 22, 2018.
Boutros et al., "Dynamic Composite Data Dictionary to Facilitate Data Operations Via Computerized Tools Configured to Access Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Copenheaver, Blaine R., Notification of Transmittal of the International Search Report and the Written Opinion of the International Searching Authority, or the Declaration dated Jul. 5, 2017 for International Patent Application No. PCT/US2017/030474.
Hoang, Hau Hai, Non-Final Office Action dated May 3, 2018 for U.S. Appl. No. 15/186,515.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Krishnan et al., U.S. Appl. No. 15/583,966, filed May 1, 2017 and titled "Automatic Generation of Structured Data from Semi-Structured Data."
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
Nguyen, Kim T., Non-Final Office Action dated Jun. 14, 2018 for U.S. Appl. No. 15/186,514.
Parashar et al., U.S. Appl. No. 62/329,982, filed Apr. 29, 2016 and titled "Automatic Parsing of Semi-Structured Data and Identification of Missing Delimiters."
Raab, Christopher J., Non-Final Office Action dated Jun. 28, 2018 for U.S. Appl. No. 15/186,520.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Young, Lee W., Notification of Transmittal of the International Search Report and the Written Opinion of the International Searching Authority, or the Declaration dated May 29, 2018 for International Patent Application No. PCT/US2018/018906.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Angles, R., Gutierrez. C., "The Expressive Power of SPARQL," Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet [retrieved Mar. 7, 2019].
Beckett, D., Berners-Lee, T., "Turtle—Terse RDF Triple Language," W3C Team Submission, Jan. 14, 2008, Retrieved from the Internet [retrieved Mar. 7, 2019].
Beckett, D., Broekstra, J., "SPARQL Query Results XML Format," W3C Recommendation, Jan. 15, 2008, Retrieved from the Internet [retrieved Mar. 7, 2019].
Beckett, Dave, "RDF/XML Syntax Specification (Revised)," W3C Recommendation, Feb. 10, 2004, Retrieved from the Internet [retrieved Mar. 7, 2019].
Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].

(56) References Cited

OTHER PUBLICATIONS

Hoang, Hau Hai, Non-Final Office Action dated Apr. 16, 2019 for U.S. Appl. No. 15/186,515.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Sequeda, J., Tirmizi, S., Miranker, D., "SQL Databases are a Moving Target," Position Paper for W3C Workshop on RDF Access to Relational Databases, Cambridge, MA, USA, 2007.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Yen, Syling, Non-Final Office Action dated Feb. 8, 2019 for U.S. Appl. No. 15/186,519.
Young, Lee W., Notification of Transmittal of the International Search Report and the Written Opinion of the International Searching Authority, or the Declaration for International Application No. PCT/US2011/057334, dated Mar. 22, 2012.
Niinimaki et al., "An ETL Process for OLAP Using RDF/OWL Ontologies," Journal on Data Semantics XIII, LNCS 5530, Springer, pp. 97-119, Aug. 12, 2009.
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
RDB2RDF Working Group Charter, Sep. 2009, Retrieved from the Internet [retrieved Mar. 7, 2019].
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.

\* cited by examiner

FIG. 25

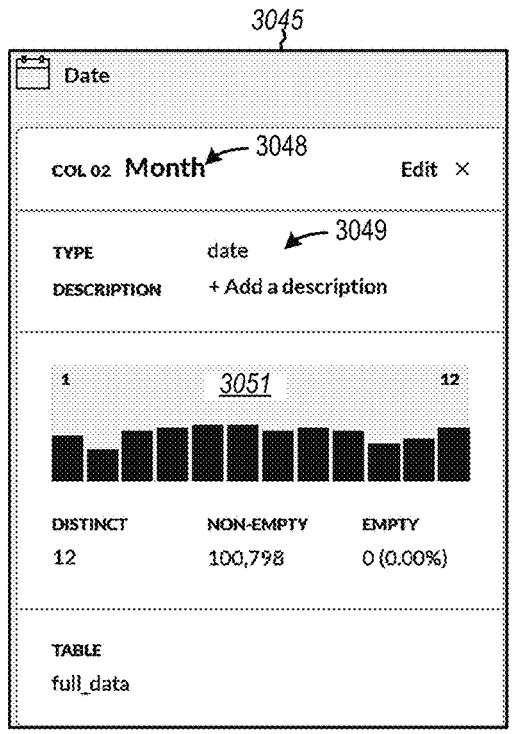
FIG. 30D
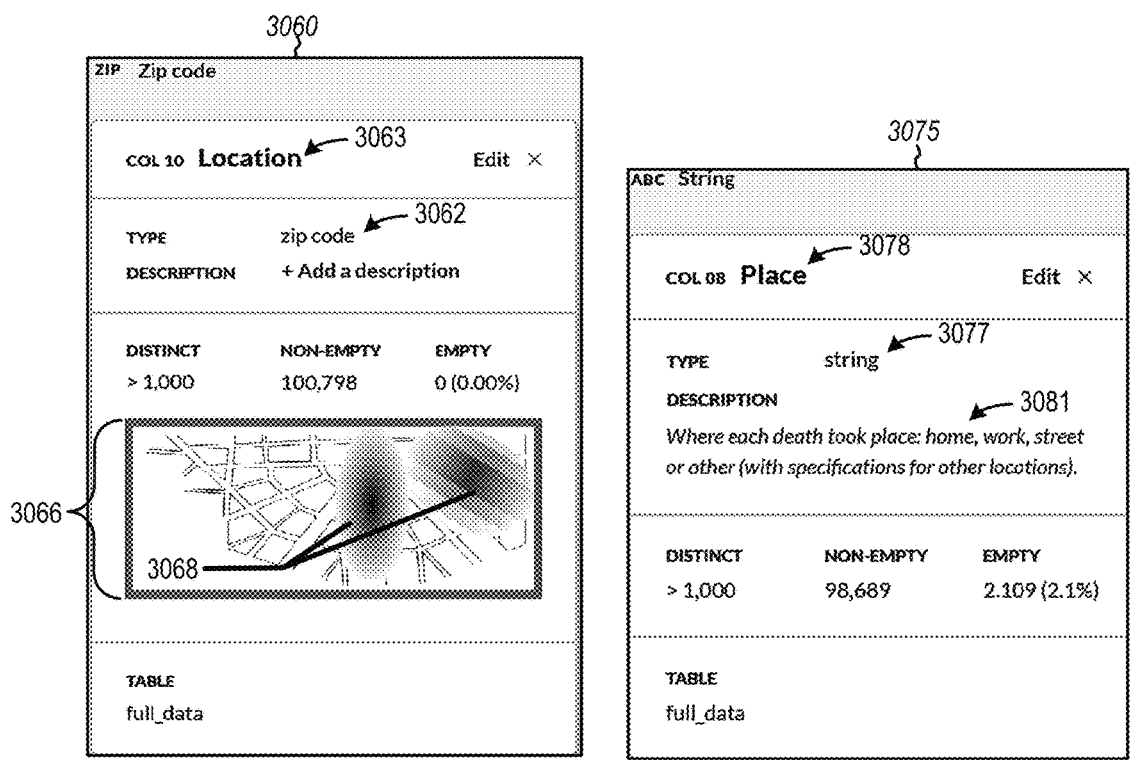
FIG. 30E
FIG. 30F

COMPUTERIZED TOOLS TO DISCOVER, FORM, AND ANALYZE DATASET INTERRELATIONS AMONG A SYSTEM OF NETWORKED COLLABORATIVE DATASETS

CROSS-REFERENCE TO APPLICATIONS

This application is a continuation-in-part application of U.S. patent application Ser. No. 15/186,514, filed on Jun. 19, 2016, and titled "COLLABORATIVE DATASET CONSOLIDATION VIA DISTRIBUTED COMPUTER NETWORKS," which is herein incorporated by reference in its entirety for all purposes.

FIELD

Various embodiments relate generally to data science and data analysis, computer software and systems, and wired and wireless network communications to provide an interface between repositories of disparate datasets and computing machine-based entities that seek access to the datasets, and, more specifically, to a computing and data storage platform that facilitates consolidation of one or more datasets, whereby one or more computerized tools may be configured to discover, form, and analyze, for example, via one or more user interface applications, interrelations among a system of networked collaborative datasets.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide the ability to store the increasing amounts of generated data. Consequently, traditional data storage and computing technologies have given rise to a phenomenon in which numerous disparate datasets have reached sizes and complexities that traditional data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Further, known data-distributing technologies are not well-suited to enable interoperability among datasets. Thus, many typical datasets are warehoused in conventional data stores, which are generally "data silos," whereby data in the associated data stores are often difficult to connect to other sources of data. These data silos have inherent barriers that insulate and isolate datasets. Further, conventional data systems and dataset accessing techniques are generally incompatible or inadequate to facilitate data interoperability among the data silos.

Conventional approaches to provide dataset generation and management, while functional, suffer a number of other drawbacks. For example, disparate approaches to gathering, forming, and analyzing datasets typically require different, ad hoc approaches. For example, data scientists and other consumers of data generally undertake significant effort during a variety of steps in which a dataset is downloaded and analyzed. In particular, data practitioners usually perform personalized queries and data analyses, manually, on the downloaded dataset to determine whether the downloaded dataset is of any use. Contextual information for understanding the downloaded dataset is usually absent, due to the ad hoc nature of dataset development, thereby complicating the process by which data practitioners assess the worthiness of a dataset. Further, differently-formatted repositories of data provide further challenges when assessing multiple dataset with multiple versions of ad hoc queries. Hence, these approaches are not typically well-suited to resolve sufficiently the drawbacks of traditional techniques of dataset generation and analysis. Moreover, traditional dataset generation and management are not well-suited to reducing efforts by data scientists and data practitioners in extracting, transforming, and loading data into data stores in a manner that serves their desired objectives.

Thus, what is needed is a solution for facilitating techniques to discover, form, and analyze datasets, without the limitations of conventional techniques.

BRIEF DESCRIPTION OF THE DRAWINGS

Various embodiments or examples ("examples") of the invention are disclosed in the following detailed description and the accompanying drawings:

FIG. 25 is an example of a user interface to present interactive user interface elements for another data preview of a dataset, according to some examples;

FIGS. 30A to 30F are diagrams depicting examples of interactive overlay windows, according to some examples;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
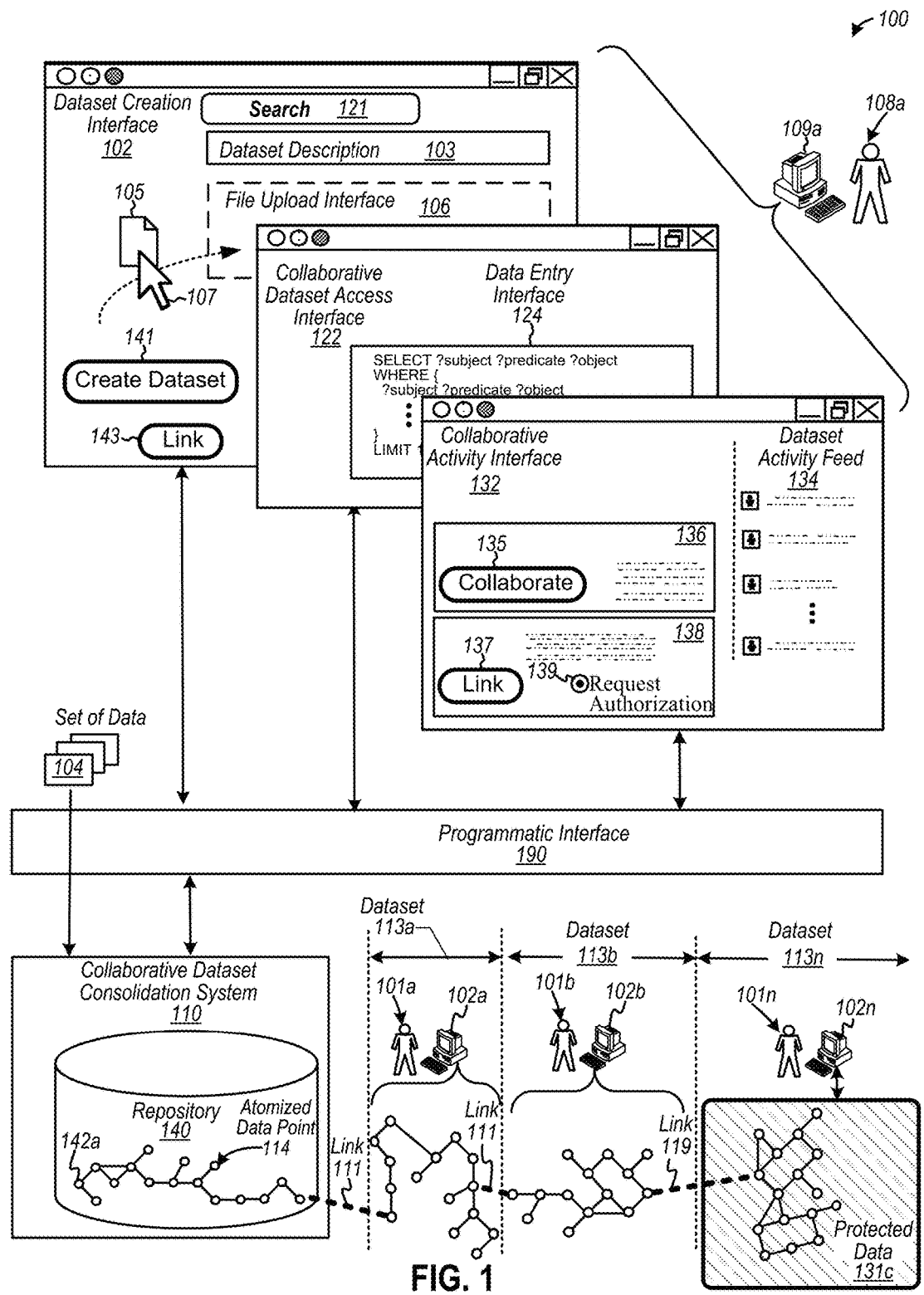
FIG. 1 is a diagram depicting computerized tools to discover, form, and/or analyze collaborative datasets, according to some embodiments.

FIG. 1 is a diagram depicting computerized tools to discover, form, and/or analyze collaborative datasets, according to some embodiments. Diagram 100 depicts an example of a subset of user interfaces to facilitate implementation of computerized tools at a computing device 109a (as well as computing devices 102a, 102b, and 102n) or a collaborative dataset consolidation system 110, or both. Computing device 109a may be configured to interoperate via a programmatic interface 190 with collaborative dataset consolidation system 110. Programmatic interface 190 may be configured to facilitate functionalities of user interfaces 102, 122, and 132, and further configured to facilitate data exchanges with collaborative dataset consolidation system 100, and among computing device 109a and computing devices 102a, 102b, and 102n.

A first example of a computerized tool is shown implemented as dataset creation interface 102, which may be configured to create a dataset, according to various embodiments. A collaborative dataset, according to some non-limiting examples, is a set of data that may be configured to facilitate data interoperability over disparate computing system platforms, architectures, and data storage devices, and collaboration between multiple users or agents. Further, a collaborative dataset may also be associated with data configured to establish one or more associations (e.g., metadata) among subsets of dataset attribute data for datasets, whereby attribute data, such as dataset attributes, may be used to determine correlations (e.g., data patterns, trends, rankings per unit time, etc.) among the collaborative datasets. Collaborative datasets, with or without associated dataset attribute data, may be used to facilitate easier collaborative dataset interoperability among sources of data, which may be formatted differently at origination, or may be disposed at disparate data stores (e.g., repositories at different geographical locations). In some examples, the term "collaborative dataset" may be used interchangeably with "consolidated dataset."

Dataset creation interface 102 may be used to create, or initiate creation of, a collaborative dataset via computing device 109a, which may be associated with a user 108a. As shown, dataset creation interface 102 includes a number of user interface elements to facilitate dataset creation, such as a search field 121, a dataset description field 103, a file upload interface 106, a create dataset activation input 141, and any other type of user interface element that may be used to create a dataset that, in turn, may be transformed into atomized datasets, such as atomized dataset 142a stored in repository 140. According to various examples, user interface elements may constitute a subset of one or more structures and/or functions of computerized tools described herein. "User interface element" may refer to, at least in some examples, a subset of executable instructions that interfaces or interacts with one or more applications or programs to initiate, facilitate, and/or perform execution of instructions in accordance with various implementations set forth herein. In some cases, at least one user interface element and at least one subset of executable instructions (e.g., in applications, modules, software components, etc.) may interoperate in combination to set forth one or more specialized functions or structures described herein.

To illustrate operation of dataset creation interface 102, consider that user 108a via computing device 109a initiates a computer-based action in which a user interface element representing a file 105 is selected and dragged via pointer element 107 (e.g., a pointer device, or any other interface selection tool, including a finger) into file upload interface 106. Computing device 109a may detect a data signal generated by the implementation of "create dataset" input 141, which may initiate creation of the dataset. As an example, consider that file 105 may include data formatted in a particular data arrangement, such as formatted as a CSV file, a TSV, an XLS file, or the like. In one example, a set of data 104 from file 105 may be uploaded, responsive to dragging icon of file 105 to upload interface 106, into collaborative dataset consolidation system 110, which, in turn, may generate an atomized dataset 142a. An atomized dataset 142a may include a data arrangement in which data is stored as an atomized data point 114 that, for example, may be an irreducible or simplest representation of data that may be linkable to other atomized data points, according to some embodiments. Note that in some examples, atomized dataset 142a may be linked (e.g., during the dataset creation process) via links 111 to other datasets, such as public datasets 113a and 113b, to form a collaborative dataset. Public datasets 113a and 113b may originate external to collaborative dataset consolidation system 110, such as at computing device 102a and computing device 102b, respectively, Users 101a and 101b are shown to be associated with computing devices 102a and 102b, respectively.

Logic in computing device 109a or collaborative dataset consolidation system 110, or both, may be configured to identify and/or derive attributes (e.g., dataset attributes) of the collaborative dataset, whereby logic may be implemented in hardware, software, or a combination thereof. In some cases, dataset attributes may be identified in the text description of the information entered into dataset description field 103. In some cases, the logic may implement natural language processing, or the like, to parse through strings of text to identify key words for implementation as dataset attributes. In other cases, collaborative dataset consolidation system 110 may identify or derive attributes based on annotations or other information related to set of data 104 (e.g., annotations based on column header data, etc.).

In some embodiments, collaborative dataset consolidation system 110 may provide access limited to the dataset attributes associated with the collaborative dataset rather than the data (e.g., atomized data points 114). Therefore, user 108a may enter search terms into the search field 121 to search for any relevant datasets that may augment or otherwise supplement a current collaborative dataset. To illustrate, consider that a search via field 121 identifies dataset 113n as having relevant data attributes. Note, however, that dataset 113n is shown as a "private dataset" that includes protected data 131c. Access to dataset 113n may be permitted via computing device 102n by administrative user 101n. Therefore, user 108a via computing device 109a may initiate a request to access protected data 131c through secured link 119 upon activation of user input ("link") 143, or by providing authorized credential data to retrieve data via secured link 119. Collaborative dataset 142a then may be supplemented by linking to protected data 131c to form a larger atomized dataset that includes data from datasets 142a, 113a, 113b, and 113n. According to various examples, a "private dataset" may have one or more levels of security. For example, a private dataset as well as metadata describing the private dataset may be entirely inaccessible by non-authorized users of collaborative dataset consolidation system 110. Thus, a private dataset may be shielded or invisible to searches performed via search field 121. In another example, a private dataset may be classified as "restricted," or inaccessible (e.g., without authorization), whereby its associated metadata describing dataset attributes of the private dataset may be accessible so the dataset may be discovered via search field 121 or identified by any other mechanism. A restricted dataset may be accessed via authorization credentials, according to some examples.

A second example of a computerized tool is shown implemented as collaborative dataset access interface 122, which may be configured to access or otherwise query a collaborative database through a data entry interface 124. According to some examples, data entry interface 124 may be configured to accept commands (e.g., queries) in high-level languages (e.g., high-level programming languages, including object-oriented languages, etc.), such as in Python™ and structured query language ("SQL"), among others. Further, commands in a high-level language may be converted into a graph-level access or query language, such as SPARQL or the like. Thus, a query may be initiated at computing device 109a via user interface 122 to query data associated with the atomized dataset (e.g., data from datasets 142a, 113a, 113b, and 113n). In some examples, data entry interface 124 may be configured to accept programming languages for facilitating other data operations, such as statistical and data analysis. Examples of programming languages to perform statistical and data analysis include "R," which is maintained and controlled by "The R Foundation for Statistical Computing" at www(dot)r-project(dot) org, as well as other like languages or packages, including applications that may be integrated with R (e.g., such as MATLAB™, Mathematica™ etc.).

A third example of a computerized tool is shown as collaborative activity interface 132, which may be configured to facilitate collaboration of dataset 142a among other datasets and among other users. In some examples, collaborative dataset consolidation system 110 may determine correlations among datasets and dataset interactions, whereby the correlations may be fed via a dataset activity feed 134 to disseminate dataset-related information via computing device 109a to user 108a, as well as via other computing devices 102a, 102b, and 102n to other users 101a, 101b, and 101n. Examples of notifications presented in dataset activity feed 134 may include information describing dataset interactions relating to an event in which a particular dataset (e.g., a relevant dataset of interest) has been queried, modified, shared, accessed, created, etc., or an event in which another user commented on a dataset or received a comment for a dataset, etc. For example, a user, such as user 101b, may post comments and notes electronically to a user account of user 108a, as a contributor (e.g., "Hi user 108a. This is user 101b—I noticed that a value is missing in column XX." Would you like me to correct this as a contributor?). User 101*b* may activate a user input (not shown) to generate a "like" data signal or a "bookmarked" data signal in association with user's 108*a* dataset 142*a*. The "like" data signals may cause a notification to be generated for presentation in dataset activity feed 134 (e.g., "User 101*b* *likes* your dataset 142*a*"). Similarly, "bookmarked" data signals may cause another notification to be generated for presentation in dataset activity feed 134 (e.g., "User 101*b* *has bookmarked* and saved a link to your dataset 142*a*").

Dataset activity feed 134 may present information describing trending dataset and/or user information, whereby a particular subset of datasets (or dataset users) may be of predominant interest among a community during a period of time. Users of predominant interest may be indicated by relatively high rankings, relatively high numbers of comments, a number of "likes," etc. As shown, dataset collaboration may be initiated in a collaboration request portion 136 of interface 132, whereby activation of user input ("collaborate") 135 may facilitate sharing of datasets or commentary among datasets. For example, user input 135 may be activated to "add a contributor," who may be invited to assist or collaborate in data collection and analysis. User 108*a* may grant certain levels of access or permissions (e.g., "view only" permission, "view and edit" permission, etc.) In the event a certain dataset is protected, then user 108*a* may request access upon activation of input ("link") 137 in dataset access request portion 138. User interface element 139, when selected, may generate a request to seek authorization to access the particular dataset. Thus, a community of users 108*a*, 101*a*, 101*b*, and 101*n*, as well as any other participating user, may discover and share dataset-related information in real-time (or substantially in real-time) in association with collaborative datasets. According to various embodiments, one or more structural and/or functional elements described in FIG. 1, as well as below, may be implemented in hardware or software, or both.

In view of the foregoing, the structures and/or functionalities depicted in FIG. 1 illustrate computerized tools configured to discover, form, and analyze, for example, via one or more user interface applications, collaborative datasets and interrelations among a system of networked collaborative datasets, according to some embodiments. User interfaces, and user interface elements therein, may be configured to create collaborative datasets by, for example, causing datasets to link automatically to other datasets. For example, collaborative datasets may be formed by "suggesting" similar or related compatible datasets upon ingesting a dataset and building a model of its metadata or schema. In various examples, creation of a dataset may including forming links among atomized datasets, whereby at least some links can be formed via graph data (e.g., at levels at which graph data arrangements are stored in, for example, graph databases). According to some embodiments, graph data arrangements may facilitate connecting and relating increasing amounts of data relative to other data storage technologies that may be relatively inflexible in adapting to increased amounts of data (e.g., increases in relatively large amounts of data). Also, user interfaces and user interface elements may be configured to provide varying levels of access to one or more datasets. For example, a user interface as a computerized tool may be configured to supplement a collaborative dataset by linking, for example, to protected data 131*c* to form a larger atomized dataset including data from datasets 142*a*, 113*a*, 113*b*, and 113*n*.

Further, the structures and/or functionalities depicted in FIG. 1 illustrate computerized tools configured to establish and evaluate whether a particular dataset may be useful or satisfactory in, for example, forming a collaborative dataset that may be used to form data models. The data models may be used to analyze datasets to prove theories set forth by data scientists, statisticians, data practitioners, and the like. In one example, dataset creation interface 102 may be configured to initiate creation of a dataset during which "insight" information may be generated. During dataset creation, a set of data or a dataset may be optionally normalized by, for example, forming a hashed representation of the contents of a file (i.e., a reduced or compressed representation of the data file), whereby a hash value may be used for content addressing.

"Insight information" may refer, in some examples, to information that may automatically convey (e.g., visually in text and/or graphics) dataset attributes of a created dataset, including derived dataset attributes, during or after (e.g., shortly thereafter) the creation of the dataset. In some examples, a user need not further manipulate the data by applying, for example, statistical algorithms against the created dataset to view insight information. Insight information presented in a user interface (e.g., responsive to dataset creation) may describe various aspects of a dataset, in summary form, such as, but not limited to, annotations (e.g., of columns, cells, or any portion of data), data classifications (e.g., a geographical location, such as a zip code, etc.), datatypes (e.g., string, numeric, categorical, Boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, etc. According to some embodiments, initiation of the dataset creation process invoked at user input 141 may also perform statistical data analysis during or upon the creation of the dataset. For example, logic disposed in collaborative dataset consolidation system 110 or at a client computing device, or both, may be configured to determine statistical characteristics as dataset attributes of a linked collaborative dataset. For instance, the logic can be configured to calculate a mean of the dataset distribution, a minimum value, maximum value, a value of standard deviation, a value of skewness, a value of kurtosis, etc., among any type of statistic or characteristic. As such, a user, when determining whether to use a dataset, need not download a dataset to perform ad hoc data analysis (e.g., creating and running a Python script against downloaded data to perform a statistical analysis, or the like) to identify characteristics of a distribution of data as well as visualization of the distribution.

Additionally, the structures and/or functionalities depicted in FIG. 1 illustrate computerized tools configured to identify interactions among a set of any number of datasets that may include user datasets, a group of other user datasets, a group of non-user datasets (e.g., datasets external to collaborative dataset consolidation system 110), and the like. Correlations among datasets and dataset interactions may be calculated and summarized for presentation via, for example, dataset activity feed 134 to provide a user 108*a* with dataset-related information, such as whether a particular dataset of has been queried, modified, shared, accessed, created, etc., or an event in which another user commented on a dataset or received a comment for a dataset. Therefore, data practitioners may gain additional insights into whether a particular dataset may be relevant based on electronic social interactions among datasets and users. For example, a dataset may be associated with a rating (e.g., a number between 1 to 10, as aggregated among numeric rankings voted upon by other users), whereby the rating may be indicative of the "applicability" or "quality" of the dataset. Other examples may include data representations via dataset activity feed 134 that conveys a number of queries associated with a dataset, a number of dataset versions, identities of users (or associated user identifiers) who have analyzed a dataset, a number of user comments related to a dataset, the types of comments, etc.). Thus, at least some implementations described herein may provide for "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." Collaboration among users and formation of collaborative datasets therefore may expedite dataset analysis and hypothesis testing based on up-to-date information provided by dataset activity feed 134, whereby a user may more readily determine applicability of a dataset to modeling data and/or proving a theory.

Figure 2:
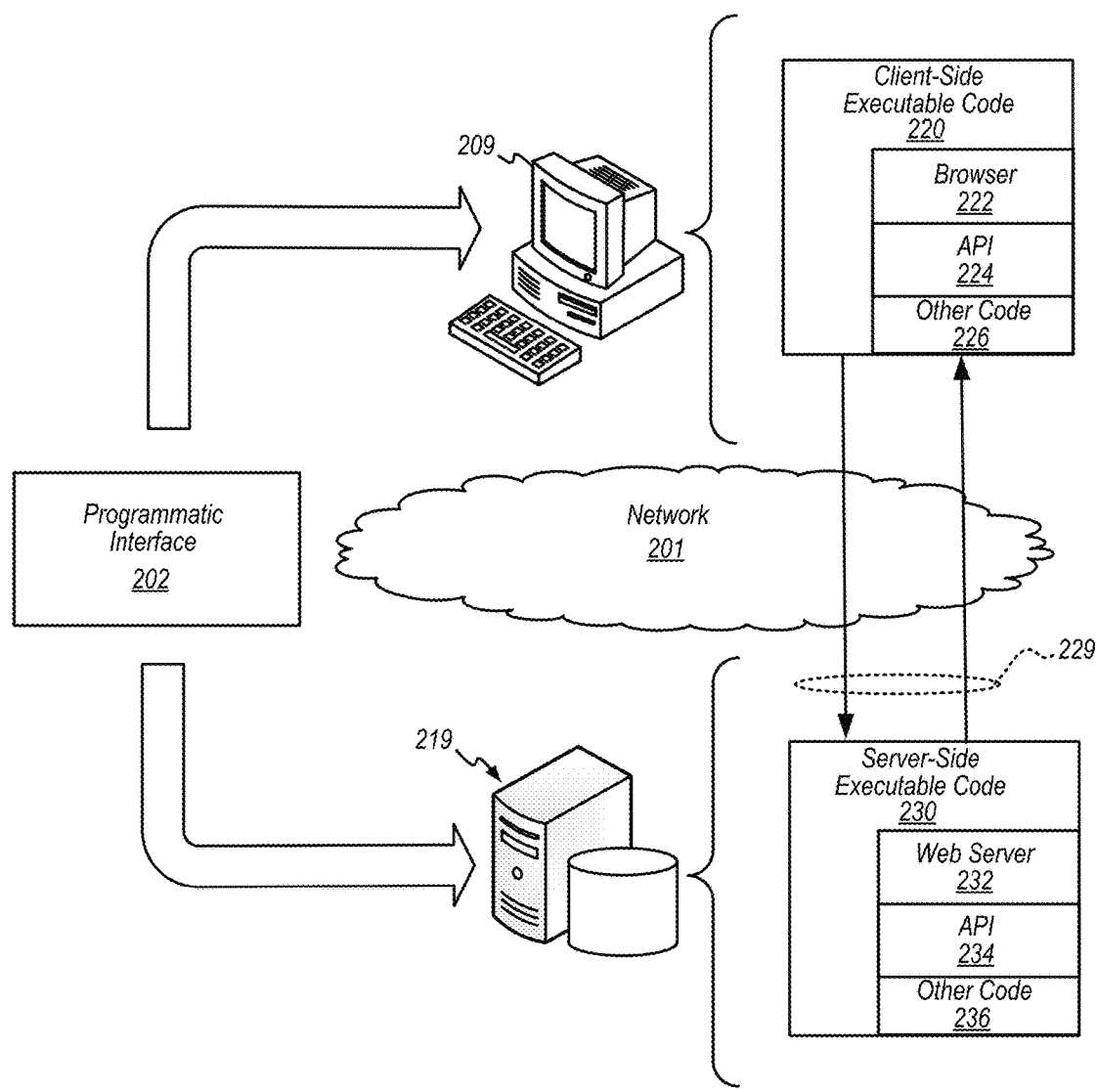
FIG. 2 is a diagram depicting an example of programmatic interface, according to some examples.

FIG. 2 is a diagram depicting an example of programmatic interface, according to some examples. Diagram 200 depicts an example of a programmatic interface 202 that may be configured to facilitate data exchange and execution of instructions among any number of applications disposed in either one or more client computing devices 209 or one or more server computing devices 219, or any combination thereof. Programmatic interface 202 may include one or more subsets of executable code and, optionally, one or more processors for performing any number of functions by executing the executable code. Programmatic interface 202 may be configured to facilitate data communications and execution over any number of processors and data stores (e.g., hardware), and may provide for execution of instructions at either computing device 209 or computing device 219, or over both devices 209 and 219 via network 201. Thus, programmatic interface 202 may facilitate performance of any of one or more functions described herein at either client computing device 209 or server computing device 219, as well as facilitating collaborative computing via data 229 exchanges over network 201 between client computing device 209 and server computing device 219.

Further to diagram 200, client-side executable code 220 may be implemented in association with computing device 209, and may include, for example, a browser application 222, one or more APIs 224, and any other programmatic code 226 for performing functions described herein. Also shown in diagram 200, server-side executable code 230 may include, for example, a web server application 232, one or more APIs 234, and any other programmatic code 236 for performing functions described herein. To illustrate a subset of operations of programmatic interface 202, consider that data (e.g., raw data in sets of data) may be transmitted over network 201 (e.g., from server computing device 219 or any other source of data) to computing device 209 at which dataset creation (or any other function described herein, such as insight generation) may be initiated and performed by executing client-side executable code 220. As another example, consider that execution of client-side executable code 220 may cause data to be transferred to server computing device 219 from client computing device 209 or any other source of data. Server-side executable code 230 may be executed to create, for example, datasets and insight information, and to provide access to the created datasets and insight information via data exchanges 229 to client computing device 209. Note that these examples are not limiting and that any function (or constituent portion thereof) may be performed at any subset of executable instructions disposed at one or more of computing devices 209 and 219.

According to some examples, programmatic interface 202 may facilitate data communication and interaction, including instruction execution, among one or more similar or different computer hardware platforms, one or more similar or different operating systems, one or more similar or different programming languages and levels thereof (e.g., from high-level to low-level programming languages), one or more similar or different processes, procedures, and objects, one or more similar or different protocols, and the like. According to some examples, programmatic interface 202 (or a portion thereof) may be implemented as an application programming interface, or "API," or as any number of APIs.

Figure 3:
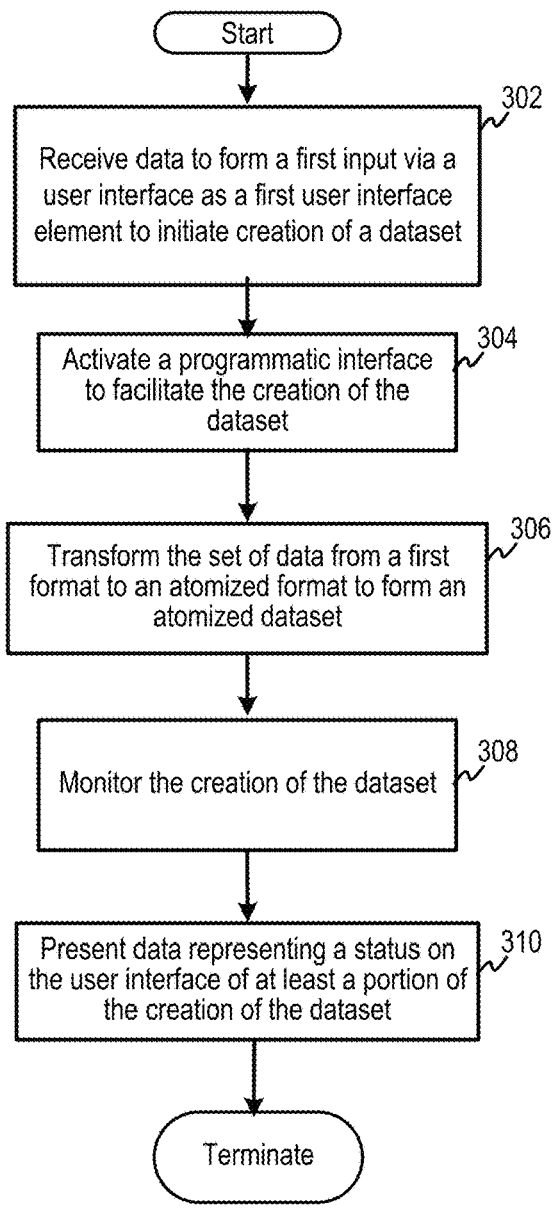
FIG. 3 is a diagram depicting a flow diagram as an example of collaborative dataset creation, according to some embodiments.

FIG. 3 is a diagram depicting a flow diagram as an example of collaborative dataset creation, according to some embodiments. Flow 300 may be an example of initiating creation of the dataset, such as a collaborative dataset, based on a set of data. In some examples, flow 300 may be implemented in association with a user interface. At 302, data to form an input as a user interface element may be received via a user interface. For example, a processor executing instruction data at a client computing device (or any other type of computing device, including a server computing device) may receive data to form a user interface element, which may constitute a user input that may be presented in a user interface as, for example, a "create dataset" user input. In one or more cases, activation of the "create dataset" user input can initiate creation of an atomized dataset based on a set of data, which may include, for example, raw data in data file (e.g., a tabular data file, such as a XLS file, etc.). According to some examples, receiving data to form "create dataset" user input may be subsequent to receiving data to form another input (as another user interface element). In some examples, this other user input that may be presented in a user interface as, for example, a "upload" user input that is configured perform an upload of the set of data from a data source (e.g., external, third-party data source, which may or may not be public). In at least one case, activation of the "upload" user input may initiate transmission of an upload instruction to a server computing system (e.g., implemented as a collaborative dataset consolidation system) to import the set of data prior to the data creation process.

At 304, a programmatic interface may be activated to facilitate the creation of the dataset responsive to receiving the first input. The programmatic interface may be implemented as either hardware or software, or a combination thereof. The programmatic interface also may be disposed at a client computing device or a server computing device, which may be associated with a collaborative dataset consolidation system, or may distributed over any number of computing devices whether networked together or otherwise. In some examples, the programmatic interface may be distributed as subsets of executable code (e.g., as scripts, etc.) to implement APIs in any number of computing devices. In some embodiments, programmatic interface may be optional and may be omitted.

At 306, a set of data may be transformed from a first format to an atomized format to form an atomized dataset. The atomized dataset may be stored in a graph data structure, according to some examples. In various examples, the transformation into an atomized dataset may be performed at a client computing device, a server computing device, or a combination of multiple computing devices. According to various embodiments, the transformation of formats from one to another format may be performed at any process or computing device. For example, the transformation (or portion thereof) may be performed at either a client computing device or a server computing device, or both (e.g., distributed computing).

At 308, the creation of the dataset may be monitored by, for example, a processor. In various examples, the creation of a dataset may pass through one or more phases. In one phase, for example, the data may be cleaned (e.g., data entry exceptions, such as defective data, may be detected and corrected). In another phase, insight information describing the dataset and its attributes may be generated. And in yet another phase, the dataset may be transformed and linked to other atomized datasets to form a collaborative dataset. One or more of these phases may be visually depicted using user interface elements (e.g., a progress bar or the like) upon commencement of the dataset creation process. Additional user interface elements, such as a "link" user input 137 of FIG. 1, may be presented on a user interface to facilitate linking of atomized datasets (e.g., responsive to input insight information, dataset activity feed information, etc.). At 310, data representing a status of at least a portion of the creation of the dataset may be presented on the user interface. The status may depict that the atomized dataset is linked to at least one other dataset.

In one embodiment, the monitoring of dataset creation at 308 may include identifying data to form an insight user interface element. The user interface element may be configured to specify a status of an insight phase for a dataset creation process. During the insight phase, data representing insights of the set of data may be formed, whereby insight information may specify at least one dataset attribute, such as annotations, datatypes, inferred dataset attributes, etc. Further, the monitoring of dataset creation at 308 may include identifying data to form a linking user interface element to specify the status of a linking phase of the dataset creation process. During the linking phase, data representing formation of a link among the atomized dataset and other datasets, which includes at least one other atomized dataset, may be presented to a user interface. Accordingly, at 310, an insight user interface element and a linking user interface element may be presented at the user interface. Note that any of 302, 304, 306, 308, and 310 may be performed at any process or computing device, and may be performed at either a client computing device or a server computing device, or both (e.g., distributed computing).

In another embodiment, a number of notifications may be implemented as a subset of user interface elements that constitute a dataset activity feed. A notification may specify type of dataset interaction that may be characterized for a particular dataset or user. Examples of dataset interactions may include data specifying one or more of the following: a new dataset is created, a dataset is queried, a dataset is linked to another dataset, a comment relating to a dataset is associated thereto, a dataset is relevant to another dataset, and other like characterized dataset interactions. The characterization of a dataset interaction may be performed during monitoring of the dataset creation process at 308. A characterized dataset interaction may be presented as a status of the dataset at 310 as a notification in an activity feed. Moreover, a user input interface element associated with a characterized dataset interaction may be configured to initiate access to a dataset for which the dataset interaction is characterized (e.g., the characterized dataset interaction may be a modified dataset). Therefore, a user, such as a data practitioner, may interact with one or more user interface elements based on the characterized datasets interactions, which provide information that may be useful to determine whether to use, or to link to, that dataset to form a collaborative dataset. For example, data practitioner interested in gun violence statistics may be interested in learning about, via a dataset activity feed, updates or queries relating to certain law enforcement databases.

According to some examples, characterized datasets interactions may specify relevant dataset data or relevant collaborator data (i.e., relative to a particular user's dataset or user characteristics). Relevant dataset data may specify a subset of datasets having dataset attributes calculated to be relevant to a particular atomized dataset, whereas relevant collaborator data may specify a subset of user accounts having user account attributes calculated to be relevant to a user account associated with the atomized dataset. According to some additional examples, characterized datasets interactions may specify trending dataset data or trending collaborator data (i.e., relative to a community of datasets or users). Trending dataset data may specify a subset of datasets having dataset attributes calculated to include greater dataset attribute values relative to a superset of datasets. For example, trending dataset data, such as a total number of queries per unit time, may specify, for example, a list of "top ten" datasets relating to a particular topic or discipline (e.g., "top ten" datasets based on locations and cases of Zika virus infections).

Trending collaborator data may specify a subset of user accounts having user account attributes calculated to include greater user account attributes values relative to a superset of user accounts. For example, trending collaborator data, such as users that have datasets with a greatest number of comments per unit time, may specify, for example, a list of "top ten" collaborators relating to the particular topic or discipline. In some examples, "trend" related information may describe changes (e.g., statistical changes) in, or general movement of, data or information about datasets over time to predict or estimate patterns of dataset interactions and usage. In some cases, trend-related information may include ranking data (e.g., rankings of dataset attributes or user attributes) over unit time.

Figure 4:
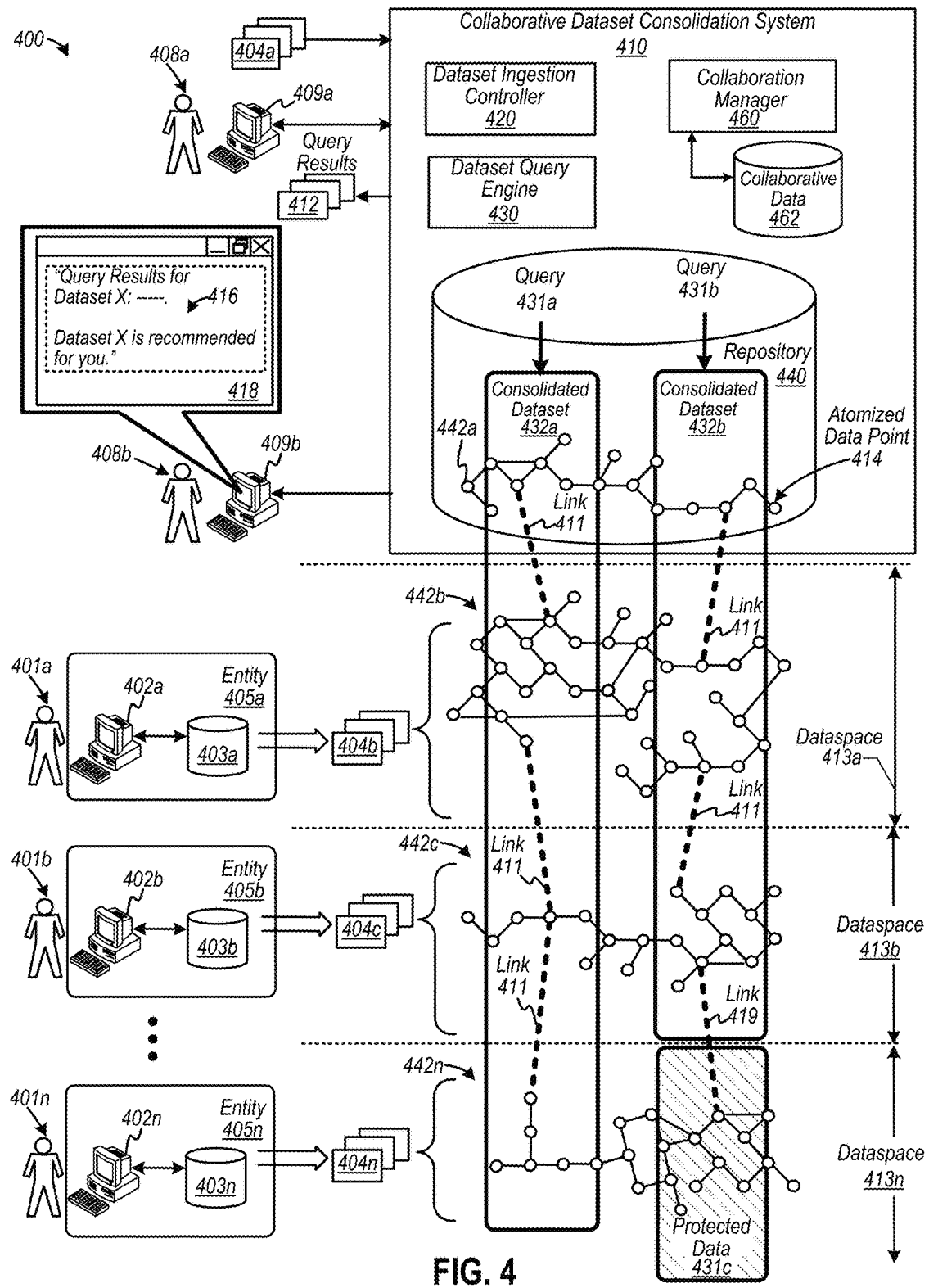
FIG. 4 is a diagram depicting a collaborative dataset consolidation system, according to some embodiments.

FIG. 4 is a diagram depicting a collaborative dataset consolidation system, according to some embodiments. Diagram 400 depicts an example of collaborative dataset consolidation system 410 that may be configured to consolidate one or more datasets to form collaborative datasets. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets, whereby attribute data may be used to determine correlations (e.g., data patterns, trends, etc.) among the collaborative datasets. Collaborative dataset consolidation system 410 may present the correlations via computing devices 409a and 409b to disseminate dataset-related information to one or more users 408a and 408b. Thus, a community of users 408, as well as any other participating user, may discover and share dataset-related information of interest in association with collaborative datasets. Collaborative datasets, with or without associated dataset attribute data, may be used to facilitate easier collaborative dataset interoperability among sources of data that may be differently formatted at origination or may be disposed at disparate data stores (e.g., repositories at different geographical locations). According to various embodiments, one or more structural and/or functional elements described in FIG. 4, as well as below, may be implemented in hardware or software, or both.

Collaborative dataset consolidation system 410 is depicted as including a dataset ingestion controller 420, a dataset query engine 430, a collaboration manager 460, a collaborative data repository 462, and a data repository 440, according to the example shown. Dataset ingestion controller 420 may be configured to receive data representing a dataset 404a having, for example, a particular data format (e.g., CSV, XML, JSON, XLS, MySQL, binary, etc.), and may be further configured to convert dataset 404a into a collaborative data format for storage in a portion of data arrangement 442a in repository 440. According to some embodiments, a collaborative data format may be configured to, but need not be required to, format data in converted dataset 404a as an atomized dataset. An atomized dataset may include a data arrangement in which data is stored as an atomized data point 414 that, for example, may be an irreducible or simplest representation of data that may be linkable to other atomized data points, according to some embodiments. Atomized data point 414 may be implemented as a triple or any other data relationship that expresses or implements, for example, a smallest irreducible representation for a binary relationship between two data units. As atomized data points may be linked to each other, data arrangement 442a may be represented as a graph, whereby the converted dataset 404a (i.e., atomized dataset 404a) forms a portion of the graph. Atomized data point 414, in some cases, may be expressed in a statement in which one object or entity relates (or links) to another object or entity, whereby the objects and the relationship (e.g., the link) each may be individually addressable. In some cases, an atomized dataset facilitates merging of data irrespective of whether, for example, schemas or applications differ.

Further, dataset ingestion controller 420 may be configured to identify other datasets that may be relevant to dataset 404a. In one implementation, dataset ingestion controller 420 may be configured to identify associations, links, references (e.g., annotations, etc.), pointers, etc. that may indicate, for example, similar subject matter between dataset 404a and a subset of other datasets (e.g., within or without repository 440). In some examples, dataset ingestion controller 420 may be configured to correlate dataset attributes of an atomized dataset with other atomized datasets or non-atomized datasets. Further, dataset ingestion controller 420 also may be configured to correlate dataset attributes of any public data (or atomized dataset) to any other public data (or other atomized datasets), whereby public data and datasets may be accessible (e.g., without credentials). In some examples, dataset ingestion controller 420 may be configured to correlate dataset attributes of private data (or private atomized dataset) to other data (or other atomized datasets), whereby the data in private data and atomized datasets may be accessible, for example, with authorized credentials. Dataset ingestion controller 420 or other any other component of collaborative dataset consolidation system 410 may be configured to format or convert a non-atomized dataset (or any other differently-formatted dataset) into a format similar to that of converted dataset 404a). Therefore, dataset ingestion controller 420 may determine or otherwise use associations to identify datasets with which to consolidate to form, for example, collaborative datasets 432a and collaborative datasets 432b. Thus, dataset ingestion controller 420 may be configured to identify correlated dataset attributes for "discovery purposes." That is, correlated dataset attributes (or other representations thereof, such as annotations) may be made "searchable," whereby any user or participant may search for an attribute and receive search results indicating relevant public or private (i.e., protected) datasets. Note that while dataset ingestion controller 420 may make correlated dataset attributes from private datasets accessible, authorization may be required to access or perform any operation on the private datasets correlated by dataset ingestion controller 420.

As shown in diagram 400, dataset ingestion controller 420 may be configured to extend a dataset (i.e., the converted dataset 404a stored in data arrangement 442a) to include, reference, combine, or consolidate with other datasets within data arrangement 442a or external thereto. Specifically, dataset ingestion controller 420 may extend an atomized dataset 404a to form a larger or enriched dataset, by associating or linking (e.g., via links 411) to other datasets, such as external entity datasets 404b, 404c, and 404n, form one or more collaborative datasets. Note that external entity datasets 404b, 404c, and 404n may be converted (or convertible) to form external datasets atomized datasets 442b, 442c, and 442n, respectively. The term "external dataset," at least in this case, can refer to a dataset generated externally to system 410 and may or may not be formatted as an atomized dataset.

As shown, different entities 405a, 405b, and 405n may each include a computing device 402 (e.g., representative of one or more servers and/or data processors) and one or more data storage devices 403 (e.g., representative of one or more database and/or data store technologies). Examples of entities 405a, 405b, and 405n include individuals, such as data scientists and statisticians, corporations, universities, governments, etc. A user 401a, 401b, and 401n (and associated user account identifiers) may interact with entities 405a, 405b, and 405n, respectively. Each of entities 405a, 405b, and 405n may be configured to perform one or more of the following: generating datasets, searching data and/or data attributes of datasets, discovering datasets, linking to datasets (e.g., public and/or private datasets), modifying datasets, querying datasets, analyzing datasets, hosting datasets, and the like, whereby one or more entity datasets 404b, 404c, and 404n may be formatted in different data formats. In some cases, these formats may be incompatible for implementation with data stored in repository 440. As shown, differently-formatted datasets 404b, 404c, and 404n may be converted into atomized datasets, each of which is depicted in diagram 400 as being disposed in a dataspace. Namely, atomized datasets 442b, 442c, and 442n are depicted as residing in dataspaces 413a, 413b, and 413n, respectively. In some examples, atomized datasets 442b, 442c, and 442n may be represented as graphs.

According to some embodiments, atomized datasets 442b, 442c, and 442n may be imported into collaborative dataset consolidation system 410 for storage in one or more repositories 440. In this case, dataset ingestion controller 420 may be configured to receive entity datasets 404b, 404c, and 404n for conversion into atomized datasets, as depicted in corresponding dataspaces 413a, 413b, and 413n. Collaborative data consolidation system 410 may store atomized datasets 442b, 442c, and 442n in repository 440 (i.e., internal to system 410) or may provide the atomized datasets for storage in respective entities 405a, 405b, and 405n (i.e., without or external to system 410). Alternatively, any of entities 405a, 405b, and 405n may be configured to convert entity datasets 404b, 404c, and 404n and store corresponding atomized datasets 442b, 442c, and 442n in one or more data storage devices 403a, 403b, and 430c. In this case, atomized datasets 442b, 442c, and 442n may be hosted for access by dataset ingestion controller 420 for linking via links 411 to extend datasets with data arrangement 442a.

Thus, collaborative dataset consolidation system 410 is configured to consolidate datasets from a variety of different sources and in a variety of different data formats to form collaborative datasets 432a and 432b. As shown, collaborative dataset 432a extends a portion of dataset in data arrangement 442a to include portions of atomized datasets 442b, 442c, and 442n via links 411, whereas collaborative dataset 432b extends another portion of a dataset in data arrangement 442a to include other portions of atomized datasets 442b and 442c via links 411. Note that entity dataset 404n includes a secured set of protected data 431c that may require a level of authorization or authentication to access. Without authorization, link 419 cannot be implemented to access protected data 431c. For example, user 401n may be a system administrator that may program computing device 402n to require authorization to gain access to protected data 431c. In some cases, dataset ingestion controller 420 may or may not provide an indication that link 419 exists based on whether, for example, user 408a has authorization to form a collaborative dataset 432b to include protected data 431c. In some examples, user 401n may permit access to dataset attributes associated with protected data 431c, whereby the dataset attributes may be accessed by collaborative dataset consolidation system 410 to enable other users to search for and discover relevant dataset attributes for protected data 431c. Thereafter, an interested user 401a, 401b, or 408a may request access to the protected data 431c. Access may be granted for a limited time, for a limited purpose, for pecuniary or charitable reasons, or any other purpose or with any other limitation.

Dataset query engine 430 may be configured to generate one or more queries, responsive to receiving data representing one or more queries via computing device 409a from user 408a. Dataset query engine 430 is configured to apply query data to one or more collaborative datasets, such as collaborative dataset 432a and collaborative dataset 432b, to access the data therein to generate query response data 412, which may be presented via computing device 409a to user 408a. According to some examples, dataset query engine 430 may be configured to identify one or more collaborative datasets subject to a query to either facilitate an optimized query or determine authorization to access one or more of the datasets, or both. As to the latter, dataset query engine 430 may be configured to determine whether one of users 408a and 408b is authorized to include protected data 431c in a query of collaborative dataset 432b, whereby the determination may be made at the time (or substantially at the time) dataset query engine 430 identifies one or more datasets subject to a query.

Collaboration manager 460 may be configured to assign or identify one or more attributes associated with a dataset, such as a collaborative dataset, and may be further configured to store dataset attributes as collaborative data in repository 462. Examples of dataset attributes include, but are not limited to, data representing a user account identifier, a user identity (and associated user attributes, such as a user first name, a user last name, a user residential address, a physical or physiological characteristics of a user, etc.), one or more other datasets linked to a particular dataset, one or more other user account identifiers that may be associated with the one or more datasets, data-related activities associated with a dataset (e.g., identity of a user account identifier associated with creating, searching, discovering, analyzing, discussing, collaborating with, modifying, querying, etc. a particular dataset), and other similar attributes. Another example of a dataset attribute is a "usage" or type of usage associated with a dataset. For instance, a virus-related dataset (e.g., Zika dataset) may have an attribute describing usage to understand victim characteristics (i.e., to determine a level of susceptibility), an attribute describing usage to identify a vaccine, an attribute describing usage to determine an evolutionary history or origination of the Zika, SARS, MERS, HIV, or other viruses, etc. Further, collaboration manager 460 may be configured to monitor updates to dataset attributes to disseminate the updates to a community of networked users or participants. Therefore, users 408a and 408b, as well as any other user or authorized participant, may receive communications (e.g., via user interface) to discover new or recently-modified dataset-related information in real-time (or near real-time).

In view of the foregoing, the structures and/or functionalities depicted in FIG. 4 illustrate a dataset consolidated system that may be configured to consolidate datasets originating in different data formats with different data technologies, whereby the datasets (e.g., as collaborative datasets) may originate external to the system. Collaborative dataset consolidation system 410, therefore, may be configured to extend a dataset beyond its initial quantity and quality (e.g., types of data, etc.) of data to include data from other datasets (e.g., atomized datasets) linked to the dataset to form a collaborative dataset. Note that while a collaborative dataset may be configured to persist in repository 440 as a contiguous dataset, collaborative dataset consolidation system 410 is configured to store at least one of atomized datasets 442a, 442b, 442c, and 442n (e.g., one or more of atomized datasets 442a, 442b, 442c, and 442n may be stored internally or externally) as well data representing links 411. Hence, at a given point in time (e.g., during a query), the data associated one of atomized datasets 442a, 442b, 442c, and 442n may be loaded into an atomic data store against which the query can be performed. Therefore, collaborative dataset consolidation system 410 need not be required to generate massive graphs based on numerous datasets, but rather, collaborative dataset consolidation system 410 may create a graph based on a collaborative dataset in one operational state (of a number of operational states), and can be partitioned in another operational state (but can be linked via links 411 to form the graph). In some cases, different graph portions may persist separately and may be linked together when loaded into a data store to provide resources for a query. Further, collaborative dataset consolidation system 410 may be configured to extend a dataset beyond its initial quantity and quality of data based on using atomized datasets that include atomized data points (e.g., as an addressable data unit or fact), which facilitates linking, joining, or merging the data from disparate data formats or data technologies (e.g., different schemas or applications for which a dataset is formatted). Atomized datasets facilitate data interoperability over disparate computing system platforms, architectures, and data storage devices, according to various embodiments.

According to some embodiments, collaborative dataset consolidation system 410 may be configured to provide a granular level of security with which an access to each dataset is determined on a dataset-by-dataset basis (e.g., per-user access or per-user account identifier to establish per-dataset authorization). Therefore, a user may be required to have per-dataset authorization to access a group of datasets less than a total number of datasets (including a single dataset). In some examples, dataset query engine 430 may be configured to assert access-level (e.g., query-level)

authorization or authentication. Note that authorization or credentials may be embedded in or otherwise associated with, for example, addresses referencing individual entities (e.g., via an IRI, or the like). As such, non-users (e.g., participants) without account identifiers (or users without authentication) may access or apply a query (e.g., limited to a query, for example) to repository 440 without receiving authorization to access system 410 generally. Dataset query engine 430 may implement such a query if, for example, the query includes, or is otherwise associated with, authorization data.

Collaboration manager 460 may be configured as, or to implement, a collaborative data layer and associated logic to implement collaborative datasets for facilitating collaboration among consumers of datasets. For example, collaboration manager 460 may be configured to establish one or more associations (e.g., as metadata) among dataset attribute data (for a dataset) and/or other attribute data (for other datasets (e.g., within or without system 410)). As such, collaboration manager 460 can determine a correlation between data of one dataset to a subset of other datasets. In some cases, collaboration manager 460 may identify and promote a newly-discovered correlation to users associated with a subset of other databases. Or, collaboration manager 460 may disseminate information about activities (e.g., name of a user performing a query, types of data operations performed on a dataset, modifications to a dataset, etc.) for a particular dataset. To illustrate, consider that user 408a is situated in South America and is accessing a recently-generated dataset (e.g., to analyze, query, etc.), the recently-generated dataset including data about the Zika virus over different age ranges and genders over various population ranges. Further, consider that user 408b is situated in North America and also has generated or curated datasets directed to the Zika virus. Collaborative dataset consolidation system 410 may be configured to determine a correlation between the datasets of users 408a and 408b (i.e., subsets of data may be classified or annotated as Zika-related). System 410 also may optionally determine whether user 408b has interacted with the newly-generated dataset about the Zika virus (whether the user, for example, viewed, accessed, downloaded data from, analyzed, queried, searched, added data to, etc. the dataset). Regardless, collaboration manager 460 may generate a notification to present in a user interface 418 of computing device 409b. As shown, user 408b is informed in an "activity feed" portion 416 of user interface 418 that "Dataset X" has been queried and is recommended to user 408b (e.g., based on the correlated scientific and research interests related to the Zika virus). User 408b, in turn, may modify Dataset X to form Dataset XX, thereby enabling a community of researchers to expeditiously access datasets (e.g., previously-unknown or newly-formed datasets) as they are generated to facilitate scientific collaborations, such as developing a vaccine for the Zika virus. Note that users 401a, 401b, and 401n may also receive similar notifications or information, at least some of which present one or more opportunities to collaborate and use, modify, and share datasets in a "viral" fashion. Therefore, collaboration manager 460 and/or other portions of collaborative dataset consolidation system 410 may provide collaborative data and logic layers to implement a "social network" for datasets.

Figure 5A:
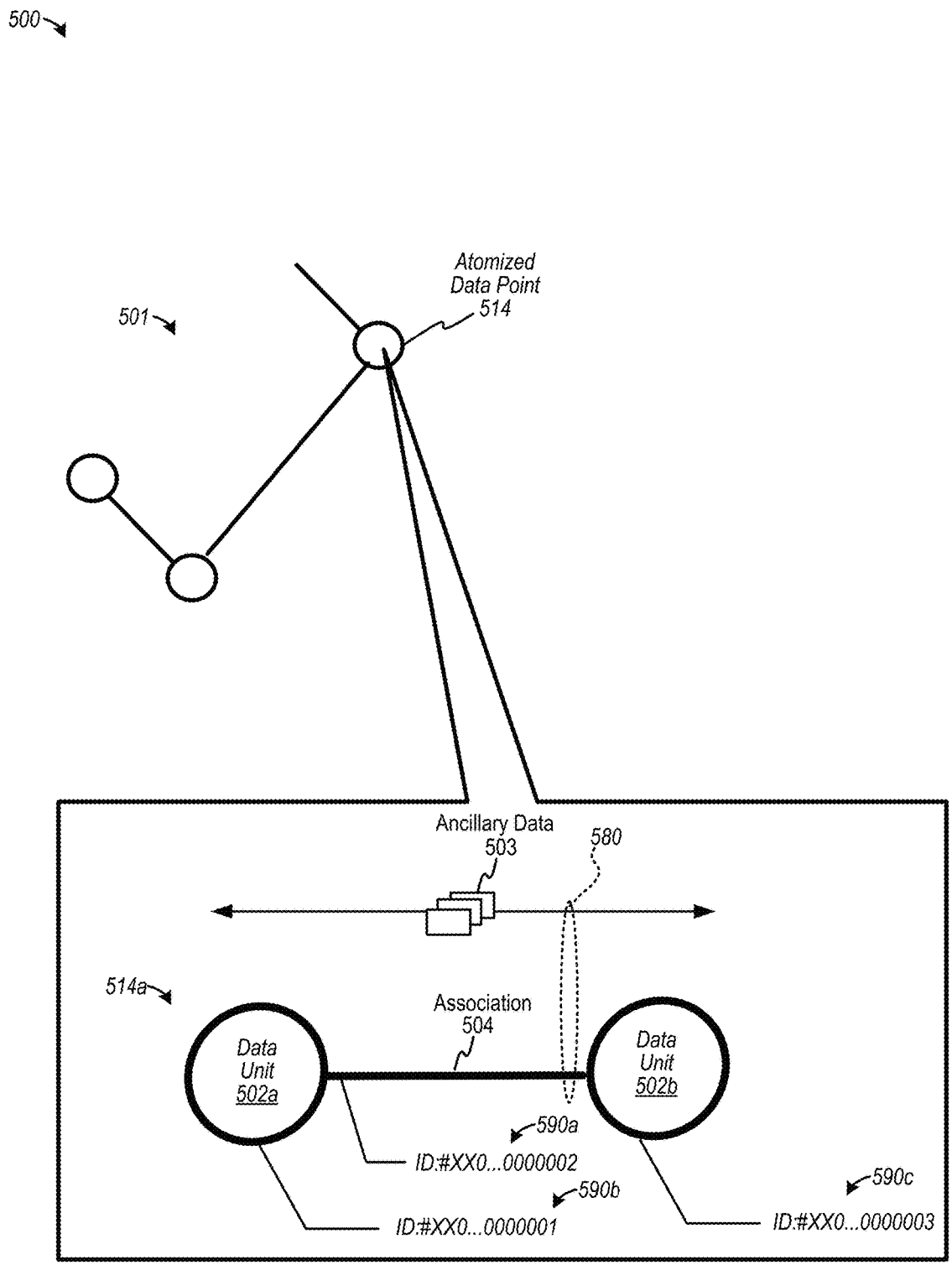
FIG. 5A is a diagram depicting an example of an atomized data point, according to some embodiments.

FIG. 5A is a diagram depicting an example of an atomized data point, according to some embodiments. Diagram 500 depicts a portion 501 of an atomized dataset that includes an atomized data point 514. In some examples, the atomized dataset is formed by converting a data format into a format associated with the atomized dataset. In some cases, portion 501 of the atomized dataset can describe a portion of a graph that includes one or more subsets of linked data. Further to diagram 500, one example of atomized data point 514 is shown as a data representation 514a, which may be represented by data representing two data units 502a and 502b (e.g., objects) that may be associated via data representing an association 504 with each other. One or more elements of data representation 514a may be configured to be individually and uniquely identifiable (e.g., addressable), either locally or globally in a namespace of any size. For example, elements of data representation 514a may be identified by identifier data 590a, 590b, and 590c.

In some embodiments, atomized data point 514a may be associated with ancillary data 503 to implement one or more ancillary data functions. For example, consider that association 504 spans over a boundary between an internal dataset, which may include data unit 502a, and an external dataset (e.g., external to a collaboration dataset consolidation), which may include data unit 502b. Ancillary data 503 may interrelate via relationship 580 with one or more elements of atomized data point 514a such that when data operations regarding atomized data point 514a are implemented, ancillary data 503 may be contemporaneously (or substantially contemporaneously) accessed to influence or control a data operation. In one example, a data operation may be a query and ancillary data 503 may include data representing authorization (e.g., credential data) to access atomized data point 514a at a query-level data operation (e.g., at a query proxy during a query). Thus, atomized data point 514a can be accessed if credential data related to ancillary data 503 is valid (otherwise, a request to access atomized data point 514a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 590a, 590b, and 590c. Ancillary data 503 may be disposed in other data portion of atomized data point 514a, or may be linked (e.g., via a pointer) to a data vault that may contain data representing access permissions or credentials.

Atomized data point 514a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 514a may be expressed in accordance with Turtle (e.g., Terse RDF Triple Language), RDF/XML, N-Triples, N3, or other like RDF-related formats. As such, data unit 502a, association 504, and data unit 502b may be referred to as a "subject," "predicate," and "object," respectively, in a "triple" data point. In some examples, one or more of identifier data 590a, 590b, and 590c may be implemented as, for example, a Uniform Resource Identifier ("URI"), the specification of which is maintained by the Internet Engineering Task Force ("IETF"). According to some examples, credential information (e.g., ancillary data 503) may be embedded in a link or a URI (or in a URL) or an Internationalized Resource Identifier ("IRI") for purposes of authorizing data access and other data processes. Therefore, an atomized data point 514 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (and portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like.

Figure 5B:
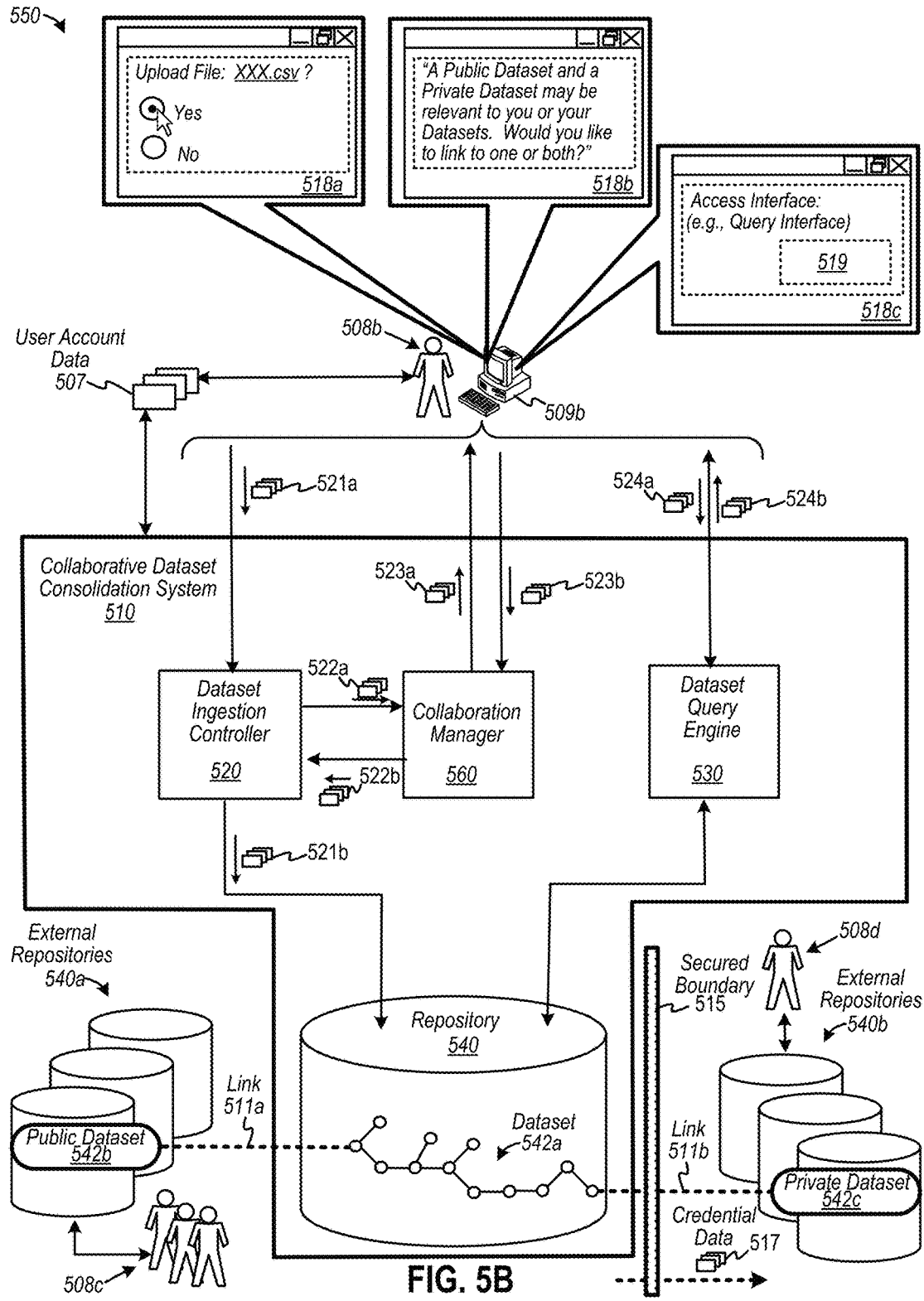
FIG. 5B is a diagram depicting operation an example of a collaborative dataset consolidation system, according to some examples.

FIG. 5B is a diagram depicting operation an example of a collaborative dataset consolidation system, according to some examples. Diagram 550 includes a collaborative dataset consolidation system 510, which, in turn, includes a dataset ingestion controller 520, a collaboration manager 560, a dataset query engine 530, and a repository 540, which may represent one or more data stores. In the example shown, consider that a user 508b, which is associated with a user account data 507, may be authorized to access (via networked computing device 509b) collaborative dataset consolidation system to create a dataset and to perform a query. User interface 518a of computing device 509b may receive a user input signal to activate the ingestion of a data file, such as a CSV formatted file (e.g., "XXX.csv"), to create a dataset (e.g., an atomized dataset stored in repository 540). Hence, dataset ingestion controller 520 may receive data 521a representing the CSV file and may analyze the data to determine dataset attributes during, for example, a phase in which "insights" (e.g., statistics, data characterization, etc.) may be performed. Examples of dataset attributes include annotations, data classifications, data types, a number of data points, a number of columns, a "shape" or distribution of data and/or data values, a normative rating (e.g., a number between 1 to 10 (e.g., as provided by other users)) indicative of the "applicability" or "quality" of the dataset, a number of queries associated with a dataset, a number of dataset versions, identities of users (or associated user identifiers) that analyzed a dataset, a number of user comments related to a dataset, etc.). Dataset ingestion controller 520 may also convert the format of data file 521a to an atomized data format to form data representing an atomized dataset 521b that may be stored as dataset 542a in repository 540.

As part of its processing, dataset ingestion controller 520 may determine that an unspecified column of data 521a, which includes five (5) integer digits, may be a column of "zip code" data. As such, dataset ingestion controller 520 may be configured to derive a data classification or data type "zip code" with which each set of 5 digits can be annotated or associated. Further to the example, consider that dataset ingestion controller 520 may determine that, for example, based on dataset attributes associated with data 521a (e.g., zip code as an attribute), both a public dataset 542b in external repositories 540a and a private dataset 542c in external repositories 540b may be determined to be relevant to data file 521a. Individuals 508c, via a networked computing system, may own, maintain, administer, host or perform other activities in association with public dataset 542b. Individual 508d, via a networked computing system, may also own, maintain, administer, and/or host private dataset 542c, as well as restrict access through a secured boundary 515 to permit authorized usage. In some examples, either public dataset 542b or private dataset 542c, or both, may be omitted (e.g., a user may select to exclude a dataset, such as private dataset 542c, from being inferred or otherwise linked).

Continuing with the example, public dataset 542b and private dataset 542c may include "zip code"-related data (i.e., data identified or annotated as zip codes). Dataset ingestion controller 520 may generate a data message 522a that includes an indication that public dataset 542b and/or private dataset 542c may be relevant to the pending uploaded data file 521a (e.g., datasets 542b and 542c include zip codes). Collaboration manager 560 receive data message 522a, and, in turn, may generate user interface-related data 523a to cause presentation of a notification and user input data configured to accept user input at user interface 518b. According to some examples, user 508b may interact via computing device 509b and user interface 518b to (1) engage other users of collaborative dataset consolidation system 510 (and other non-users), (2) invite others to interact with a dataset, (3) request access to a dataset, (4) provide commentary on datasets via collaboration manager 560, (5) provide query results based on types of queries (and characteristics of such queries), (6) communicate changes and updates to datasets that may be linked across any number of atomized dataset that form a collaborative dataset, and (7) notify others of any other type of collaborative activity relative to datasets.

If user 508b wishes to "enrich" dataset 521a, user 508b may activate a user input (not shown on interface 518b) to generate a user input signal data 523b indicating a request to link to one or more other datasets, including private datasets that may require credentials for access. Collaboration manager 560 may receive user input signal data 523b, and, in turn, may generate instruction data 522b to generate an association (or link 541a) between atomized dataset 542a and public dataset 542b to form a collaborative dataset, thereby extending the dataset of user 508b to include knowledge embodied in external repositories 540a. Therefore, user 508b's dataset may be generated as a collaborative dataset as it may be based on the collaboration with public dataset 542b, and, to some degree, its creators, individuals 508c. Note that while public dataset 542b may be shown external to system 510, public dataset 542b may be ingested via dataset ingestion controller 520 for storage as another atomized dataset in repository 540. Or, public dataset 542b may be imported into system 510 as an atomized dataset in repository 540 (e.g., link 511a is disposed within system 510). Similarly, if user 508b wishes to "enrich" atomized dataset 521b with private dataset 542c, user 508b may extend its dataset 542a by forming a link 511b to private dataset 542c to form a collaborative dataset. In particular, dataset 542a and private dataset 542c may consolidate to form a collaborative dataset (e.g., dataset 542a and private dataset 542c are linked to facilitate collaboration between users 508b and 508d). Note that access to private dataset 542c may require credential data 517 to permit authorization to pass through secured boundary 515. Note, too, that while private dataset 542c may be shown external to system 510, private dataset 542c may be ingested via dataset ingestion controller 520 for storage as another atomized dataset in repository 540. Or, private dataset 542c may be imported into system 510 as an atomized dataset in repository 540

(e.g., link 511b is disposed within system 510). According to some examples, credential data 517 may be required even if private dataset 542c is stored in repository 540. Therefore, user 508d may maintain dominion (e.g., ownership and control of access rights or privileges, etc.) of an atomized version of private dataset 542c when stored in repository 540.

Should user 508b desire not to link dataset 542a with other datasets, then upon receiving user input signal data 523b indicating the same, dataset ingestion controller 520 may store dataset 521b as atomized dataset 542a without links (or without active links) to public dataset 542b or private dataset 542c. Thereafter, user 508b may enter query data 524a via data entry interface 519 (of user interface 518c) to dataset query engine 530, which may be configured to apply one or more queries to dataset 542a to receive query results 524b. Note that dataset ingestion controller 520 need not be limited to performing the above-described function during creation of a dataset. Rather, dataset ingestion controller 520 may continually (or substantially continuously) identify whether any relevant dataset is added or changed (beyond the creation of dataset 542a), and initiate a messaging service (e.g., via an activity feed) to notify user 508b of such events. According to some examples, atomized dataset 542a may be formed as triples compliant with an RDF specification, and repository 540 may be a database storage device formed as a "triplestore." While dataset 542a, public dataset 542b, and private dataset 542c may be described above as separately partitioned graphs that may be linked to form collaborative datasets and graphs (e.g., at query time, or during any other data operation, including data access), dataset 542a may be integrated with either public dataset 542b or private dataset 542c, or both, to form a physically contiguous data arrangement or graph (e.g., a unitary graph without links), according to at least one example.

Figure 6:
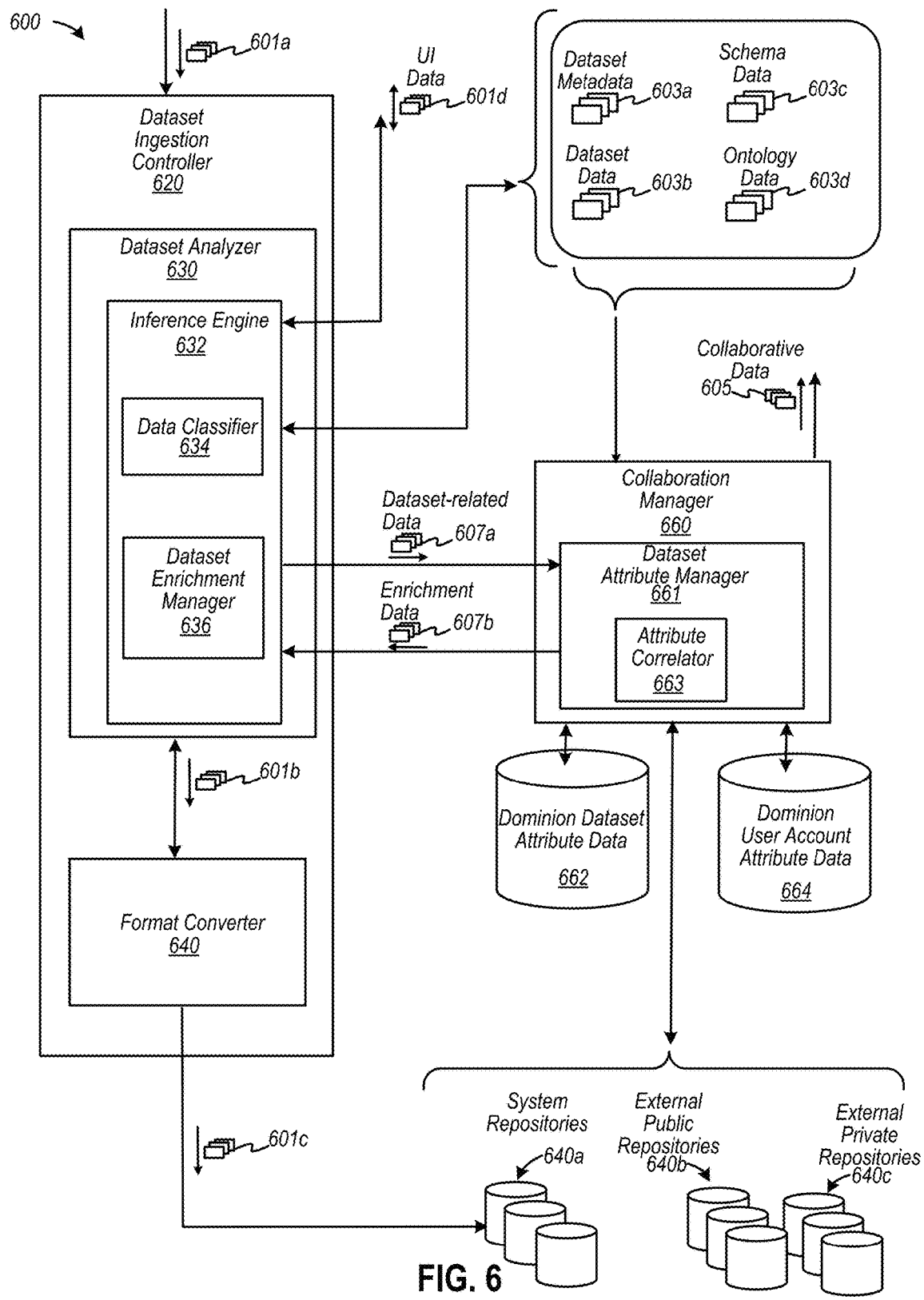
FIG. 6 is a diagram depicting an example of a dataset analyzer and an inference engine, according to some embodiments.

FIG. 6 is a diagram depicting an example of a dataset analyzer and an inference engine, according to some embodiments. Diagram 600 includes a dataset ingestion controller 620, which, in turn, includes a dataset analyzer 630 and a format converter 640. As shown, dataset ingestion controller 620 may be configured to receive data file 601a, which may include a set of data (e.g., a dataset) formatted in any specific format, examples of which include CSV, JSON, XML, XLS, MySQL, binary, RDF, or other similar or suitable data formats. Dataset analyzer 630 may be configured to analyze data file 601a to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 630 then may be configured to correct or otherwise compensate for such exceptions.

Dataset analyzer 630 also may be configured to classify subsets of data (e.g., each subset of data as a column) in data file 601a as a particular data classification, such as a particular data type. For example, a column of integers may be classified as "year data," if the integers are in one of a number of year formats expressed in accordance with a Gregorian calendar schema. Thus, "year data" may be formed as a derived dataset attribute for the particular column. As another example, if a column includes a number of cells that each include five digits, dataset analyzer 630 also may be configured to classify the digits as constituting a "zip code." Dataset analyzer 630 can be configured to analyze data file 601a to note the exceptions in the processing pipeline, and to append, embed, associate, or link user interface elements or features to one or more elements of data file 601a to facilitate collaborative user interface functionality (e.g., at a presentation layer) with respect to a user interface. Further, dataset analyzer 630 may be configured to analyze data file 601a relative to dataset-related data to determine correlations among dataset attributes of data file 601a and other datasets 603b (and attributes, such as metadata 603a). Once a subset of correlations has been determined, a dataset formatted in data file 601a (e.g., as an annotated tabular data file, or as a CSV file) may be enriched, for example, by associating links to the dataset of data file 601a to form the dataset of data file 601b, which, in some cases, may have a similar data format as data file 601a (e.g., with data enhancements, corrections, and/or enrichments). Note that while format converter 640 may be configured to convert any CSV, JSON, XML, XLS, RDF, etc. into RDF-related data formats, format converter 640 may also be configured to convert RDF and non-RDF data formats into any of CSV, JSON, XML, XLS, MySQL, binary, XLS, RDF, etc. Note that the operations of dataset analyzer 630 and format converter 640 may be configured to operate in any order serially as well as in parallel (or substantially in parallel). For example, dataset analyzer 630 may analyze datasets to classify portions thereof, either prior to format conversion by formatter converter 640 or subsequent to the format conversion. In some cases, at least one portion of format conversion may occur during dataset analysis performed by dataset analyzer 630.

Format converter 640 may be configured to convert dataset of data file 601b into an atomized dataset 601c, which, in turn, may be stored in system repositories 640a that may include one or more atomized data store (e.g., including at least one triplestore). Examples of functionalities to perform such conversions may include, but are not limited to, CSV2RDF data applications to convert CVS datasets to RDF datasets (e.g., as developed by Rensselaer Polytechnic Institute and referenced by the World Wide Web Consortium ("W3C")), R2RML data applications (e.g., to perform RDB to RDF conversion, as maintained by the World Wide Web Consortium ("W3C")), and the like.

As shown, dataset analyzer 630 may include an inference engine 632, which, in turn, may include a data classifier 634 and a dataset enrichment manager 636. Inference engine 632 may be configured to analyze data in data file 601a to identify tentative anomalies and to infer corrective actions, and to identify tentative data enrichments (e.g., by joining with, or linking to, other datasets) to extend the data beyond that which is in data file 601a. Inference engine 632 may receive data from a variety of sources to facilitate operation of inference engine 632 in inferring or interpreting a dataset attribute (e.g., as a derived attribute) based on the analyzed data. Responsive to a request input data via data signal 601d, for example, a user may enter a correct annotation via a user interface, which may transmit corrective data 601d as, for example, an annotation or column heading. Thus, the user may correct or otherwise provide for enhanced accuracy in atomized dataset generation "in-situ," or during the dataset ingestion and/or graph formation processes. As another example, data from a number of sources may include dataset metadata 603a (e.g., descriptive data or information specifying dataset attributes), dataset data 603b (e.g., some or all data stored in system repositories 640a, which may store graph data), schema data 603c (e.g., sources, such as schema.org, that may provide various types and vocabularies), ontology data 603d from any suitable ontology (e.g., data compliant with Web Ontology Language ("OWL"), as maintained by the World Wide Web Consortium ("W3C")), and any other suitable types of data sources.

In one example, data classifier 634 may be configured to analyze a column of data to infer a datatype of the data in the column. For instance, data classifier 634 may analyze the column data to infer that the columns include one of the following datatypes: an integer, a string, a Boolean data item, a categorical data item, a time, etc., based on, for example, data from UI data 601d (e.g., data from a UI representing an annotation), as well as based on data from data 603a to 603d. In another example, data classifier 634 may be configured to analyze a column of data to infer a data classification of the data in the column (e.g., where inferring the data classification may be more sophisticated than identifying or inferring a datatype). For example, consider that a column of ten (10) integer digits is associated with an unspecified or unidentified heading. Data classifier 634 may be configured to deduce the data classification by comparing the data to data from data 601d, and from data 603a to 603d. Thus, the column of unknown 10-digit data in data 601a may be compared to 10-digit columns in other datasets that are associated with an annotation of "phone number." Thus, data classifier 634 may deduce the unknown 10-digit data in data 601a includes phone number data.

In the above example, consider that data in the column (e.g., in a CSV or XLS file) may be stored in a system of layer files, whereby raw data items of a dataset is stored at layer zero (e.g., in a layer zero ("L0") file). The datatype of the column (e.g., string datatype) may be stored at layer one (e.g., in a layer one ("L1") file, which may be linked to the data item at layer zero in the L0 file). An inferred dataset attribute, such as a "derive annotation," may indicate a column of ten (10) integer digits can be classified as a "phone number," which may be stored as annotative description data stored at layer two (e.g., in a layer two ("L2") file, which may be linked to the classification of "integer" at layer one, which, in turn, may be linked to the 10 digits in a column at layer zero). While not shown in FIG. 6, the system of layer files may be adaptive to add or remove data items, under control of the dataset ingestion controller 620 (or any of its constituent components), at the various layers as datasets are expanded or modified to include additional data as well as annotations, references, statistics, etc. Another example of a layer system is described in reference to FIG. 12, among other figures herein.

In yet another example, inference engine 632 may receive data (e.g., a datatype or data classification, or both) from an attribute correlator 663. As shown, attribute correlator 663 may be configured to receive data, including attribute data (e.g., dataset attribute data), from dataset ingestion controller 620. Also, attribute correlator 663 may be configured to receive data from data sources (e.g., UI-related/user inputted data 601d, and data 603a to 603d), and from system repositories 640a. Further, attribute correlator 663 may be configured to receive data from one or more of external public repository 640b, external private repository 640c, dominion dataset attribute data store 662, and dominion user account attribute data store 662, or from any other source of data. In the example shown, dominion dataset attribute data store 662 may be configured to store dataset attribute data for which collaborative dataset consolidation system may have dominion, whereas dominion user account attribute data store 662 may be configured to store user or user account attribute data for data in its domain.

Attribute correlator 663 may be configured to analyze the data to detect patterns that may resolve an issue. For example, attribute correlator 663 may be configured to analyze the data, including datasets, to "learn" whether unknown 10-digit data is likely a "phone number" rather than another data classification. In this case, a probability may be determined that a phone number is a more reasonable conclusion based on, for example, regression analysis or similar analyses. Further, attribute correlator 663 may be configured to detect patterns or classifications among datasets and other data through the use of Bayesian networks, clustering analysis, as well as other known machine learning techniques or deep-learning techniques (e.g., including any known artificial intelligence techniques). Attribute correlator 663 also may be configured to generate enrichment data 607b that may include probabilistic or predictive data specifying, for example, a data classification or a link to other datasets to enrich a dataset. According to some examples, attribute correlator 663 may further be configured to analyze data in dataset 601a, and based on that analysis, attribute correlator 663 may be configured to recommend or implement one or more added columns of data. To illustrate, consider that attribute correlator 663 may be configured to derive a specific correlation based on data 607a that describe three (3) columns, whereby those three columns are sufficient to add a fourth (4th) column as a derived column. In some cases, the data in the 4th column may be derived mathematically via one or more formulae. One example of a derived column is described in FIG. 13 and elsewhere herein. Therefore, additional data may be used to form, for example, additional "triples" to enrich or augment the initial dataset.

In yet another example, inference engine 632 may receive data (e.g., enrichment data 607b) from a dataset attribute manager 661, where enrichment data 607b may include derived data or link-related data to form collaborative datasets. Consider that attribute correlator 663 can detect patterns in datasets in repositories 640a to 640c, among other sources of data, whereby the patterns identify or correlate to a subset of relevant datasets that may be linked with the dataset in data 601a. The linked datasets may form a collaborative dataset that is enriched with supplemental information from other datasets. In this case, attribute correlator 663 may pass the subset of relevant datasets as enrichment data 607b to dataset enrichment manager 636, which, in turn, may be configured to establish the links for a dataset in 601b. A subset of relevant datasets may be identified as a supplemental subset of supplemental enrichment data 607b. Thus, converted dataset 601c (i.e., an atomized dataset) may include links to establish collaborative datasets formed with collaborative datasets.

Dataset attribute manager 661 may be configured to receive correlated attributes derived from attribute correlator 663. In some cases, correlated attributes may relate to correlated dataset attributes based on data in data store 662 or based on data in data store 664, among others. Dataset attribute manager 661 also monitors changes in dataset and user account attributes in respective repositories 662 and 664. When a particular change or update occurs, collaboration manager 660 may be configured to transmit collaborative data 605 to user interfaces of subsets of users that may be associated the attribute change (e.g., users sharing a dataset may receive notification data that the dataset has been created, modified, linked, updated, associated with a comment, associated with a request, queried, or has been associated with any other dataset interactions).

Therefore, dataset enrichment manager 636, according to some examples, may be configured to identify correlated datasets based on correlated attributes as determined, for example, by attribute correlator 663. The correlated attributes, as generated by attribute correlator 663, may facilitate the use of derived data or link-related data, as attributes, to form associate, combine, join, or merge datasets to form collaborative datasets. A dataset 601b may be generated by enriching a dataset 601a using dataset attributes to link to other datasets. For example, dataset 601a may be enriched with data extracted from (or linked to) other datasets identified by (or sharing similar) dataset attributes, such as data representing a user account identifier, user characteristics, similarities to other datasets, one or more other user account identifiers that may be associated with a dataset, data-related activities associated with a dataset (e.g., identity of a user account identifier associated with creating, modifying, querying, etc. a particular dataset), as well as other attributes, such as a "usage" or type of usage associated with a dataset. For instance, a virus-related dataset (e.g., Zika dataset) may have an attribute describing a context or usage of dataset, such as a usage to characterize susceptible victims, usage to identify a vaccine, usage to determine an evolutionary history of a virus, etc. So, attribute correlator 663 may be configured to correlate datasets via attributes to enrich a particular dataset.

According to some embodiments, one or more users or administrators of a collaborative dataset consolidation system may facilitate curation of datasets, as well as assisting in classifying and tagging data with relevant datasets attributes to increase the value of the interconnected dominion of collaborative datasets. According to various embodiments, attribute correlator 663 or any other computing device operating to perform statistical analysis or machine learning may be configured to facilitate curation of datasets, as well as assisting in classifying and tagging data with relevant datasets attributes. In some cases, dataset ingestion controller 620 may be configured to implement third-party connectors to, for example, provide connections through which third-party analytic software and platforms (e.g., R, SAS, Mathematica, etc.) may operate upon an atomized dataset in the dominion of collaborative datasets. For instance, dataset ingestion controller 620 may be configured to implement API endpoints to provide or access functionalities provided by analytic software and platforms, such as R, SAS, Mathematica, etc.

Figure 7:
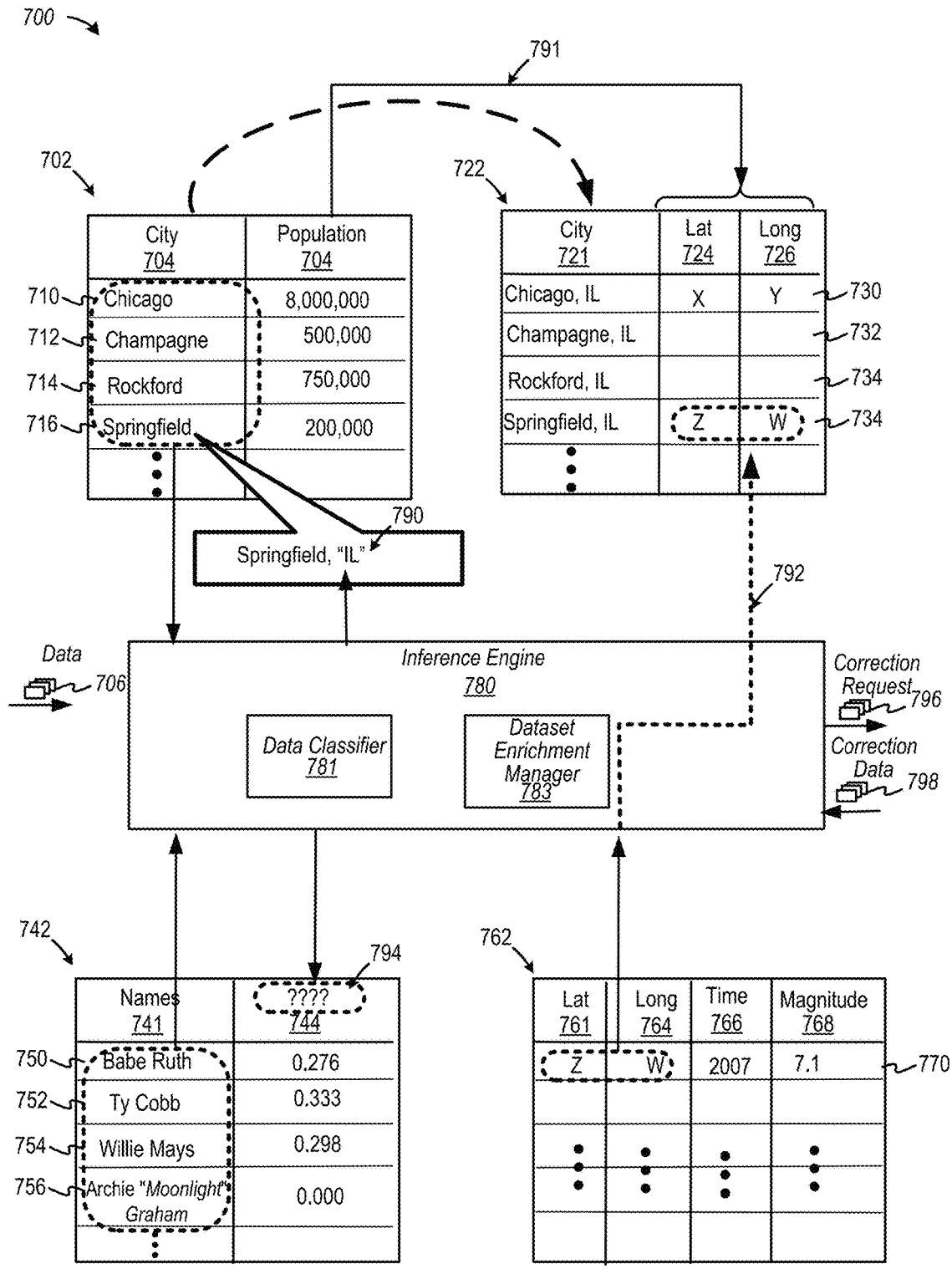
FIG. 7 is a diagram depicting operation of an example of an inference engine, according to some embodiments.

FIG. 7 is a diagram depicting operation of an example of an inference engine, according to some embodiments. Diagram 700 depicts an inference engine 780 including a data classifier 781 and a dataset enrichment manager 783, whereby inference engine 780 is shown to operate on data 706 (e.g., one or more types of data described in FIG. 6), and further operates on annotated tabular data representations of dataset 702, dataset 722, dataset 742, and dataset 762. Dataset 702 includes rows 710 to 716 that relate each population number 704 to a city 702. Dataset 722 includes rows 730 to 736 that relate each city 721 to both a geolocation described with a latitude coordinate ("lat") 724 and a longitude coordinate ("long") 726. Dataset 742 includes rows 750 to 756 that relate each name 741 to a number 744, whereby column 744 omits an annotative description of the values within column 744. Dataset 762 includes rows, such as row 770, that relate a pair of geo-coordinates (e.g., latitude coordinate ("lat") 761 and a longitude coordinate ("long") 764) to a time 766 at which a magnitude 768 occurred during an earthquake.

Inference engine 780 may be configured to detect a pattern in the data of column 704 in dataset 702. For example, column 704 may be determined to relate to cities in Illinois based on the cities shown (or based on additional cities in column 704 that are not shown, such as Skokie, Cicero, etc.). Based on a determination by inference engine 780 that cities 704 likely are within Illinois, then row 716 may be annotated to include annotative portion ("IL") 790 (e.g., as derived supplemental data) so that Springfield in row 716 can be uniquely identified as "Springfield, Ill." rather than, for example, "Springfield, Nebr." or "Springfield, Mass." Further, inference engine 780 may correlate columns 704 and 721 of datasets 702 and 722, respectively. As such, each population number in rows 710 to 716 may be correlated to corresponding latitude 724 and longitude 726 coordinates in rows 730 to 734 of dataset 722. Thus, dataset 702 may be enriched by including latitude 724 and longitude 726 coordinates as a supplemental subset of data. In the event that dataset 762 (and latitude 724 and longitude 726 data) are formatted differently than dataset 702, then latitude 724 and longitude 726 data may be converted to an atomized data format (e.g., compatible with RDF). Thereafter, a supplemental atomized dataset can be formed by linking or integrating atomized latitude 724 and longitude 726 data with atomized population 704 data in an atomized version of dataset 702. Similarly, inference engine 780 may correlate columns 724 and 726 of dataset 722 to columns 761 and 764. As such, earthquake data in row 770 of dataset 762 may be correlated to the city in row 734 ("Springfield, Ill.") of dataset 722 (or correlated to the city in row 716 of dataset 702 via the linking between columns 704 and 721). The earthquake data may be derived via latitude and longitude coordinate-to-earthquake correlations as supplemental data for dataset 702. Thus, new links (or triples) may be formed to supplement population data 704 with earthquake magnitude data 768.

Inference engine 780 also may be configured to detect a pattern in the data of column 741 in dataset 742. For example, inference engine 780 may identify data in rows 750 to 756 as "names" without an indication of the data classification for column 744. Inference engine 780 can analyze other datasets to determine or learn patterns associated with data, for example, in column 741. In this example, inference engine 780 may determine that names 741 relate to the names of "baseball players." Therefore, inference engine 780 determines (e.g., predicts or deduces) that numbers in column 744 may describe "batting averages." As such, a correction request 796 may be transmitted to a user interface to request corrective information or to confirm that column 744 does include batting averages. Correction data 798 may include an annotation (e.g., batting averages) to insert as annotation 794, or may include an acknowledgment to confirm "batting averages" in correction request data 796 is valid. Note that the functionality of inference engine 780 is not limited to the examples describe in FIG. 7 and is more expansive than as described in the number of examples. In some examples, determination of a column header, such as column header 744, may be associated with an annotation that may be automatically determined (e.g., based on inferred data that determines a annotative description of data for a column), or may be entered semi-automatically or manually.

Figure 8:
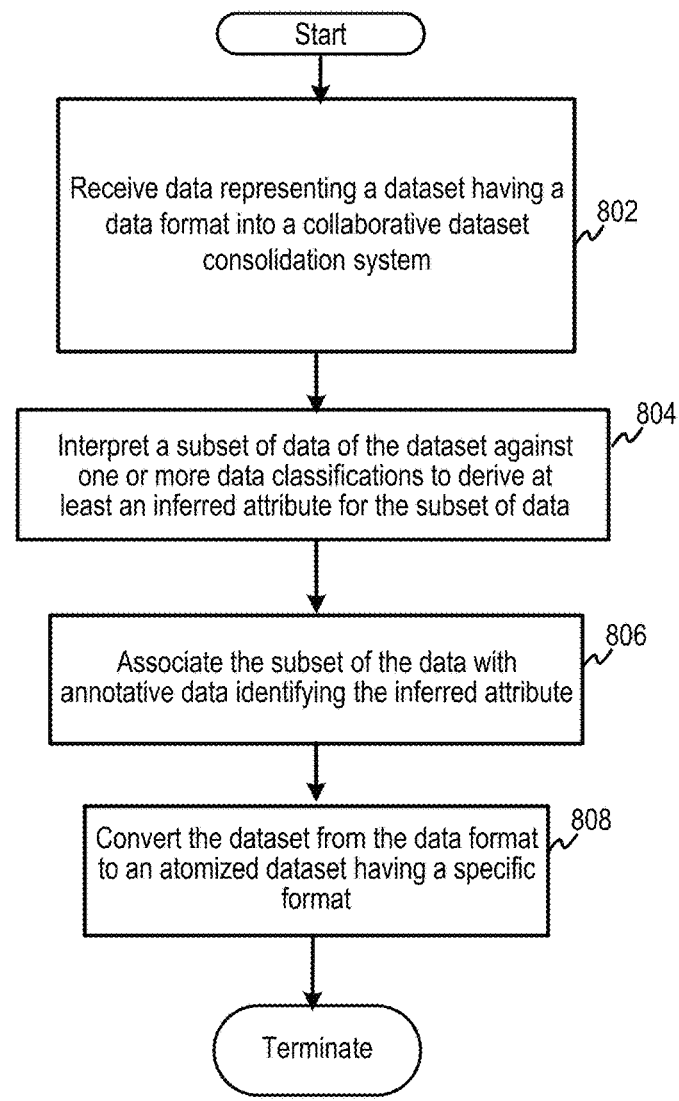
FIG. 8 is a diagram depicting a flow diagram as an example of ingesting an enhanced dataset into a collaborative dataset consolidation system, according to some embodiments.

FIG. 8 is a diagram depicting a flow diagram as an example of ingesting an enhanced dataset into a collaborative dataset consolidation system, according to some embodiments. Diagram 800 depicts a flow for an example of inferring dataset attributes and generating an atomized dataset in a collaborative dataset consolidation system. At 802, data representing a dataset having a data format may be received into a collaborative dataset consolidation system. The dataset may be associated with an identifier or other dataset attributes with which to correlate the dataset. At 804, a subset of data of the dataset is interpreted against subsets of data (e.g., columns of data) for one or more data classifications (e.g., datatypes) to infer or derive at least an inferred attribute for a subset of data (e.g., a column of data). In some examples, the subset of data may relate to a columnar representation of data in a tabular data format, or CSV file, with, for example, columns annotated. Annotations may include descriptions of a data type (e.g., string, numeric, categorical, etc.), a data classification (e.g., a location, such as a zip code, etc.), or any other data or metadata that may be used to locate in a search or to link with other datasets.

To illustrate, consider that a subset of data attributes (e.g., dataset attributes) may be identified with a request to create a dataset (e.g., to create a linked dataset), or to perform any other operation (e.g., analysis, data insight generation, dataset atomization, etc.). The subset of dataset attributes may include a description of the dataset and/or one or more annotations the subset of dataset attributes. Further, the subset of dataset attributes may include or refer to data types or classifications that may be association with, for example, a column in a tabular data format (e.g., prior to atomization or as an alternate view). Note that in some examples, one or more data attributes may be stored in one or more layer files that include references or pointers to one or more columns in a table for a set of data. In response to a request for a search or creation of a dataset, the collaborative dataset consolidation system may retrieve a subset of atomized datasets that include data equivalent to (or associated with) one or more of the dataset attributes.

So if a subset of dataset attributes includes alphanumeric characters (e.g., two-letter codes, such as "AF" for Afghanistan), then a column can be identified as including country code data (e.g., a column includes data cells with AF, BR, CA, CN, DE, JP, MX, UK, US, etc.). Based on the country codes as a "data classification," the collaborative dataset consolidation system may correlate country code data in other atomized datasets to a dataset of interest (e.g., a newly-created dataset, an analyzed dataset, a modified dataset (e.g., with added linked data), a queried dataset, etc.). Then, the system may retrieve additional atomized datasets that include country codes to form a collaborative dataset. The consolidation may be performed automatically, semi-automatically (e.g., with at least one user input), or manually. Thus, these datasets may be linked together by country codes. Note that in some cases, the system may implement logic to "infer" that two letters in a "column of data" of a tabular, pre-atomized dataset includes country codes. As such, the system may "derive" an annotation (e.g., a data type or classification) as a "country code." Therefore, the derived classification of "country code" may be referred to as a derived attribute, which, for example, may be stored in a layer two (2) data file, examples of which are described herein (e.g., FIGS. 6 and 12, among others). A dataset ingestion controller may be configured to analyze data and/or dataset attributes to correlate the same over multiple datasets, the dataset ingestion controller being further configured to infer a data type or classification of a grouping of data (e.g., data disposed in a column or any other data arrangement), according to some embodiments.

At 806, the subset of the data may be associated with annotative data identifying the inferred attribute. Examples of an inferred attribute include the inferred "baseball player" names annotation and the inferred "batting averages" annotation, as described in FIG. 7. At 808, the dataset may be converted from the data format to an atomized dataset having a specific format, such as an RDF-related data format. The atomized dataset may include a set of atomized data points, whereby each data point may be represented as an RDF triple. According to some embodiments, inferred dataset attributes may be used to identify subsets of data in other dataset, which may be used to extend or enrich a dataset. An enriched dataset may be stored as data representing "an enriched graph" in, for example, a triplestore or an RDF store (e.g., based on a graph-based RDF model). In other cases, enriched graphs formed in accordance with the above, and any implementation herein, may be stored in any type of data store or with any database management system.

Figure 9:
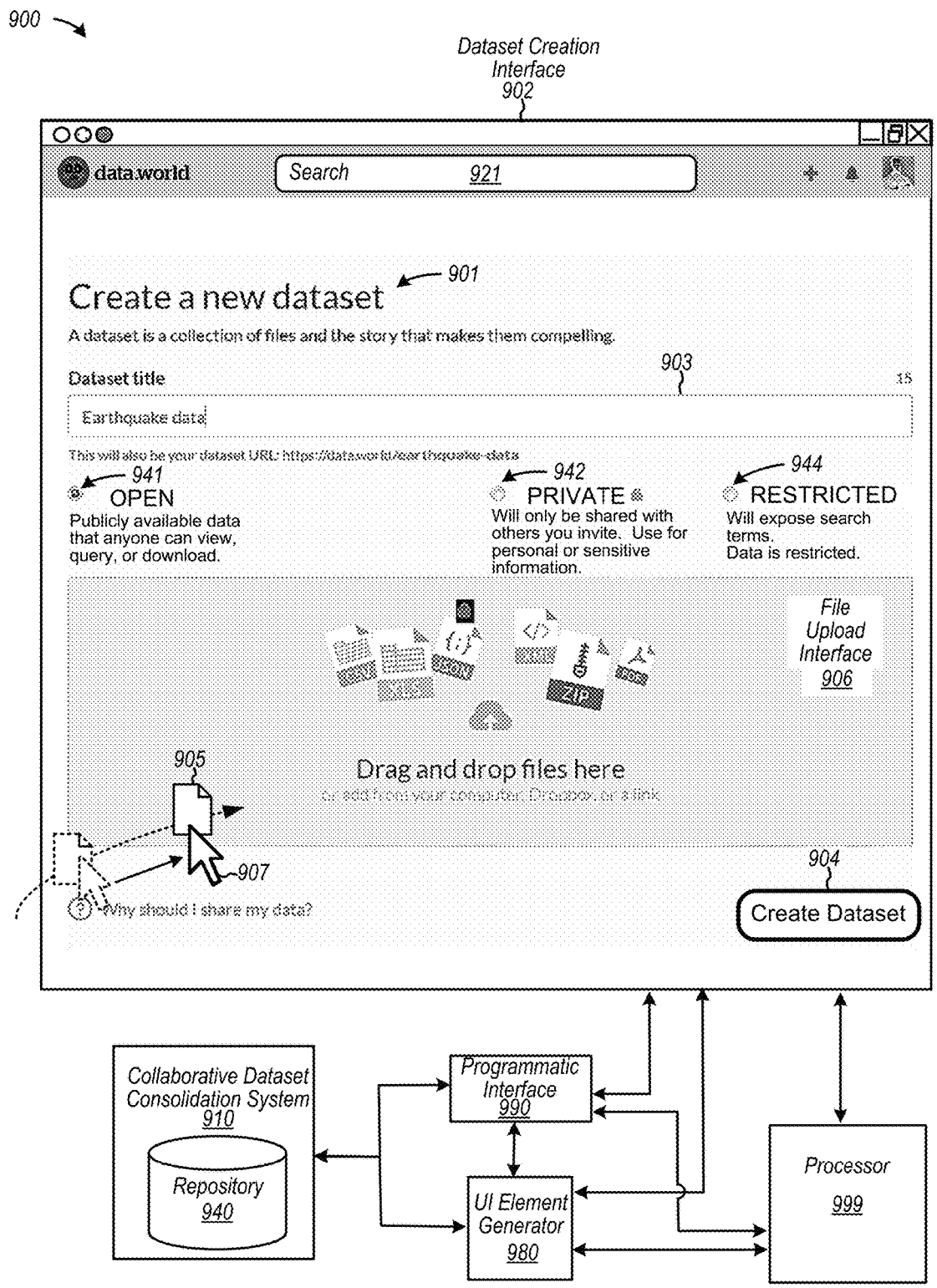
FIG. 9 is a diagram depicting a dataset creation interface, according to some embodiments.

FIG. 9 is a diagram depicting a dataset creation interface, according to some embodiments. Diagram 900 depicts a dataset creation interface 902 as an example of a computerized tool to form collaborative datasets. Diagram 900 also depicts a collaborative dataset consolidation system 910, which is shown to include a repository 940, a user interface ("UI") element generator 980, a programmatic interface 990, and a processor 999. User interface ("UI") element generator 980 may be configured to generate data to form user interface elements, and may be further configured to cause presentation of user interface elements on a user interface to facilitate data signal detection to initiate a dataset creation process, according to various examples. In one or more implementations, elements depicted in diagram 900 of FIG. 9 may include structures and/or functions as similarly-named or similarly-numbered elements depicted in other drawings.

Dataset creation interface 902 may be used to create, or initiate creation of, a collaborative dataset via a computing device (not shown). In the example shown, dataset creation interface 902 includes a descriptive title 901, a number of user interface elements to facilitate dataset creation, such as a search field 921, a dataset title 903, a file upload interface 906, a "create dataset" activation input 904, an "open" activation input 941, a "private" activation input 942, a "restricted" activation input 944, and any other type of user interface element that may be used to create datasets that, in turn, may be transformed into atomized datasets, such as an atomized dataset stored in repository 940.

In this example, consider that dataset creation interface 902 is configured to create a dataset directed to earthquake-related data. Text entered into dataset title field 903 may be parsed, analyzed and associated with the created dataset to identify the dataset and to make at least some of the text in the title entered in field 903 searchable (e.g., in search field 921). Thus, the term "earthquake" may enable the created dataset to be returned in search results responsive to a search of "earthquake data" in search field 921. "Open" activation input 941 may be configured to activate, if selected, logic to classify the dataset as "publicly available data" such that anyone may access (e.g., search, view, query, download, modify, etc.) the earthquake dataset created using dataset creation interface 902. "Private" activation input 942 may be configured to activate, if selected, logic to classify the dataset as "private data" such that no other dataset may link to the "earthquake dataset" and no one may access the dataset, unless authorization is granted to do so. "Restricted" activation input 944 may be configured to activate, if selected, logic to classify the dataset as "restricted data." In some examples, metadata, such as search terms, annotations, etc., may be publicly exposed or searchable, whereas the data of the "earthquake" dataset may be inaccessible. Consequently, a data practitioner that owns a particular dataset may allow others to find the dataset, and if there is interest by another user, the data practitioner may provide authorization the interested user to access the dataset with restrictions (e.g., usage limitations, time limitations, etc.). In some cases, authorization may be made in exchange for remuneration. "Restricted" activation input 944 may be also configured to modify different levels of restricted access.

An owner of the "earthquake" dataset may offer various levels of permissions for a dataset or a particular user. For example, permissions may be selectably configured to enable or disable an ability to be identified in a search, enable or disable viewing of the dataset, enable or disable an ability to query, enable or disable an ability to download the dataset, enable or disable ability to modify the dataset, ability to modify time intervals during which the dataset is accessible, etc.

According to some embodiments, user interface element generator 980 may be configured to cause the generation of a user interface element for dataset creation interface 902 or any other interface, such as those described herein. A user interface element may be generated by user interface element generator 980 as a graphical control element to provide a visual component for presentation to a user. The visual component may be configured to convey data stored in a computing device or functionality of a computing device to, for example, render specialized functionalities described herein. According to some examples, user interface element generator 980 may be configured to generate at least one user interface element and/or at least one subset of executable instructions for implementation at either a client computing device or a server computing device, or a combination thereof. Thus, user interface elements may be configured to facilitate client-side computations or server-side computations, as well as distributed computing among one or more client computing devices, one or more server computing devices, and one or more other computing devices. Examples of user interface elements include, but are not limited to, subsets of executable instructions (e.g., software components, modules, etc., such as "widgets," APIs, etc.) that facilitate implementations of (1) data signals for user input controls (e.g., initiation of actions and processes via buttons, menus, text fields, hypertext links, etc.) within an interface, (2) data signals for navigation to access one or more computing devices via links, tabs, scrollbars, etc., (3) data signals for modifying (via computations) or manipulating data values (e.g., using labels, check boxes, radio buttons, sliders, etc.), (4) data signals for displaying and manipulating computational results or data outputs, (5) data signals for implementing a data entry interface for accessing data, querying data, etc. (e.g., via a modal window, etc.), and (6) any other action or process configurable to create a collaborative dataset or otherwise implement a collaborative dataset (e.g., analyzing, sharing, and querying a dataset, among other implementations).

Further to the example shown, a processor 999 may be configured, in accordance with executing program code, to facilitate selection of an icon 905 representing a set of data. The selection may be implemented via a pointer 907 (and associated data signals), which enables a set of data 105 to enter an uploading process. Icon 905 and pointer 907 are examples of user interface elements generated by user interface element generator 980. Processor 999 may detect a data signal originating from dataset creation interface 902, responsive to activation of "create dataset" user interface 904. Processor 999 may initiate dataset creation process or may perform one or more portions thereof (e.g., including the process of creating a dataset). According to some embodiments, processor 999 and/or its functionalities may be disposed and/or performed at either a client computing device or a remote computing device (e.g., a server), or may be disposed or performed at multiple computing devices, including networked or non-networked computing devices. Similarly, collaborative dataset consolidation system 910 may be include logic that may be implemented either at one or more client computing devices or one or more remote computing devices, or may be implemented at multiple computing devices. Either one of user interface element generator 980 and a programmatic interface 990 or both, may be implemented at a client computing device, at a remote computing device, or at multiple computing devices. Further, the functionalities of user interface element generator 980 and a programmatic interface 990 may be performed in series, in parallel, or in any order. The above-described examples of structures and functionalities in diagram 900 are not intended to be limiting, and such structures and functionalities may be implemented with additional breadth.

Figure 10:
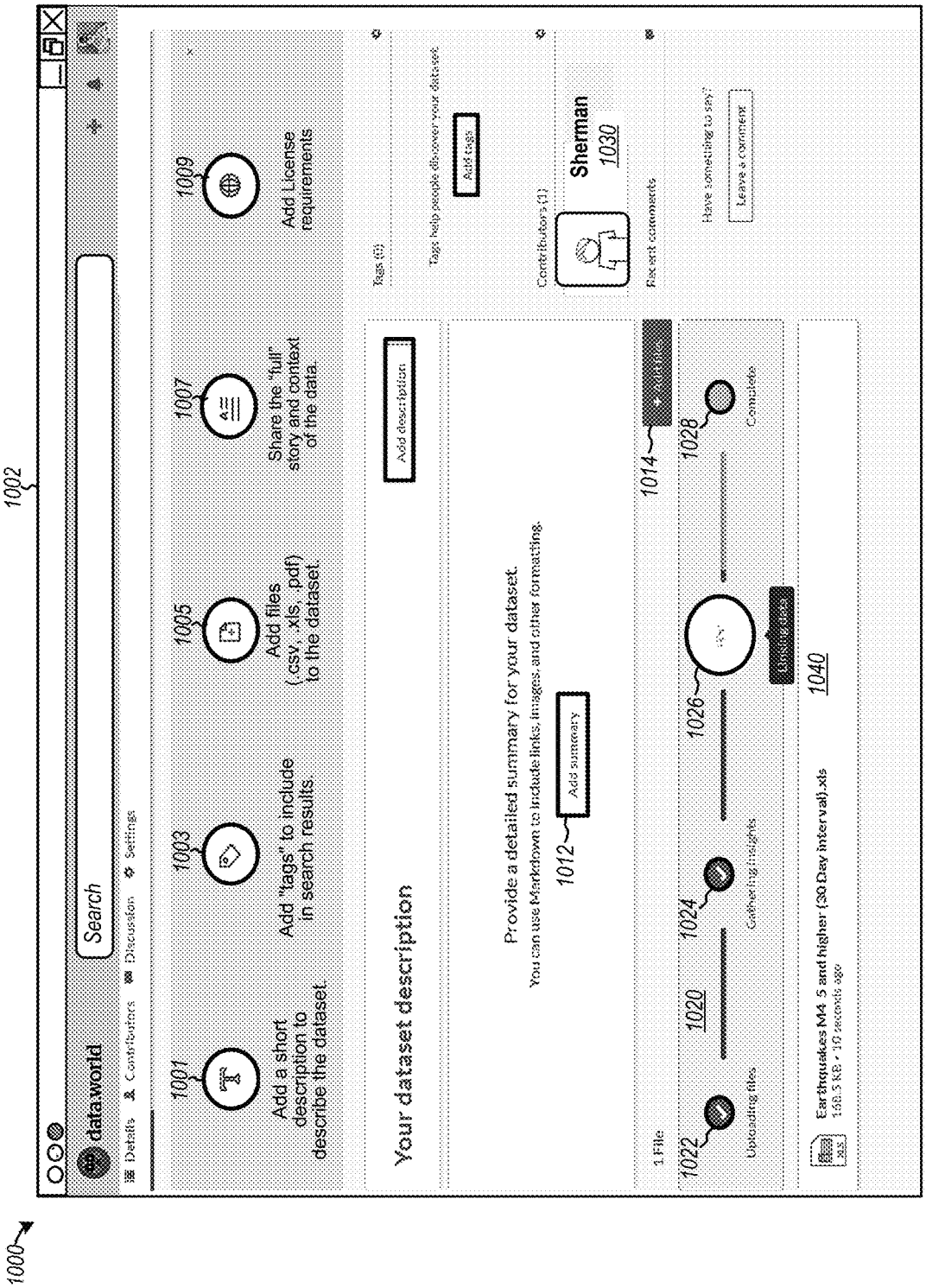
FIG. 10 is a diagram of an example of a user interface depicting progression of phases during creation of a dataset, according to some embodiments.

FIG. 10 is a diagram of an example of a user interface depicting progression of phases during creation of a dataset, according to some embodiments. Diagram 1000 depicts an interface 1002, which depicts progression of phases during creation of a dataset. For example, progression user interface element 1020 is configured to present the phases of creating a dataset including an uploading user interface element 1022 to depict the process of uploading data, such as a raw data file, initiated by activating a "create dataset" input 904. Progression user interface element 1020 also is shown to include an insight user interface element 1024 to specify a status for an insight phase of the dataset creation process (e.g., identifying dataset attributes, including derived or inferred dataset attributes), a linking user interface element 1026 to specify the status of a linking phase during atomized datasets are linked (e.g., including links to protected datasets), and a "complete" user interface element 1028, which specifies the completion of the data creation process.

According to some examples, interface 1002 may also include user interface elements that provide additional guidance or enhance the progression of the data creation process. User interface element 1012 may be configured as a user input to generate data signals to initiate association of summary data to the dataset, such as adding a data file representing a logo, or other graphical imagery of interest, as well as any other summary information (e.g., hyperlinks to sites from which raw data files were sourced, etc.), including text, as well as uploading code or programmatic instructions, among other things. User interface element 1012 also can facilitate uploading non-dataset data, such as any data or files that may provide context for a dataset to enrich understanding of the data. User interface element 1030 may be configured to convey information as to the user or owner of the dataset, and may be further configured to operate as a user input to generate data signals, which may initiate a transition to an interface that presents user account information (not shown). User interface element 1040 may be configured to convey information regarding one or more original files that are used in the dataset creation process. As shown, user interface element 1040 conveys the type of data file (e.g., .XLS file), a data file title (e.g., "Earthquake M4_5 and higher"), a file size (e.g., 168.5 KB), and an age (e.g., when the data file was last uploaded, such as 10 days or seconds ago, etc.), and the like.

User interface element 1014 may be configured as a user input to generate data signals to initiate inclusion of another set of data for creating a new dataset. In turn, the new dataset may be linked automatically to the previously-created dataset. Automatically-generated links may be formed among datasets, such as atomized datasets, based on inferred or derived dataset attributes, authorized access to protected datasets, etc. In some instances, a user interface may provide a user input (not shown) to facilitate manual linking among datasets. Further, interface 1002 also may include user interface elements 1001, 1003, 1005, 1007, and 1009, each of which may be configured as a user input to generate data signals to initiate a particular function. For example, user interface element 1001 may be configured to generate data signals to associate a short description to the dataset, and user interface element 1003 may be configured to generate data signals to associate "tags" (e.g., key words or symbols) to the dataset so that tags may be used for identifying the subset during, for example, a keyword search. User interface element 1005 may be configured to generate data signals to add files (e.g., .CSV, .XLS, .PDF, etc.), or portions thereof, to creation of a collaborative dataset, whereby added files may automatically linked to a dataset. In some cases, user input 1005 performs similar functions as user input 1014. User interface element 1007 may be configured to generate data signals to associate a narrative to the dataset, whereby the narrative may be of sufficient size to convey sufficient detail to those potential collaborators that may be interested in using the dataset for their own or different purposes. In at least one example, user interface element 1007 may be configured to generate an overlay window (over interface 1002), the overlay window including an interface (not shown) to enter text or other symbols into the interface. In some cases, the interface of the overlay window may include a text-to-HTML conversion too, such as MARKDOWN™ developed by John Gruber. User interface element 1009 may be configured to generate data signals to associate data representing a license, and, thus, optional legal requirements to the dataset. In some examples, selection of user interface elements 1001, 1003, and 1009 may cause transition to another interface, such as interface 1102 of FIG. 11.

Figure 11:
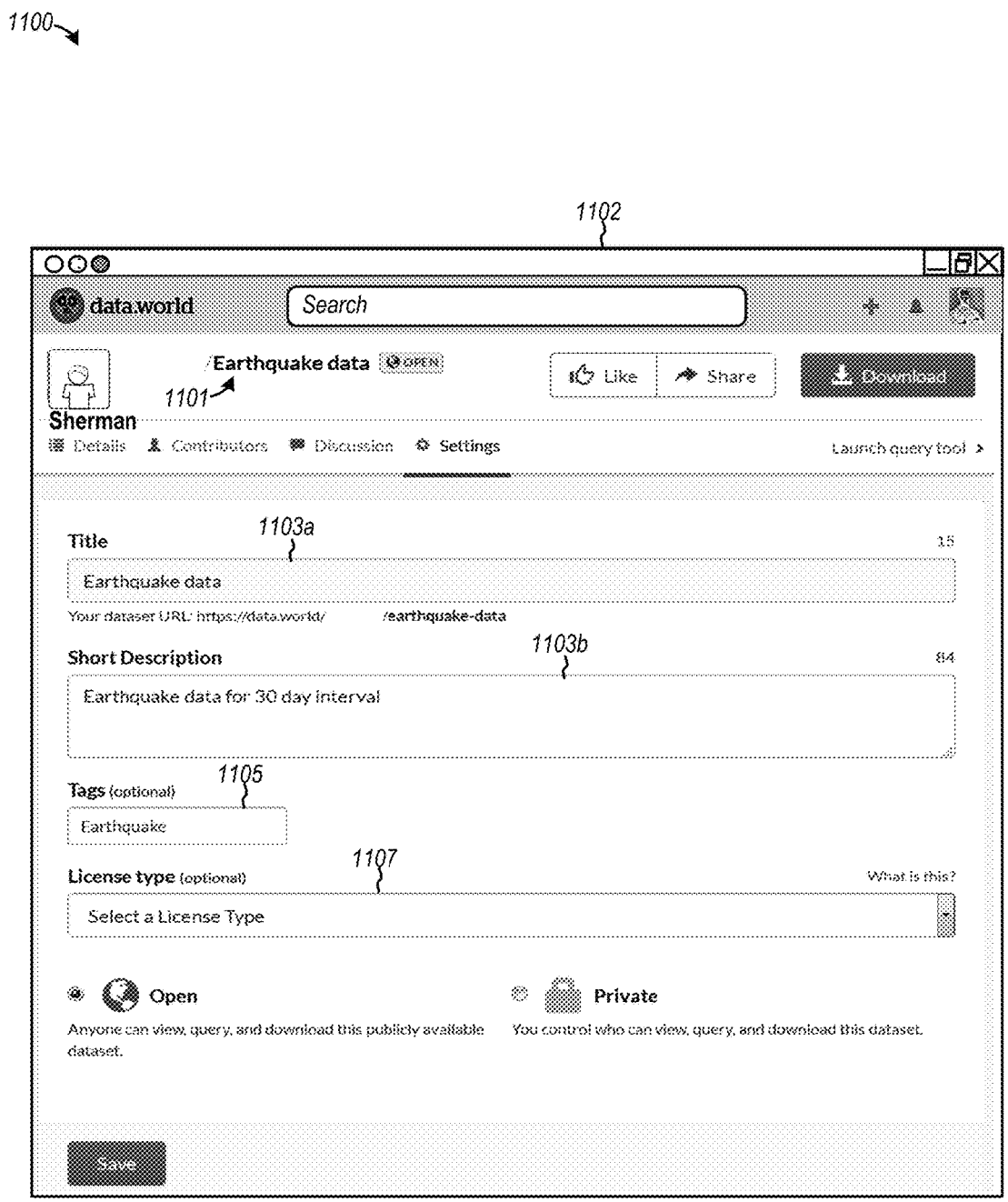
FIG. 11 is a diagram of an example of a user interface configured to enhance dataset attribute data for a dataset, according to some embodiments.

FIG. 11 is a diagram of an example of a user interface configured to enhance dataset attribute data for a dataset, according to some embodiments. Diagram 1100 depicts an interface 1102, which depicts various user interface elements with which to add or modify dataset attributes, which, in turn, may be implemented as metadata. As shown, a dataset title field 1103a may be configured to accept text inputs to associate "earthquake" and "data" to a dataset identified as dataset ("/Earthquake data") 1101. User interface 1102 may also include the following user interface elements: (1) a description field 1103b to enter a description of the dataset, (2) a tag field 1105 to add any number of tags, and (3) a pull-down menu 1107 to select an applicable license type for accessing and using the data of dataset 1101. In some examples, user interface elements 1001, 1003, and 1009 of FIG. 10 may cause a transition to a user interface 1102 of FIG. 11 to enter data in description field 1103b, tag field 1105, and pull-down menu 1107, respectively. According to some examples, activation of pull-down menu 1107 may expose any of the following license types for selection, and, thus association to dataset 1101: Public Domain Dedication Statement, Open Data Commons Public Domain Dedication and License ("PDDL"), Public Domain Dedication License ("CCO 1.0 Universal"), Attribution 2.0 Generic License ("CC BY 2.0"), Open Data Commons Attribution License ("ODC-BY"), Attribution-ShareAlike 3.0 Unported ("CC BY-SA 3.0"), Open Data Commons Open Database License ("ODbL"), Attribution-NonCommercial-ShareAlike ("CC BY-NC-SA"), among other license types.

Figure 12:
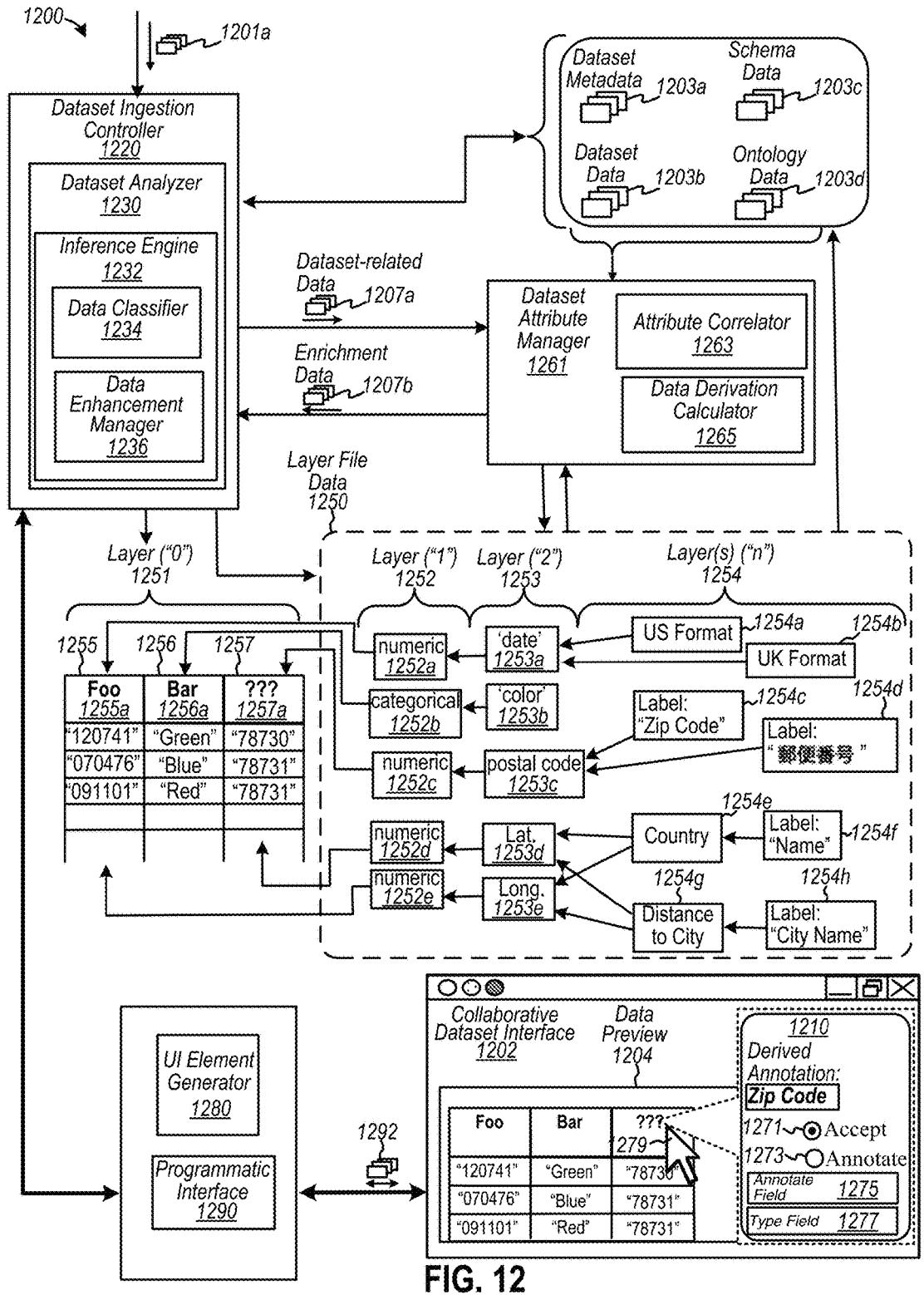
FIG. 12 is a diagram depicting an example of a data ingestion controller configured to generate a set of layer data files, according to some examples.

FIG. 12 is a diagram depicting an example of a data ingestion controller configured to generate a set of layer data files, according to some examples. Diagram 1200 depicts a dataset ingestion controller 1220 communicatively coupled to a dataset attribution manager 1261, and is further coupled communicatively to one or both of a user interface ("UP") element generator 1280 and a programmatic interface 1290 to exchange data and/or commands (e.g., executable instructions) with a user interface, such as a collaborative dataset interface 1202. According to various examples, dataset ingestion controller 1220 and its constituent elements may be configured to detect exceptions or anomalies among subsets of data (e.g., columns of data) of an imported or uploaded set of data, and to facilitate corrective actions to negate data anomalies, whether automatically, semi-automatically (e.g., one or more calculated or predicted solutions from which a user may select), and manually (e.g., the user may annotate or otherwise correct exceptions). Further, dataset ingestion controller 1220 may be configured to identify, infer, and/or derive dataset attributes with which to: (1) associate with a dataset via, for example, annotations (e.g., column headers), (2) determine a datatype (e.g., as a dataset attribute) for a subset of data in the dataset, (3) determine an inferred datatype for the subset of data (e.g., as an inferred dataset attribute), (4) determine a data classification for a subset of data in the dataset, (5), determine an inferred data classification, (6) derive one or more data structures, such as the creation of an additional column of data (e.g., temperature data expressed in degrees Fahrenheit) based on a column of temperature data expressed in degrees Celsius, (7) identify similar or equivalent dataset attributes associated with previously-uploaded or previously-accessed datasets to "enrich" the dataset by linking the dataset via the dataset attributes to other datasets, and (8) perform other data actions.

Dataset attribution manager 1261 and its constituent elements may be configured to manage dataset attributes over any number of datasets, including correlating data in a dataset against any number of datasets to, for example, determine a pattern that may be predictive of a dataset attribute. For example, dataset attribution manager 1261 may analyze a column that includes a number of cells that each includes five digits and matches a pattern of valid zip codes. Thus, dataset attribution manager 1261 may classify the column as containing zip code data, which may be used to annotate, for example, a column header as well as forming links to other datasets with zip code data. One or more elements depicted in diagram 1200 of FIG. 12 may include structures and/or functions as similarly-named or similarly-numbered elements depicted in other drawings, or as otherwise described herein, in accordance with one or more examples. Note, too, that while data structures described in this example, as well as in other examples described herein, may refer to a tabular data format, various implementation herein may be described in the context of any type of data arrangement. The descriptions of using a tabular data structure are illustrative and are not intended to be limiting. Therefore, the various implementations described herein may be applied to many other data structures.

Dataset ingestion controller 1220, at least in some embodiments, may be configured to generate layer file data 1250, which may include a number of data arrangements that each may constitute a layer file. Notably, a layer file may be used to enhance, modify or annotate data associated with a dataset, and may be implemented as a function of contextual data, which includes data specifying one or more characteristics of the context or usage of the data. Data and datasets may be enhanced, modified or annotated based on contextual data, such as data-related characteristics (e.g., type of data, qualities and quantities of data accesses, including queries, purpose or objective of datasets, such as deriving vaccines for Zika virus, etc.), time of day, user-related characteristics (e.g., type of user, demographics of user, citizenship of user, location of user, etc.), and other contextually-related characteristics that may guide creation of a dataset or the linking thereof. Note, too, that the use of layer files need not modify the underlying data. Further to the example shown, a layer file may include a link or pointer that references a location (directly or indirectly) at which related dataset data persists or may be accessed. Arrowheads are used in this example to depict references to layered data. A layer file may include layer property information describing how to treat (i.e., use) the data in the dataset (e.g., functionally, visually, etc.). In some instances, "layer files" may be layered upon (e.g., in reference to) another layer, whereby layers may be added, for example, to sequentially augment underlying data of the dataset. Therefore, layer files may provide enhanced information regarding an atomized dataset, and adaptability to present data or consume data based on the context (e.g., based on a user or data practitioner viewing or querying the data, a time of day, a location of the user, the dataset attributes associated with linked datasets, etc.). A system of layer files may be adaptive to add or remove data items, under control of the dataset ingestion controller 1220 (or any of its constituent components), at the various layers responsive to expansions and modifications of datasets (e.g., responsive to additional data, such as annotations, references, statistics, etc.).

To illustrate generation of layer file data 1250, consider the following example. Dataset ingestion controller 1220 is configured to receive data from data file 1201a, which may be arranged in a tabular format including columns and rows (e.g., based on .XLS file format). In this example, the tabular data is depicted at layer ("0") 1251. In this example, layer ("0") 1251 includes a data structure including subsets of data 1255, 1256, and 1257. As shown, subset of data 1255 is shown to be a column of numeric data associated with "Foo" as column header 1255a. Subset of data 1256 is shown to be a column of categorical data (e.g., text strings representing colors) associated with "Bar" as column header 1256a. And subset of data 1257 is a column of string data that may be of numeric datatype and is without an annotated column header ("???") 1257a.

Next, consider operation of dataset ingestion controller 1220 in relation to ingested data ("layer '0'") 1251. Dataset ingestion controller 1220 includes a dataset analyzer 1230, which may be configured to analyze data 1251 to detect data entry exceptions and irregularities (e.g., whether a cell is empty or includes non-useful data, whether a cell includes non-conforming data, whether there are any missing annotations or column headers, etc.). In this example, dataset analyzer 1230 may analyze data in columns of data 1255, 1256, and 1257 to detect that column 1257 is without descriptive data representing a column header 1257a. As shown, dataset analyzer 1230 includes an inference engine 1232 that may be configured to infer or interpret a dataset attribute (e.g., as a derived attribute) based on analyzed data. Further, inference engine 1232 may be configured to infer corrective actions to resolve or compensate for the exceptions and irregularities, and to identify tentative data enrichments (e.g., by joining with, or linking to, other datasets) to extend the data beyond that which is in data file 1201a. So in this example, dataset analyzer 1230 may instruct inference engine 1232 to participate in correcting the absence of the column description.

Inference engine 1232 is shown to include a data classifier 1234, which may be configured to classify subsets of data (e.g., each subset of data as a column) in data file 1201a as a particular data classification, such as a particular data type, a particular annotation, etc. According to some examples, data classifier 1234 may be configured to analyze a column of data to infer a datatype of the data in the column. For instance, data classifier 1234 may analyze the column data to automatically infer that the columns include one of the following datatypes: an integer, a string, a Boolean data item, a categorical data item, a time, etc. In the example shown, data classifier 1234 may determine or infer, automatically or otherwise, that data in columns 1255 and 1256 are a numeric datatype and categorical data type, respectively, and such information may be stored as dataset attribute ("numeric") 1252a and dataset attribute ("categorical") 1252b at layer ("1") 1252 (e.g., in a layer file). Similarly, data classifier 1234 may determine or infer data in column 1257 is a numeric datatype and may be stored as dataset attribute ("numeric") 1252c at layer 1252. The dataset attributes in layer 1252 are shown to reference respective columns via, for example, pointers.

Data classifier 1234 may be configured to analyze a column of data to infer or derive a data classification for the data in the column. In some examples, a datatype, a data classification, etc., as well any dataset attribute, may be derived based on known data or information (e.g., annotations), or based on predictive inferences using patterns in data 1203a to 1203d. As an example of the former, consider that data classifier 1234 may determine data in columns 1255 and 1256 can be classified as a "date" (e.g., MM/DD/YYYY) and a "color," respectively. "Foo" 1255a, as an annotation, may represent the word "date," which can replace "Foo" (not shown). Similarly, "Bar" 1256a may be an annotation that represents the word "color," which can replace "Bar" (not shown). Using text-based annotations, data classifier 1234 may be configured to classify the data in columns 1255 and 1256 as "date information" and "color information," respectively. Data classifier 1234 may generate data representing as dataset attributes ("date") 1253a and ("color") 1252b for storage as at layer ("2") 1253 of a layer file, or in any other layer file that references dataset attributes 1252a and 1252b at layer 1252. As to the latter, a datatype, a data classification, etc., as well any dataset attribute, may be derived based on predictive inferences (e.g., via machine learning, etc.) using patterns in data 1203a to 1203d. In this case, inference engine 1232 and/or data classifier 1234 may detect an absence of annotations for column header 1257a, and may infer that the numeric values in column 1257 each includes five digits, and match patterns of number indicative of valid zip codes. Thus, dataset classifier 1234 may be configured to classify (e.g., automatically) the digits as constituting a "zip code," and to generate, for example, an annotation "postal code" to store as dataset attribute 1253c. While not shown in FIG. 12, consider another illustrative example. Data classifier 1234 may be configured to "infer" that two letters in a "column of data" (not shown) of a tabular, pre-atomized dataset includes country codes. As such, data classifier 1234 may "derive" an annotation (e.g., representing a data type, data classification, etc.) as a "country code," such country codes AF, BR, CA, CN, DE, JP, MX, UK, US, etc. Therefore, the derived classification of "country code" may be referred to as a derived attribute, which, for example, may be stored in one or more layer files in layer file data 1250.

Also, a dataset attribute, datatype, a data classification, etc. may be derived based on, for example, data from user interface data 1292 (e.g., based on data representing an annotation entered via user interface 1202). As shown, collaborative dataset interface 1202 is configured to present a data preview 1204 of the set of data 1201*a* (or dataset thereof), with "???" indicating that a description or annotation is not included. A user may move a cursor, a pointing device, such as pointer 1279, or any other instrument (e.g., including a finger on a touch-sensitive display) to hover or select the column header cell. An overlay interface 1210 may be presented over collaborative dataset interface 1202, with a proposed derived dataset attribute "Zip Code." If the inference or prediction is adequate, then an annotation directed to "zip code" may be generated (e.g., semi-automatically) upon accepting the derived dataset attribute at input 1271. Or, should the proposed derived dataset attribute be undesired, then a replacement annotation may be entered into annotate field 1275 (e.g., manually), along with entry of a datatype in type field 1277. To implement, the replacement annotation will be applied as dataset attribute 1253*c* upon activation of user input 1273. Thus, the "postal code" may be an inferred dataset attribute (e.g., a "derived annotation") and may indicate a column of 5 integer digits that can be classified as a "zip code," which may be stored as annotative description data stored at layer two 1253 (e.g., in a layer two ("L2") file). Thus, the "postal code," as a "derived annotation," may be linked to the classification of "numeric" at layer one 1252. In turn, layer one 1252 data may be linked to 5 digits in a column at layer zero 1251). Therefore, an annotation, such as a column header (or any metadata associated with a subset of data in a dataset), may be derived based on inferred or derived dataset attributes, as described herein.

Further to the example in diagram 1200, additional layers ("n") 1254 may be added to supplement the use of the dataset based on "context." For example, dataset attributes 1254*a* and 1254*b* may indicate a date to be expressed in U.S. format (e.g., MMDDYYYY) or U.K. format (e.g., DDM-MYYYY). Expressing the date in either the US or UK format may be based on context, such as detecting a computing mobile device is in either the United States or the United Kingdom. In some examples, data enrichment manager 1236 may include logic to determine the applicability of a specific one of dataset attributes 1254*a* and 1254*b* based on the context. In another example, dataset attributes 1254*c* and 1254*d* may indicate a text label for the postal code ought to be expressed in either English or in Japanese. Expressing the text in either English or Japanese may be based on context, such as detecting a computing mobile device is in either the United States or Japan. Note that a "context" with which to invoke different data usages or presentations may be based on any number of dataset attributes and their values, among other things.

In yet another example, data classifier 1234 may classify a column of numbers as either a latitudinal or longitudinal coordinate and may be formed as a derived dataset attribute for a particular column, which, in turn, may provide for an annotation describing geographic location information (e.g., as a dataset attribute). For instance, consider dataset attributes 1252*d* and 1252*e* describe numeric datatypes for columns 1255 and 1257, respectively, and dataset attributes 1253*d* and 1253*e* are classified as latitudinal coordinates in column 1255 and longitudinal coordinates in column 1257. Dataset attribute 1254*e*, which identifies a "country" that references dataset attributes 1253*d* and 1253, is shown associated with a dataset attribute 1254*f*, which is an annotation as a name of the country and references dataset attribute 1254*e*. Similarly, dataset attribute 1254*g*, which identifies a "distance to a nearest city" (e.g., a city having a threshold least a certain population level), may reference dataset attributes 1253*d* and 1253*e*. Further, a dataset attribute 1254*h*, which is an annotation as a name of the city for dataset attribute 1254*g*, is also shown stored in a layer file at layer 1254.

Dataset attribution manager 1261 may include an attribute correlator 1263 and a data derivation calculator 1265. Attribute correlator 1263 may be configured to receive data, including attribute data (e.g., dataset attribute data), from dataset ingestion controller 1220, as well as data from data sources (e.g., UI-related/user inputted data 1292, and data 1203*a* to 1203*d*), and from system repositories (not shown). Attribute correlator 1263 may be configured to analyze the data to detect patterns or data classifications that may resolve an issue, by "learning" or probabilistically predicting a dataset attribute through the use of Bayesian networks, clustering analysis, as well as other known machine learning techniques or deep-learning techniques (e.g., including any known artificial intelligence techniques). Attribute correlator 1263 may further be configured to analyze data in dataset 1201*a*, and based on that analysis, attribute correlator 1263 may be configured to recommend or implement one or more added or modified columns of data. To illustrate, consider that attribute correlator 1263 may be configured to derive a specific correlation based on data 1207*a* that describe two (2) columns 1255 and 1257, whereby those two columns are sufficient to add a new column as a derived column.

In some cases, data derivation calculator 1265 may be configured to derive the data in a new column mathematically via one or more formulae, or by performing any computational calculation. First, consider that dataset attribute manager 1261, or any of its constituent elements, may be configured to generate a new derived column including the "name" 1254*f* of the "country" 1254*e* associated with a geolocation indicated by latitudinal and longitudinal coordinates in columns 1255 and 1257. This new column may be added to layer 1251 data, or it can optionally replace columns 1255 and 1257. Second, consider that dataset attribute manager 1261, or any of its constituent elements, may be configured to generate a new derived column including the "distance to city" 1254*g* (e.g., a distance between the geolocation and the city). In some examples, data derivation calculator 1265 may be configured to compute a linear distance between a geolocation of, for example, an earthquake and a nearest city of a population over 100,000 denizens. Data derivation calculator 1265 may also be configured to convert or modify units (e.g., from kilometers to miles) to form modified units based on the context, such as the user of the data practitioner. The new column may be added to layer 1251 data. One example of a derived column is described in FIG. 13 and elsewhere herein. Therefore, additional data may be used to form, for example, additional "triples" to enrich or augment the initial dataset.

Inference engine 1232 is shown to also include a dataset enrichment manager 1236. Data enrichment manager 1236 may be configured to analyze data file 1201*a* relative to dataset-related data to determine correlations among dataset attributes of data file 1201*a* and other datasets 1203*b* (and attributes, such as dataset metadata 1203*a*), as well as schema data 1203*c*, ontology data 1203*d*, and other sources of data. In some examples, data enrichment manager 1236 may be configured to identify correlated datasets based on correlated attributes as determined, for example, by attribute correlator 1263 via enrichment data 1207*b* that may include probabilistic or predictive data specifying, for example, a data classification or a link to other datasets to enrich a dataset. The correlated attributes, as generated by attribute correlator 1263, may facilitate the use of derived data or link-related data, as attributes, to form associate, combine, join, or merge datasets to form collaborative datasets. To illustrate, consider that a subset of separately-uploaded datasets are included in dataset data 1203b, whereby each of these datasets in the subset include at least one similar or common dataset attribute that may be correlatable among datasets. For instance, each of datasets in the subset may include a column of data specifying "zip code" data. Thus, each of datasets may be "linked" together via the zip code data. A subsequently-uploaded set of data into dataset ingestion controller 1220 that is determined to include zip code data may be linked via this dataset attribute to the subset of datasets 1203b. Therefore, a dataset formatted based on data file 1201a (e.g., as an annotated tabular data file, or as a CSV file) may be "enriched," for example, by associating links between the dataset of data file 1201a and other datasets 1203b to form a collaborative dataset having, for example, and atomized data format.

Figure 13:
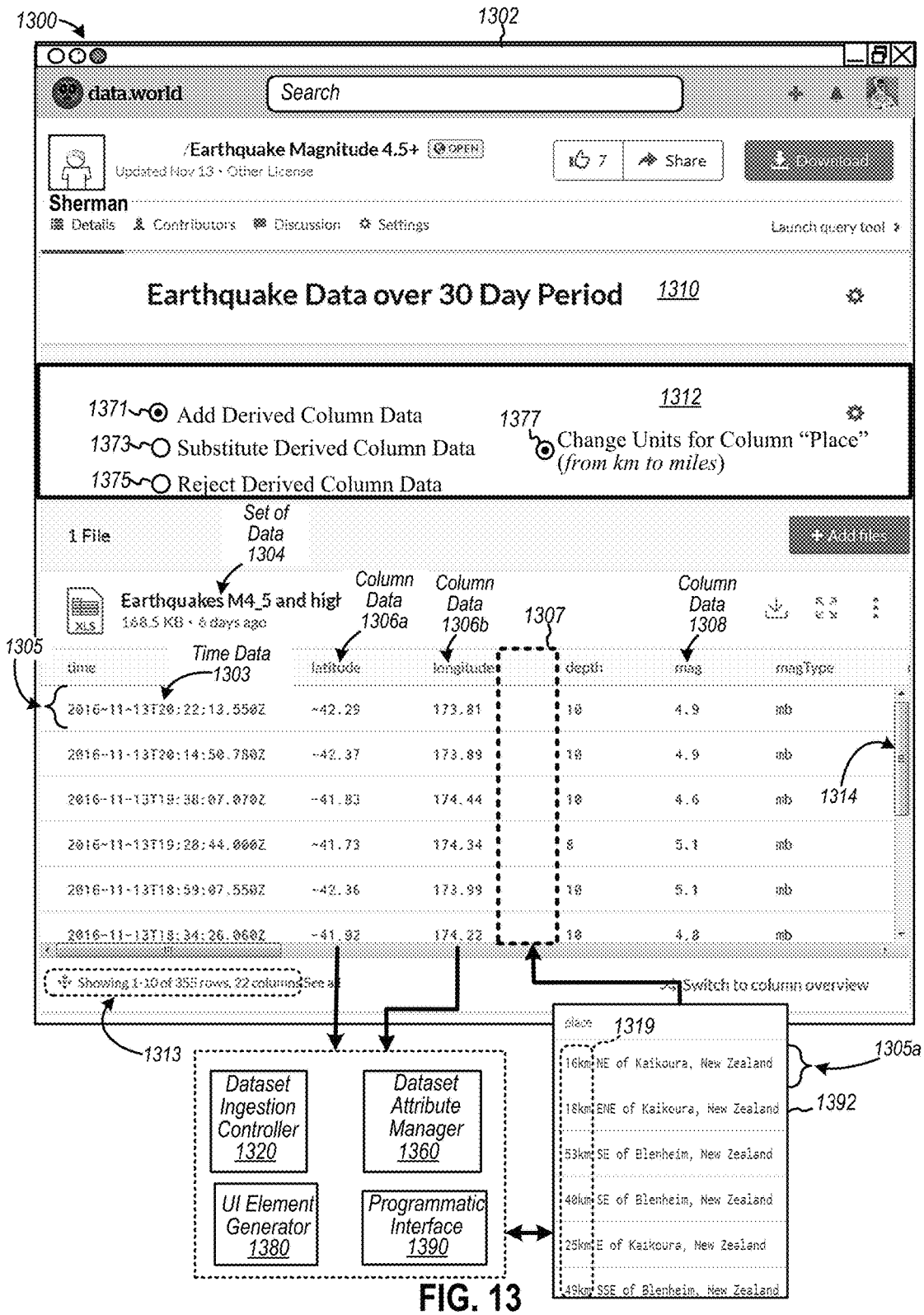
FIG. 13 is a diagram depicting a user interface in association with generation and presentation of the derived subset of data, according to some examples.

FIG. 13 is a diagram depicting a user interface in association with generation and presentation of the derived subset of data, according to some examples. Diagram 1300 depicts a user interface 1302 as an example of a computerized tool to modify collaborative datasets and to present such modified datasets automatically, semi-automatically, or manually. User interface 1302 presents the data preview of a dataset that includes earthquake data and is entitled "Earthquake Data over 30 Day Period" 1310. Data preview mode 1313 indicates that rows 1-10 of set of data 1304, which includes 355 rows and 22 columns of data, are available to preview via a user interface element 1314 (e.g., via "scroll bar"). The dataset originates from a set of data 1304, which is entitled "Earthquakes M4_5 and higher" and includes data describing geolocations, among other things (e.g., earthquake magnitudes, etc.), related to earthquakes having a magnitude 4.5 or higher.

Diagram 1300 depicts a dataset ingestion controller 1320, a dataset attribute manager 1360, a user interface generator 1380, and a programmatic interface 1390 configured to generate a derived column 1392 and to present user interface elements 1312 to determine data signals to control modification of the dataset. One or more elements depicted in diagram 1300 of FIG. 13 may include structures and/or functions as similarly-named or similarly-numbered elements depicted in other drawings, or as otherwise described herein, in accordance with one or more examples. As shown, the dataset may be presented in a tabular format arranged in rows of data in accordance with a specific time (e.g., column 1303 data). The dataset is shown to include column data 1306a (i.e., latitude coordinates), column data 1306b (i.e., longitude coordinates), a column including depth data (e.g., depth of earthquake in kilometers from surface), a column 1308 including magnitude data (e.g., size of earthquake), a column including a type of magnitude of the earthquake (e.g., magnitude type "mb" refers to an earthquake magnitude based on a short period body wave to compute the amplitude of a P body-wave).

Logic in one or more of dataset ingestion controller 1320, dataset attribute manager 1360, user interface generator 1380, and programmatic interface 1390 may be configured to analyze columns of data, such as latitude column data 1306a and longitude column data 1306b, to determine whether to derive one or more dataset attributes that may represent a derived column of data. In the example shown, the logic is configured to generate a derived column 1392, which may be presented automatically in portion 1307 of user interface 1302 as an additionally-derived column. As shown, derived column 1392 may include an annotated column heading "place," which may be determined automatically or otherwise. Hence, the "place" of an earthquake can be calculated (e.g., using a data derivation calculator or other logic) to determine a geographic location based on latitude and longitude data of an earthquake event (e.g., column data 1306a and 1306b) at a distance 1319 from a location of a nearest city. For example, an earthquake event and its data in row 1305 may include derived distance data of "16 km," as a distance 1319, from a nearest city "Kaikoura, New Zealand" in derived row portion 1305a. According to some examples, a data derivation calculator or other logic may perform computations to convert 16 km into units of miles and store that data in a layer file. Data in derived column 1392 may be stored in a layer file that references the underlying data of the dataset.

Further to user interface elements 1312, a number of user inputs may be activated to guide the generation of a modify dataset. For example, input 1371 may be activated to add derived column 1392 to the dataset. Input 1373 may be activated to substitute and replace columns 1306a and 1306b with derived column 1392. Input 1375 may be activated to reject the implementation of derived column 1392. In some examples, input 1377 may be activated to manually convert units of distance from kilometers to miles. The generation of the derived column 1392 is but one example, and various numbers and types of derived columns (and data thereof) may be determined.

Figure 14:
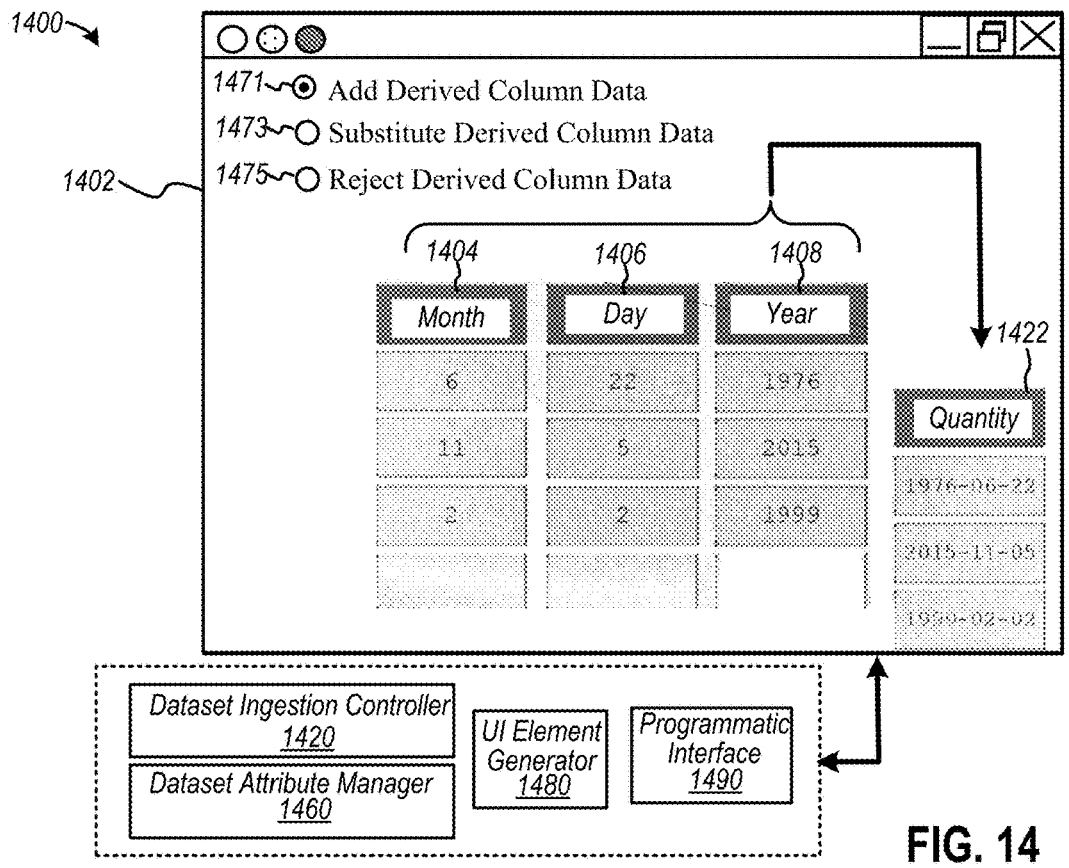
FIGS. 14 and 15 are diagrams depicting examples of generating and presenting derived columns and derived data, according to some examples.
Figure 15:
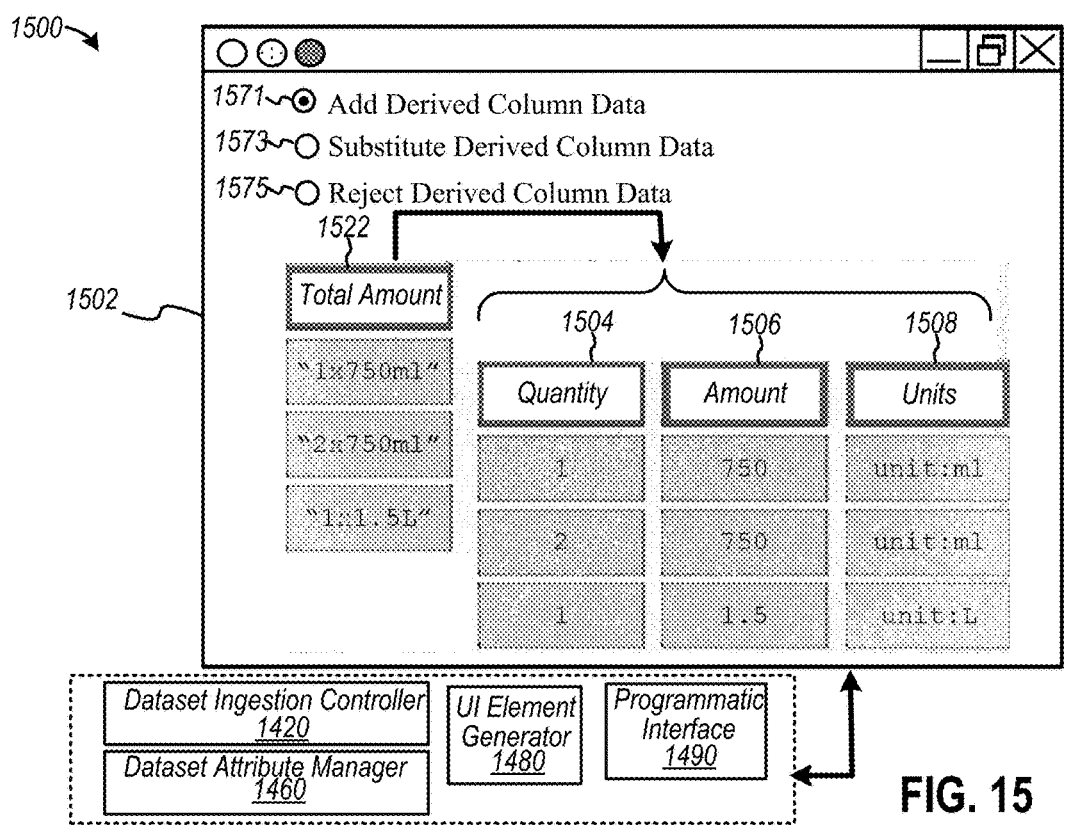

FIGS. 14 and 15 are diagrams depicting examples of generating derived columns and derived data, according to some examples. Diagram 1400 of FIG. 14 and diagram 1500 of FIG. 15 depict a dataset ingestion controller 1420, a dataset attribute manager 1460, a user interface generator 1480, and a programmatic interface 1490, one or more of which includes logic configured to each generate one or more derived columns. One or more elements depicted in diagrams 1400 and 1500 may include structures and/or functions as similarly-named or similarly-numbered elements depicted in other drawings, or as otherwise described herein, in accordance with one or more examples.

In diagram 1400, the logic may be configured to generate derived column 1422 (e.g., automatically) based on aggregating data in column 1404, which includes data representing a month, data in column 1406, which includes data representing a day, and data in column 1408, which includes data representing a year. Column 1422 may be viewed as a collapsed version of columns 1404, 1406, and 1408, according to some examples. Therefore, the logic can generate derived column 1422 that can be presented in user interface 1402 in a particular date format. Note, too, that column annotations, such as "month," "day," "year," and "quantity," can be used for linking and searching datasets as described herein. Further, diagram 1400 depicts that a user interface 1402 may optionally include user interface elements 1471, 1473, and 1475 to determine data signals to control modification of the dataset for respectively "adding," "substituting," or "rejecting," mentation of derived column data.

In diagram 1500, the logic may be configured to generate derived columns 1504, 1506, and 1508 based on data in column 1522 and related data characteristics. Derived columns 1504, 1506, and 1508 may also be presented in user interface 1502. Derived columns 1504, 1506, and 1508 may be viewed as expanded versions of column 1522, according to some examples. Therefore, the logic can extract data with which to, for example, infer additional or separate datatypes or data classifications. For example, the logic may be configured to split or otherwise transform (e.g., automatically) data in column 1522, which represents a "total amount," into derived column 1504, which represents a quantity, derived column 1506, which represents an amount, and derived column 1508, which includes data representing a unit type (e.g., milliliter, or "ml"). Note, too, that column annotations, such as "total amount," "quantity," "amount," and "units," can be used for linking and searching datasets as described herein. Further, diagram 1500 depicts that a user interface 1502 may optionally include user interface elements 1571, 1573, and 1575 to determine data signals to control modification of the dataset for respectively "adding," "substituting," or "rejecting," implementation of derived column data.

Figure 16:
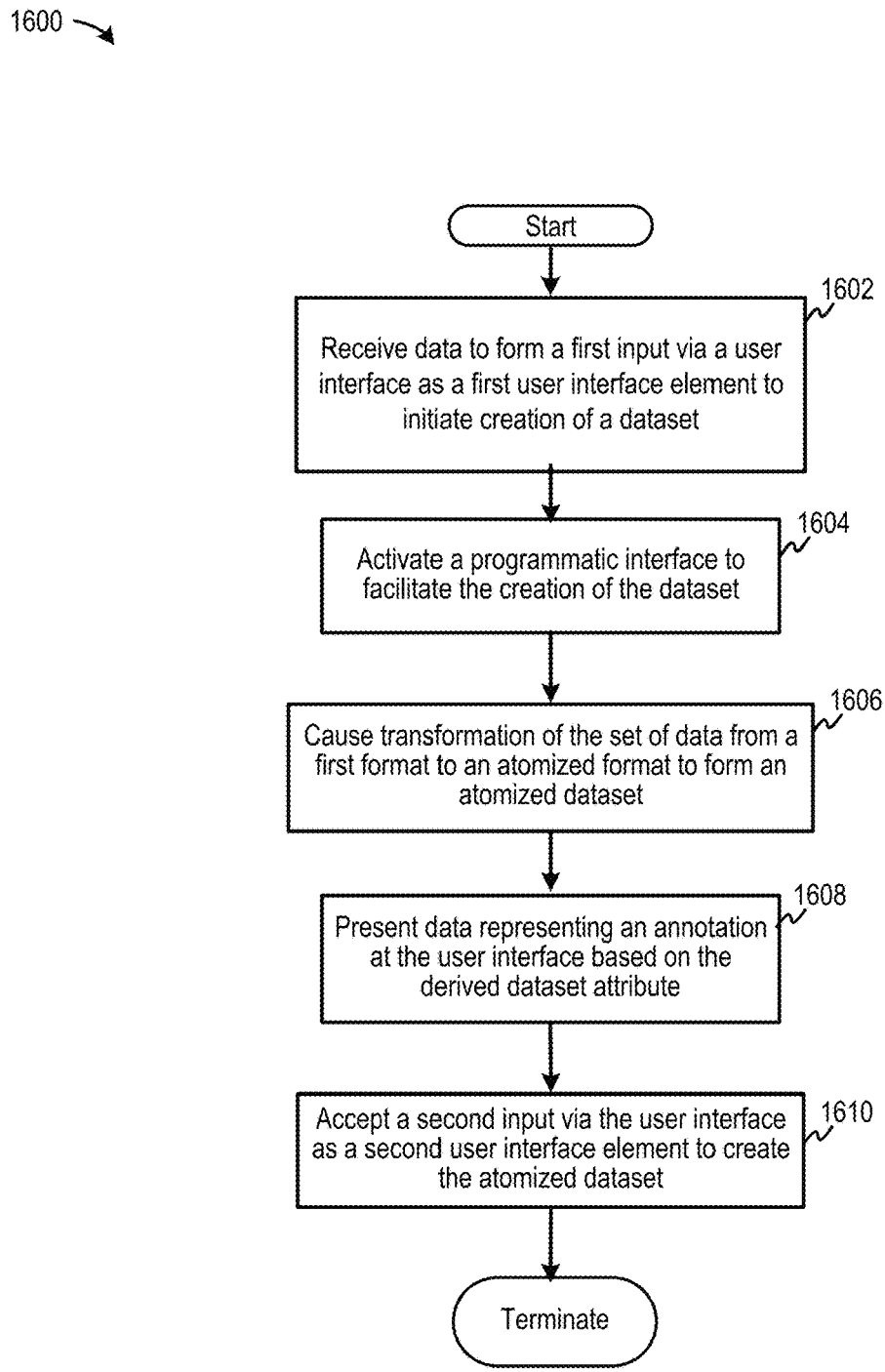
FIG. 16 is a diagram depicting a flow diagram as an example of enhanced collaborative dataset creation based on a derived dataset attribute, according to some embodiments.

FIG. 16 is a diagram depicting a flow diagram as an example of enhanced collaborative dataset creation based on a derived dataset attribute, according to some embodiments. Flow 1600 may be an example of initiating creation of the dataset, such as a collaborative dataset, based on a derived dataset attribute that is derived from a set of data. In some examples, flow 1600 may be implemented in association with a user interface. At 1602, data to form an input (as a user interface element) may be received via a user interface. For example, a processor executing instruction data at a client computing device (or any other type of computing device, including a server computing device) may receive data to form a user interface element, which may constitute a user input that may be presented in a user interface as, for example, a "create dataset" user input. In one or more cases, activation of a "create dataset" user input can initiate creation of an atomized dataset based on the set of data, which, for example, may be raw data in data file (e.g., a tabular data file, such as a XLS file, etc.). According to some examples, a data preview of subsets of data may be presented in the user interface, the data preview showing portions of a dataset or set of data. A data preview may be generated (e.g., by a user interface element generator) to depict each subset of data as a column of data. In one example, a data view of a column of data may be presented with an unknown dataset attribute, whereby data may be received to annotate a column header to form an annotation to resolve the unknown dataset attribute. The annotation may refer to a datatype, a data classification, or the like. An example of an unknown dataset attribute is depicted as unknown column header ("???") 1257a of FIG. 12.

Referring back to FIG. 16, a programmatic interface may be activated at 1604 to facilitate the derivation of the dataset attribute that may be used in the creation of a dataset responsive to receiving the first input. The programmatic interface may be implemented as either hardware or software, or a combination thereof. In some examples, the programmatic interface may be distributed as subsets of executable code (e.g., as scripts, etc.) to implement APIs in any number of computing devices. In some embodiments, programmatic interface may be optional and may be omitted.

At 1606, the set of data may be transformed from a first format to an atomized format to form an atomized dataset. In some examples, a request to initiate creation of the dataset may cause transformation of a dataset by, for example, deriving a dataset attribute based a subset of data. The derived dataset attribute may be used to form an annotation (e.g., derived annotation), or to form a derived column of data in which data is derived from one or more other subsets of data in a dataset, or from any other source of data. As such, an atomized dataset may be generated to include data points associated with derived data. The atomized dataset may be stored in a graph data structure, according to some examples. In various examples, the transformation into an atomized dataset, which includes one or more derived dataset attributes, may be performed at a client computing device, a server computing device, or a combination of multiple computing devices.

At 1608, data representing an annotation may be presented at the user interface, the annotation being based on the derived dataset attribute for the subset of data. Therefore, one or more various examples of logic, as described herein, may be implemented to form derived subsets of data, such as derived columns, which may be used to visually convey an enhanced dataset that can be analyzed in relation to an objective or theory. Further, a user interface may be used to manipulate the dataset and its subsets of data, including derived subsets of data. Derived dataset attributes, derived data, and derived data arrangements (e.g., derived columns) may be used to facilitate linking to other datasets, including protected datasets. Additional user interface elements, such as a "link" user input 137 of FIG. 1, may be presented on a user interface to facilitate linking of atomized datasets based on annotations associated with derived dataset attributes (e.g., responsive to input from a data practitioner in view of insight information, dataset activity feed information, etc.).

At 1610, a second input may be accepted via the user interface (e.g., in association with a processor) using a second user interface element to create an atomized dataset. In some cases, the second user interface element may be presented as the annotation, which, in turn, may be associated with a column of data. Thus, activation of the second input may be configured to cause linking between the atomized dataset and to another dataset based on the annotation. In other examples, the second input may be configured to invoke, upon activation, other data operations and functions.

Figure 17:
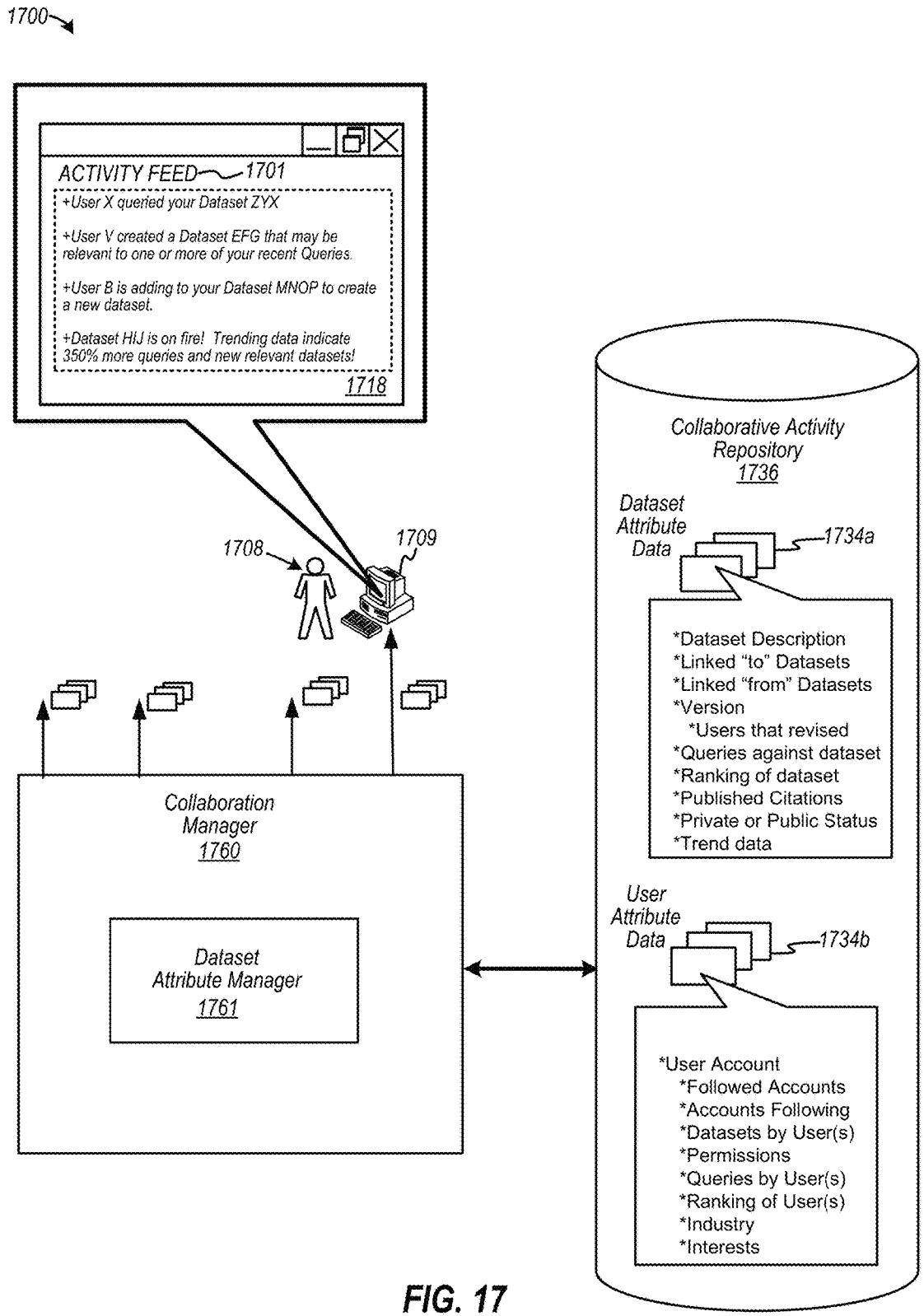
FIG. 17 is a diagram depicting an example of a collaboration manager configured to present collaborative information regarding collaborative datasets, according to some embodiments.

FIG. 17 is a diagram depicting an example of a collaboration manager configured to present collaborative information regarding collaborative datasets, according to some embodiments. Diagram 1700 depicts a collaboration manager 1760 including a dataset attribute manager 1761, and coupled to a collaborative activity repository 1736. In this example, dataset attribute manager 1761 is configured to monitor updates and changes to various subsets of data representing dataset attribute data 1734a and various subsets of data representing user attribute data 1734b, and to identify such updates and changes. Further, dataset attribute manager 1761 can be configured to determine which users, such as user 1708, ought to be presented with activity data for presentation via a computing device 1709 in a user interface 1718. In some examples, dataset attribute manager 1761 can be configured to manage dataset attributes associated with one or more atomized datasets. For example, dataset attribute manager 1761 can be configured to analyzing atomized datasets and, for instance, identify a number of queries associated with a atomized dataset, or a subset of account identifiers (e.g., of other users) that include descriptive data that may be correlated to the atomized dataset. To illustrate, consider that other users associated with other account identifiers have generated their own datasets (and metadata), whereby the metadata may include descriptive data (e.g., attribute data) that may be used to generate notifications to interested users of changes, modifications, or activities related to a particular dataset. The notifications may be generated as part of an activity feed presented in a user interface, in some examples.

Collaboration manager 1760 receives the information to be presented to a user 1708 and causes it to be presented at computing device 1709. As an example, the information presented may include a recommendation to a user to review a particular dataset based on, for example, similarities in dataset attribute data (e.g., users interested in Zika-based datasets generated in Brazil may receive recommendation to access a dataset with the latest dataset for Zika cases in Sao Paulo, Brazil). Note the listed types of attribute data monitored by dataset attribute manager 1761 are not intended to be limiting. Therefore, collaborative activity repository 1736 may store other attribute types and attribute-related than is shown.

Figure 18A:
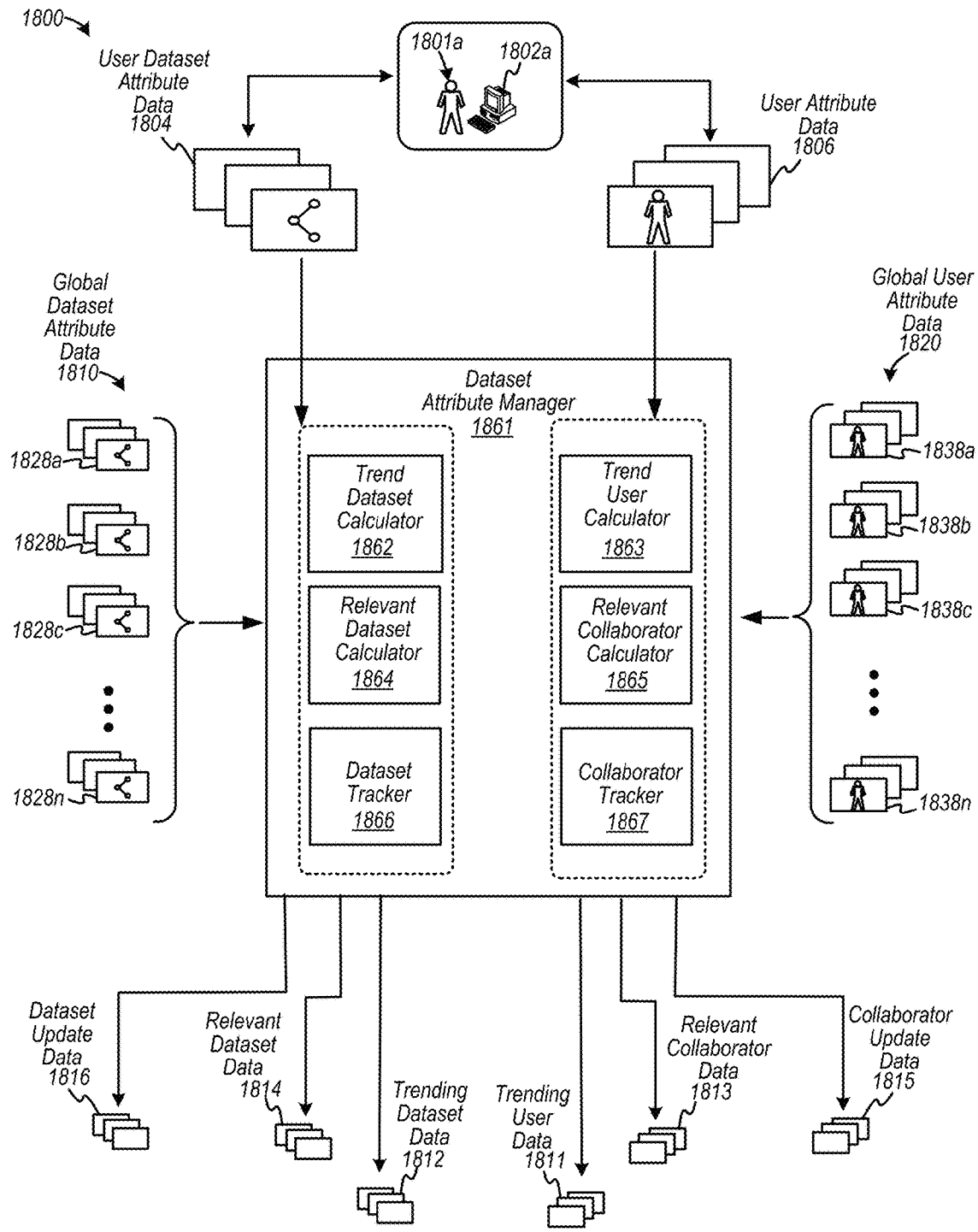
FIG. 18A depicts an example of a dataset attribute manager configured to generate data to enhance datasets, according to some examples.

FIG. 18A depicts an example of a dataset attribute manager configured to generate data to enhance datasets, according to some examples. Diagram 1800 depicts a dataset attribute manager 1861 and one or more of its constituent elements may be configured to correlate, identify, analyze, and summarize datasets and dataset interactions, including correlating, identifying, analyzing, and summarizing user datasets, groups of other user datasets, groups of non-user datasets (e.g., datasets external to collaborative dataset consolidation system), etc. Correlations and dataset interaction summary data may be fed via a dataset activity feed to disseminate dataset-related information via computing device 1802a to user 1801a, as well as via other computing devices (not shown) to other users (not shown). Examples of dataset interaction summary data include trending dataset information, trending user information, relevant dataset information, relevant collaborator, dataset tracking information, collaborator tracking information, and the like. Dataset attribute manager 1861 may be configured to calculate correlations among datasets and dataset interactions and may be further configured to summarize the interactions for presentation via, for example, a dataset activity feed. Dataset interactions may be represented as data specifying whether a particular dataset of has been queried, modified, shared, accessed, created, etc., or an event in which another user commented on a dataset or received a comment for a dataset. Other examples may include data representations via a user interface that conveys a number of queries associated with a dataset, a number of dataset versions, identities of users (or associated user identifiers) who have analyzed a dataset, a number of user comments related to a dataset, the types of comments, etc.). Data practitioners, therefore, may gain additional insights into whether a particular dataset may be relevant based on electronic social interactions among datasets and users. Thus, at least some implementations may be described as "a network for datasets" (e.g., a "social" network of datasets and dataset interactions).

Dataset attribute manager 1861 is configured to identify user dataset attribute data 1804 and user attribute data 1806 associated with a user 1801a via computing device 1802a. Further, dataset attribute manager 1861 may be configured to receive, identify, derive or determine global dataset attribute data 1810 from a pool of dataset data, which may include data representing a community of datasets, a subset of dataset, a superset of datasets (e.g., including all or substantially all datasets identifiable or accessible by dataset attribute manager 1861), as well as interactions therebetween. Also, dataset attribute manager 1861 may be configured to receive, identify, derive or determine global user attribute data 1820 for any number of users, user accounts, etc. Global user attribute data 1820 includes user-related and user account-related data over a community of users.

According to some embodiments, user attribute data 1806 may include user-related characteristics describing a user, a user account, a user computer device system, and other user-related characteristics specifying user interactions with any aspect of a collaborative dataset consolidation system or external thereto. Examples of user attribute data 1806 include, but are not limited to, a geographic location (e.g., of a user, a user computing device, etc.); a user identifier (e.g., a user name, a user account number identifier, etc.); demographic information; a field of interest and/or scientific discipline (e.g., applied mathematics or engineering, chemistry, physics, earth sciences, astronomy, biology, social science, etc.); a profession and/or title; ranking of user 1801a by others (e.g., others in a subset of users, such as user in an organization, a scientific discipline, a country, etc.), etc. Other examples of user attribute data 1806 include, but are not limited to, data in datasets; dataset-related data (e.g., metadata), such as data representing tags; data representing titles and/or descriptions of datasets; data indicating whether the dataset is open, private, or restricted; types and amounts of queries against datasets owned by user 1801a; types and amounts of queries by user 1801a against other datasets; types and amounts of accesses of datasets owned by user 1801a; types and amounts of accesses by user 1801a against other datasets; types of users other datasets with whom user 1801a collaborates; a number or type of users monitoring (e.g., "following") datasets interactions by user 1801a; a number or type of user or dataset interactions that user 1801a follows or monitors; a number or type of comments associated with datasets owned by user 1801a; a number or type of comments applied to datasets owned or managed by user 1801a; a number of citations of one or more datasets owned or managed by user 1801a; a number of citations to one or more other datasets by user 1801a, and the like. Note that the above-identified user attribute data 1806 are examples are not intended to be limiting. Note, too, one or more of the above-identified user attribute data 1806 may be used to determine a "context" of dataset usage, and may be referred to, or implemented as, dataset attributes.

Global dataset attribute data 1810 includes any number of datasets and subsets of dataset attributes 1828a, 1828b, 1828c, and 1828n, one or more of which may be associated with at least one dataset. Subsets of dataset attributes 1828a, 1828b, 1828c, and 1828n may be uniquely-identifiable and accessible via, for example, a collaborative dataset consolidation system. Hence, data representing dataset attributes for subsets of dataset attributes 1828a, 1828b, 1828c, and 1828n may be similar to those included in user dataset attribute data 1804, such as described above.

According to some embodiments, user dataset attribute data 1804 may include dataset-related characteristics describing data of a dataset, metadata or other data associated with a dataset, and other dataset-related characteristics specifying dataset interactions with any aspect of a collaborative dataset consolidation system or external thereto. Examples of user dataset attribute data 1804 include, but are not limited to, data representing quantities or types of links from datasets to a dataset of user 1801a; data representing quantities or types of links from a dataset of user 1801a to multiple datasets; data representing context and/or usage of a dataset (e.g., categorical and numeric descriptions thereof); data representing a number of accesses in association with a dataset (including views or any data interaction with a dataset); data representing a quantity of copies, downloads, modifications, or versions of a dataset; data representing types and quantities of comments associated with the dataset; data representing quantity of votes or ranking for one or more datasets; and the like. Additional examples of user dataset attribute data 1804 include, but are not limited to, a number of distinct data points in a column of data, a number of non-empty cells, a mean value, a minimum value, a maximum value, a standard deviation value, a value of skewness, a value of kurtosis, as well as any other statistical or characteristic data. Note that the above-identified user dataset attribute data 1806 are examples are not intended to be limiting. Note, too, one or more of the above-identified user dataset attribute data 1806 may be used to determine a "context" of dataset usage, and may be referred to, or implemented as, dataset attributes.

Global user attribute data 1820 may include any number of subsets of user attributes 1838a, 1838b, 1838c, and 1838n, one or more of which may be associated with at least one user or user account. Subsets of user attributes 1838a, 1838b, 1838c, and 1838n may be accessible via, for example, a collaborative dataset consolidation system. Hence, data representing user attributes in user attributes 1838a, 1838b, 1838c, and 1838n may be processed similar to those included in user attribute data 1806, such as described above.

Dataset attribute manager 1861 is shown to include a trend dataset calculator 1862, a relevant dataset calculator 1864, and a dataset tracker 1866. Trend dataset calculator 1862 may be configured to determine values (e.g., normalized values, such as standardized values, including z-score determination, or the like) of aggregated dataset attributes (e.g., over a large number of subsets of dataset attributes) with which to compare to a subset of dataset attributes for a dataset to determine, for example, trending information or a rank for the dataset. For example, a particular dataset may have one or more dataset attributes with the following values or representations: a tag "Zika" as a data attribute, a number of 15,891 queries per unit time, and a number of 389 requests to access the dataset. Thus, trend dataset calculator 1862 may be configured to compare these values against, for example, "average" values, which may be calculated by trend dataset calculator 1862. Further, trend dataset calculator 1862 may be configured to compare "Zika" tags, "15,891" queries, and "369" requests to the average values of the aggregated dataset attributes to determine a comparative ranking and/or trend information of the dataset. The comparative ranking and/or trend information may be transmitted via notifications to user interfaces and activity feed portions thereof to disseminate dataset-related updates in real time (or substantially in real-time). Note that trend dataset calculator 1862 (as well as other calculators and logic of dataset attribute manager 1861) is not limited to implementing an "average value" as a comparative value for aggregated dataset attributes, but rather, any other representation, metric (e.g., mean value, etc.), or technique (e.g., use of k-NN algorithms, regression, Bayesian inferences and the like, classification algorithms, including Naïve Bayes classifiers, or any other statistical or empirical technique) to measure or rank a dataset attribute relative to a predominated number of datasets may be implemented, according to various examples. Trend dataset calculator 1862 may generate trending dataset data 1812 to initiate presentation of trending or ranking information on a user interface.

A superset of datasets associated with a superset of users, such as user 1801a, may be associated with global dataset attribute data 1810, which may include aggregated values or indicative values of a predominant number of datasets. For example, each subset 1828a, 1828b, 1828c, and 1828n of dataset attributes may include data representative of an aggregated value (e.g., a normalized value) or representation of a dataset attribute for the superset of datasets (e.g., large numbers of datasets associated with large numbers of users, including, but not limited to all accessible datasets, etc.). As an example, consider that subset 1828a of dataset attributes includes attribute data describing "an average number of links" to other datasets, subset 1828b of dataset attributes includes attribute data describing "an average number of times datasets are returned as a result" of a search, subset 1828c of dataset attributes includes attribute data describing "an average number comments received" in association with datasets, and subset 1828n of dataset attributes includes attribute data describing "an average number of times datasets are queried." Based on these "average" values, which may be generated by trend dataset calculator 1862, dataset attributes values of associated one or more datasets may be compared to the average values of the one or more datasets to determine a comparative ranking and/or trend information, as determined by trend dataset calculator 1862. According to some embodiments, subsets 1828a, 1828b, 1828c, and 1828n of dataset attributes that are identified as corresponding to a superset of users may be used to determine a trend for, or a ranking of, a dataset for a particular user, such as user 1801a relative to the aggregated values or representations of dataset attributes associated with the superset of datasets.

Relevant dataset calculator 1864 of dataset attribute manager 1861 may be configured to determine values of dataset attributes of a particular dataset in global dataset attribute data 1810. Those attributes then can be compared to corresponding similar dataset attributes of user dataset attribute data 1804 to determine, for example, a degree of relevancy between two datasets. By determining a degree of relevancy between a dataset of user 1801a and another dataset associated with global dataset attribute data 1810, relevant dataset calculator 1864 can generate relevant dataset data 1814 that represents a list of datasets 1810 that may be most relevant to user 1801a. Additionally, relevant dataset calculator 1864 may be configured to determine degrees of relevancy for any number of different datasets, whereby the most relevant datasets may be included in an activity feed for a user who may be interested in such datasets. Therefore, user 1801a may identify or learn of a dataset of interest in an expedited manner than otherwise might be the case.

In at least one other example, a user 1801a (or a group of collaborators including user 1801a) may correspond in association with subsets 1828a, 1828b, 1828c, and 1828n of dataset attributes. As a variation of a previous example, consider that the following is relevant to a dataset: subset 1828a of dataset attributes includes attribute data describing "a number of links" to other datasets, subset 1828b of dataset attributes includes attribute data describing "a number of times a dataset is returned as a result" of a search, subset 1828c of dataset attributes includes attribute data describing "a number comments received" in association with a dataset, and subset 1828n of dataset attributes includes attribute data describing "a number of times a dataset has been queried." According to some embodiments, subsets 1828a, 1828b, 1828c, and 1828n of dataset attributes may be identified to determine a degree of relevancy to, for example, user dataset attribute data 1804 to determine whether dataset attributes 1828a, 1828b, 1828c, and 1828n may be relevant to the interests of user 1801a.

Dataset tracker 1866 of dataset attribute manager 1861 maybe configured to monitor and track new, updated, modified, deleted, etc. values of dataset attributes of global dataset attribute data 1810, as well as user dataset attribute data 1804. Thus, dataset tracker 1866 may be configured to determine updates for disseminating via dataset update data 1816 to relevant datasets, users, user accounts, etc. Thus, user 1801a may be notified to identify or learn of a particular dataset interaction that facilitates the update to a dataset of interest. User 1801a then can explore the updates in an expedited manner than otherwise might be the case Dataset attribute manager 1861 also is shown to include a trend user calculator 1863, a relevant collaborator calculator 1865, and a collaborator tracker 1867 that are configured to generate trending user data 1811, relevant collaborator data 1813, and collaborator update data 1815, respectively. According to some examples, trend user calculator 1863, relevant collaborator calculator 1865, and collaborator tracker 1867 may be configured to perform similar or equivalent functions as trend dataset calculator 1862, relevant dataset calculator 1864, and dataset tracker 1866, respectively, but using user attribute data 1806 and global user attribute data 1820. Therefore, trend user calculator 1863 may be configured to determine values of aggregated user attributes (e.g., over a large number of subsets of user attributes) with which to compare to a subset of user attributes for a dataset to determine, for example, trending information or a rank for a user based on global user attribute data 1820. As such, trend user calculator 1863 may be configured to determine, for example, a subset of the most highly-ranked users for a unit of time. An electronic notification may be transmitted via trending user data 1811 to a user interface of computing device 1802a to notify user 1801a of trending users.

Relevant collaborator calculator 1865 may be configured to determine values of user attributes of a particular dataset in global user attribute data 1820 with which to compare to corresponding similar user attributes of user attribute data 1804 to determine, for example, a degree of relevancy between two users or user accounts, or the like. By determining a degree of relevancy between user 1801a and another user associated with global user attribute data 1820, relevant collaborator calculator 1865 can generate relevant collaborator data 1813 for presentation as a notification in a user interface of computing device 1802a. Relevant collaborator data 1813 may present to user 1801a the most relevant collaborators (e.g., a top 10 list of relevant users) so that user 1801a may determine whether to collaborate, or otherwise exchange data electronically with another user to facilitate improvements in the datasets or efforts of user 1801a. Collaborator tracker 1867 may be configured to determine updates to changes in user attributes for disseminating via collaborator update data 1815 to relevant datasets, users, user accounts, etc. (including user 1801a) to alert interested entities of user interactions that may be of interest.

Figure 18B:
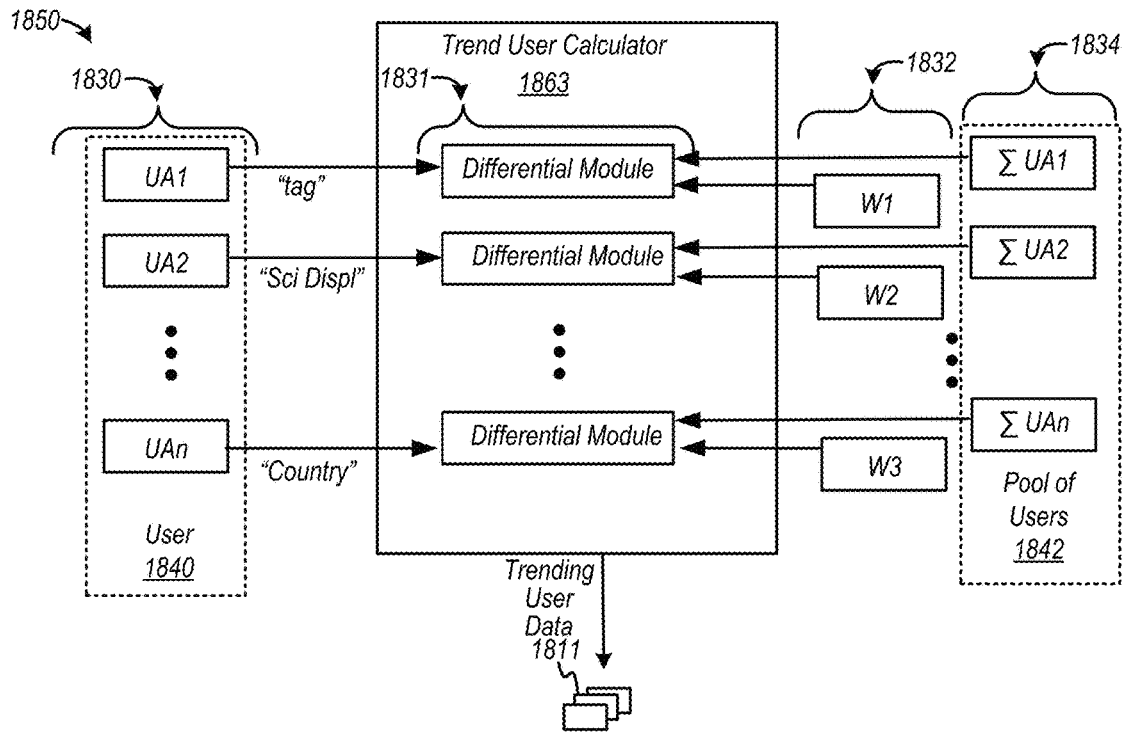
FIGS. 18B and 18C are diagrams that depict examples of calculators to determine trend data and relevancy data relating to collaborative datasets, according to some examples.
Figure 18C:
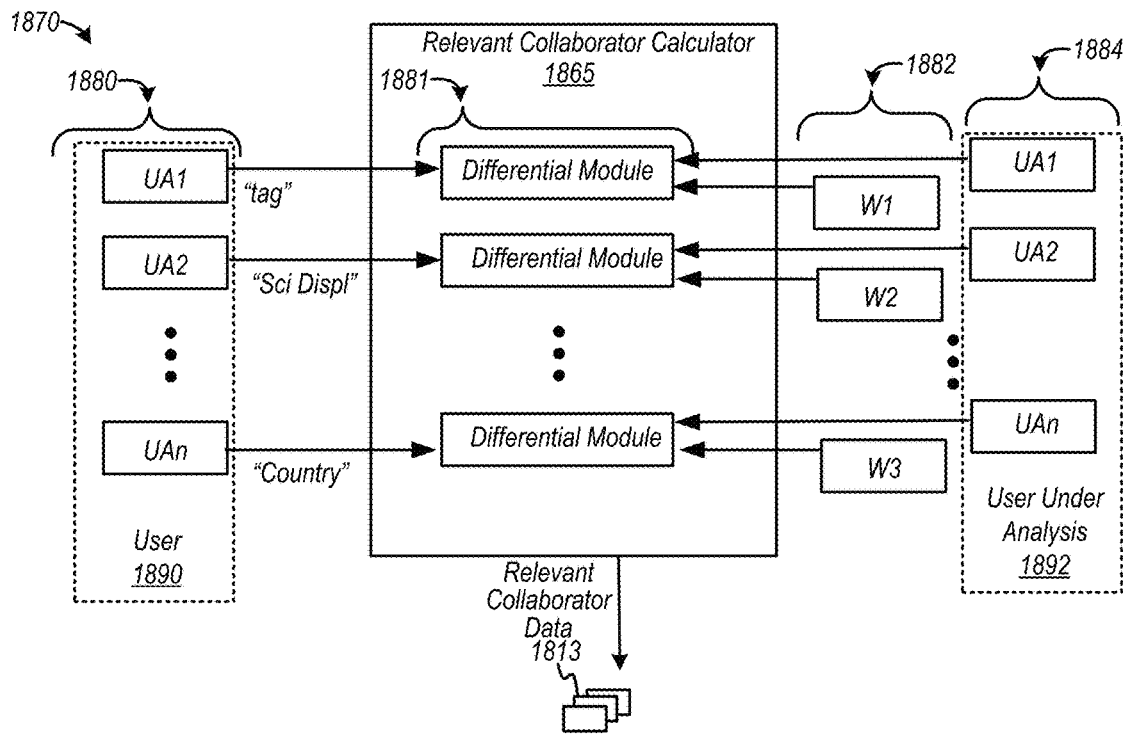

FIGS. 18B and 18C are diagrams that depict examples of calculators to determine trend and relevancy data relating to collaborative datasets, according to some examples. Diagram 1850 of FIG. 18B depicts a trend user calculator 1863 configured to receive user attributes 1830 of a particular user 1840. Trend user calculator 1863 also is configured to receive aggregated user attributes 1834 associated with a pool of users 1842, and data representing a number of weighting factors 1832 to influence operations of trend user calculator 1863. While in some cases, aggregated user attributes 1834 may represent average or mean values for respective attributes, this need not be required. Thus, the values of aggregated user attributes 1834 can be any value for comparing dataset or user attributes to each other. Regardless, each of aggregated user attributes (e.g., UA1, UA2, . . . , UAn) may have a value with which to compare with values of user attributes 1830 to determine a relative ranking of user 1840 in view of pool of users 1842. Values of weighting factors 1832 are configurable to emphasize or deemphasize one or more user attributes in determining trending user data 1811. For example, user attributes associated with any of "tags," scientific discipline ("Sci Displ"), and "country" may be emphasized or deemphasized based on weighting factors 1832.

Trend user calculator 1863 is shown to also include differential modules 1831 configured to detect a value of a user attribute 1830 and determine, for example, a "distance" to a value of an aggregated user attribute 1834. In cases in which the value of user attribute 1830 closely matches, or is near to, a value of an aggregated user attribute 1834, the value of user attribute 1830 is less notable, and, therefore, less likely to be indicative of a trend beyond, for example, the norm. But in cases in which the value of user attribute 1830 diverts relatively significantly from an aggregated user attribute 1834, then user attribute 1830 and the associated dataset may be of greater interest to certain users and datasets. For example, if the value of user attribute 1830, such as a number of "followers," diverges from an average value of "followers," then trending data may indicate that an increased number of other users have requested to "follow" dataset interactions associated with a particular user or dataset. Such increases may indicate that the highly-followed dataset may be perceived as being of high-value to a community of data practitioners. Trend user calculator 1863 can transmit trending user data 1811 to notify potentially interested users in activity feeds. Therefore, potentially interested users may learn quickly of new developments in data science management analytics in real-time or near real-time.

Diagram 1870 of FIG. 18C depicts a relevant collaborator calculator 1865 configured to receive user attributes 1880 of a particular user 1890. Relevant collaborator calculator 1865 also is configured to receive user attributes 1884 associated with a user under analysis 1892 (e.g., a user being analyzed to determine whether the user is relevant to user 1890), and data representing a number of weighting factors 1882 to influence operations of relevant collaborator calculator 1865. While in some cases, user attributes 1884 may represent average or mean values for respective attributes, this need not be required. Thus, the values of user attributes 1884 can be any value for comparing dataset or user attributes to each other. So, each of user attributes 1884 may have a value with which to compare with values of user attributes 1880 to determine a relative relevancy of user under analysis 1892 to user 1890. Values of weighting factors 1882 are configurable to emphasize or deemphasize one or more user attributes in determining relevant collaborator data 1813.

Relevant collaborator calculator 1865 is shown to also include differential modules 1881 configured to detect a value of a user attribute 1880 and determine, for example, a "distance" to a value of user attribute 1884. Unlike the above-described operation of differential modules, when a value of user attribute 1880 closely matches, or is near to, a value of a user attribute 1884, the value of user attribute 1884 is indicative that user attribute 1880 and user attribute 1884 are similar (i.e., relevant) to each other relative to others. For example, if the value of user attributes 1884 include a "tag" (e.g., Zika), a scientific discipline ("Sci Displ") (e.g., biology, including serology and vaccine development), and a "country" (e.g., U.S.A.), that closely match those of user attributes 1880, then a dataset associated with user under analysis 1892 may be relevant to the efforts to user 1890. Relevant collaborator calculator 1865 can transmit relevant collaborator data 1813 to notify potentially interested users in activity feeds. Therefore, potentially interested users may learn quickly of new developments in data science management analytics in real-time or near real-time and can contact or collaborate with newly-found datasets.

Figure 19:
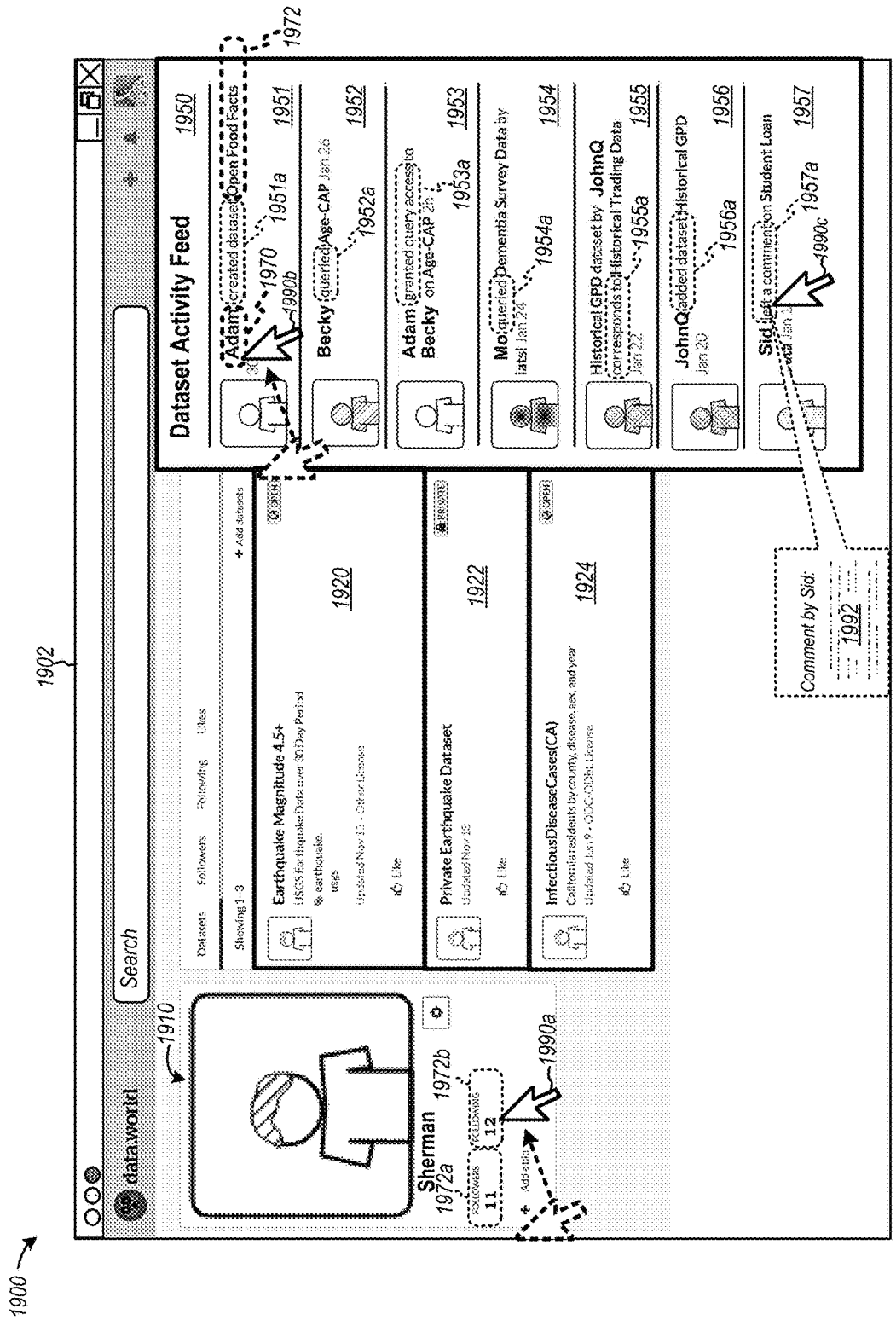
FIG. 19 is a diagram depicting an example of a dataset activity feed to present dataset interaction control elements in a user interface, according to some embodiments.

FIG. 19 is a diagram depicting an example of a dataset activity feed to present dataset interaction control elements in a user interface, according to some embodiments. Diagram 1900 depicts a user interface 1902 presenting one or more user interface elements constituting user account information 1910, user datasets 1920, 1922, and 1924, and a dataset activity feed 1950. One or more text strings depicted in user interface 1902 may be configured as control elements (e.g., user inputs) that, in response to user interaction via activation of the user input, cause presentation of dataset interaction information. Activation may be triggered by, for example, selecting or hovering over a user input using a pointer element 1990 (or other things, such as a finger on a touch-sensitive display).

User account information 1910 may include user interface elements 1972a and 1972b that relate to "a number of followers" and "a number following," respectively. The "number of followers" may indicate a number of other datasets or other user accounts that monitor dataset interactions relating to datasets 1920, 1922, and 1924, as well as updates to user attributes associated with user account information 1920. For example, each of at least eleven (11) datasets may be indicated as a "follower" that may cause notifications to be received into dataset activity feed 1950 of the user interfaces (not shown) associated with the eleven datasets (and other 11 users) if, for example, dataset 1920 is modified, queried, or any other data interaction are performed, or any other action is performed by a user associated with user account 1910. By contrast, the "number following" may indicate a number of other datasets or other user accounts that user account 1910 and datasets 1920, 1922, and 1924 are following, and may receive notifications in dataset activity feed 1950. For example, pointer element 1990a may select or hover over user interface element 1972b to cause presentation (not shown) of identities and other information describing twelve (12) datasets being followed by datasets 1920, 1922, or 1924 and/or user "Sherman" of user account 1910. Further, user interface elements associated with corresponding user datasets 1920, 1922, or 1924, if activated, may be configured to display or otherwise cause dataset-related information, including dataset attributes, to be presented via user interface 1902 or any other user interface.

Dataset activity feed 1950, in this example, are shown to include a number of notifications 1951, 1952, 1953, 1954, 1955, 1956, and 1957, each having user interface elements to cause activation and/or presentation of dataset-related interaction functions and/or information. Each of notifications 1951, 1952, 1953, 1954, 1955, 1956, and 1957 may be generated (e.g., remotely) in response to one of a number of dataset interactions associated with a corresponding dataset. In at least some notifications, such as notification 1951, a type of dataset interaction 1951a may be identified in view of a user identifier 1970 and a dataset 1972. Here, notification 1951 indicates that a user "Adam" associated with user identifier 1970 has caused a dataset interaction 1951a of "creating a dataset," with a dataset identifier ("Open Food Fact") 1972 for a dataset. Notifications 1952, 1953, 1954, 1955, 1956, and 1957 may be provide indications, respectively, of dataset interaction 1952a (e.g., dataset "Age-CAP" is queried by user "Beth"), 1953a (e.g., dataset "Age-CAP" has access granted to Becky user "Adam"), 1954a (e.g., dataset "Dementia Survey Data" is queried by user "Mo"), 1955a (e.g., dataset "Historical Trading Data" is corresponds, or is linked to, dataset "Historical GPD" by user "JohnQ"), 1956a (e.g., dataset "Historical GPD" is added or uploaded by user "JohnQ"), and 1957a (e.g., dataset "Student Loan Data" has been associated with a comment added by user "Sid"). Other dataset interactions are possible.

Further, user interface elements of notifications 1951 to 1957 may be activated to at least present related information. For example, pointer element 1990b may select user identifier 1970 (e.g., a hyperlink or control input) that may cause presentation of user account-related information for user "Adam" (not shown). As another example, pointer element 1990c may be activated to select data interaction 1957a to cause generation of an overlay window to present, for example, text 1992 of a comment. Therefore, a user may determine another user, a comment, and a dataset "in a view" (e.g., single user interface view), whereby a user may expedite data collection and collaboration.

In view of the foregoing, collaboration among users and formation of collaborative datasets may be expedited based on the dissemination up-to-date information provided by dataset activity feed 1950. Thus, user "Sherman" 1910 more readily may be able to determine applicability of other datasets, such as dataset "Dementia Survey Data" of notification 1954, to one of user datasets 1920, 1922, and 1924. Consequently, user "Sherman" 1910 may expedite modeling data and/or theory testing, among other things.

Figure 20:
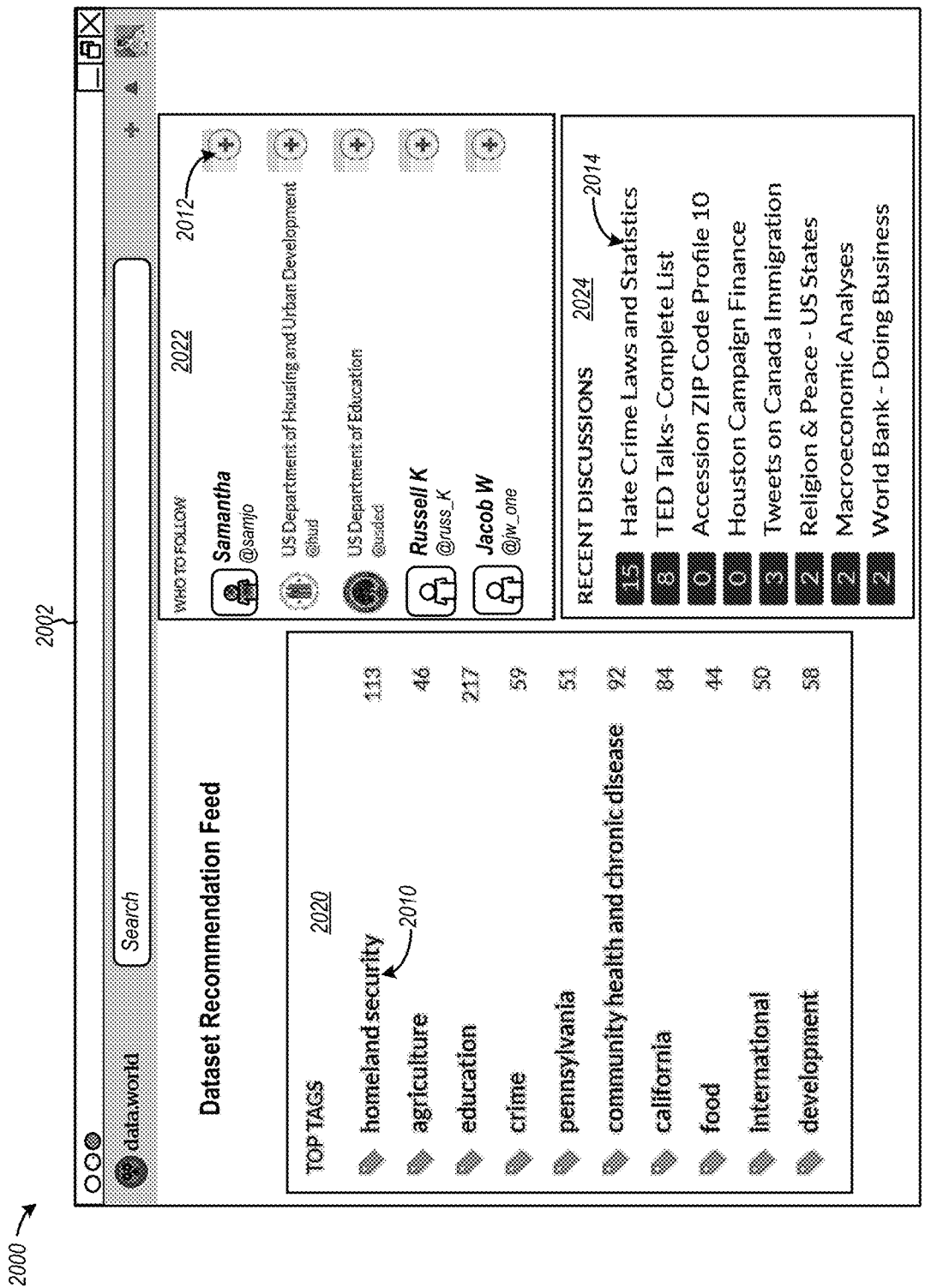
FIG. 20 is a diagram depicting other examples of dataset activity feeds to present a dataset recommendation feed, according to some embodiments.

FIG. 20 is a diagram depicting other examples of dataset activity feeds to present a dataset recommendation feed in a user interface, according to some embodiments. Diagram 2000 depicts a user interface 2002 presenting one or more user interface elements of one or more dataset recommendation feeds based on dataset interactions and dataset attributes. User interface 2002 is shown to include a dataset recommendation feed 2020 that presents a number of higher-ranked "tags" 2010 that may be of interest (and relevant) to a dataset and user account. Also, user interface 2002 may include a dataset recommendation feed 2022 that presents a number of users as "who to follow," each of whom may be of interest (and relevant) to a dataset and user account. A user may be follow another user (e.g., initiate receipt of notifications) by selecting a corresponding user input 2012. Further, user interface 2002 may include a dataset recommendation feed 2024 that presents a number of discussions regarding, for example, a dataset 2014, such as dataset "Hate Crime Laws and Statistics." One or more text strings depicted in user interface 2002 may be configured as control elements (e.g., user inputs) that, in response to user interaction via activation of the user input, cause presentation of respective dataset recommendation information.

Figure 21:
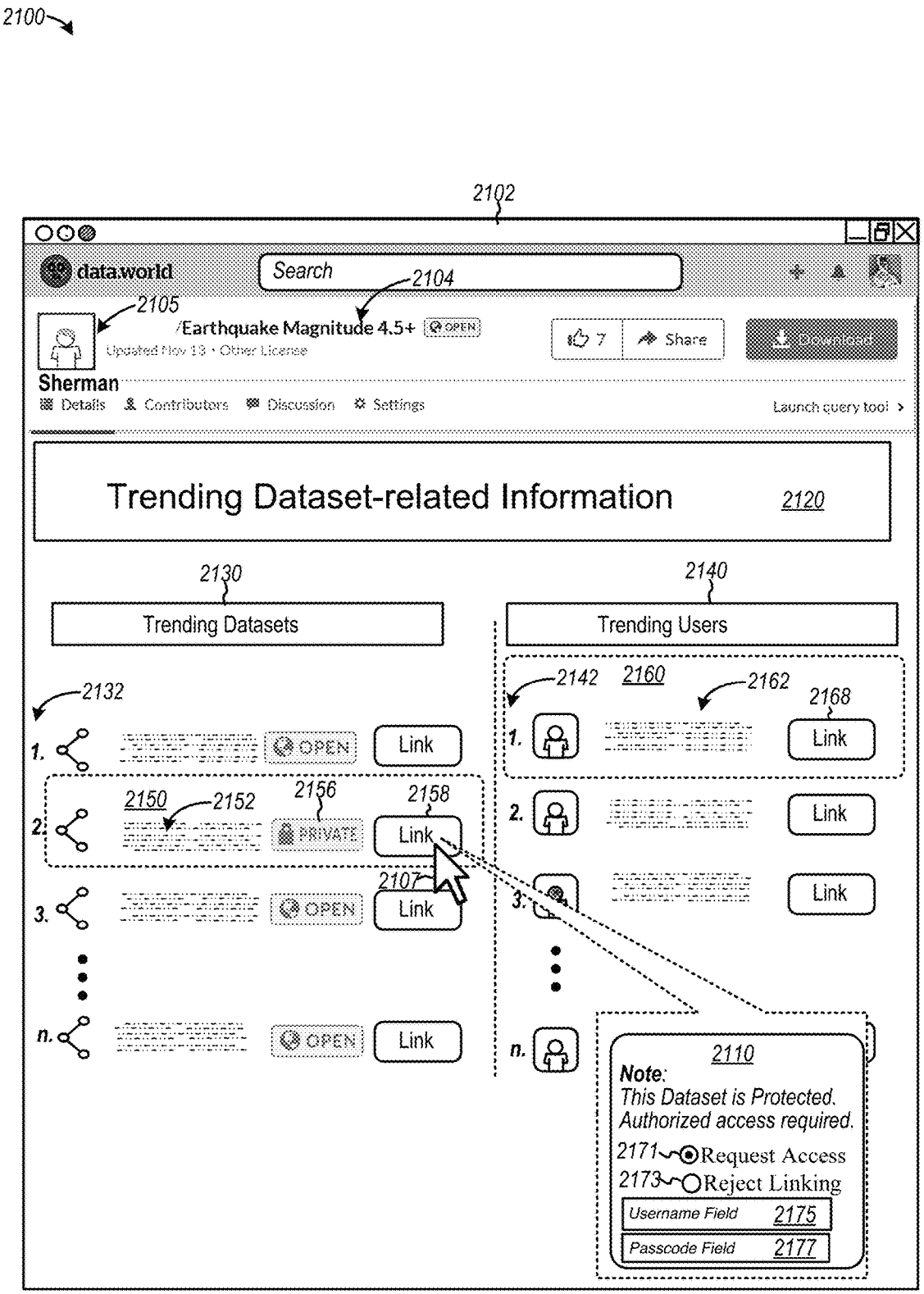
FIG. 21 is a diagram depicting examples of trend-related dataset activity feeds to facilitate presentation and interaction with user interface elements, according to some embodiments.

FIG. 21 is a diagram depicting examples of trend-related dataset activity feeds to facilitate presentation and interaction with user interface elements, according to some embodiments. Diagram 2100 depicts a user interface 2102 configured to present user interface elements, which may be interactive (e.g., control user inputs), that constitute trending information. Trending dataset-related information 2120 is shown to include trending datasets 2130 and trending users 2140.

Trending datasets 2130 may be disposed in a portion of user interface 2102 that presents user interface elements including, for example, a ranking 2132 (e.g., ranking of 1, 2, 3, . . . , n). Rankings 2132 are each associated with data representing a trending dataset 2150, which may include other user interface elements, such as text information 2152 describing trending dataset 2150. An exemplary description may include a purpose of the dataset, a source of the dataset, a field of applicability (e.g., biological, such as serological applications to test vaccines, etc.), and the like. Trending datasets 2150 may also include an indication 2156 whether the dataset is open, restricted, or private. Further, trending datasets 2150 may also include user interface element 2158, which may be a control element (e.g., a user input). On activation, such as by a pointer element, user interface element 2107 may be configured to generate an overlay window 2110 (over interface 2102). Overlay window 2110 may include an interface to initiate a request to access trending datasets 2150 via user input 2171, or to reject linking trending dataset 2150 to a dataset 2104. As trending dataset 2150 is a private dataset, a username field 2175 and passcode field 2177 may be presented in overlay window 2110 to facilitate authentication for accessing or linking to trending dataset 2150.

Trending users 2140 may be disposed in another portion of user interface 2102 and may present user interface elements including, for example, a ranking 2142 (e.g., ranking of 1, 2, 3, . . . , n). Trending user 2160 may have similar user interface elements as trending dataset 2150, such as a text description 2162 and a user interface element 2168 configured to form a link between user 2105 and trending user 2160. In some examples, activation of link element 2168 may cause, for example, data to be exchanged (e.g., notifications) among users, as well as may enable a number of permissions when accessing a dataset associated with trending user 2160. Permissions include, but are not limited to, authorization to copy a dataset, authorization to modify a dataset, authorization to query a dataset, etc.

Figure 22:
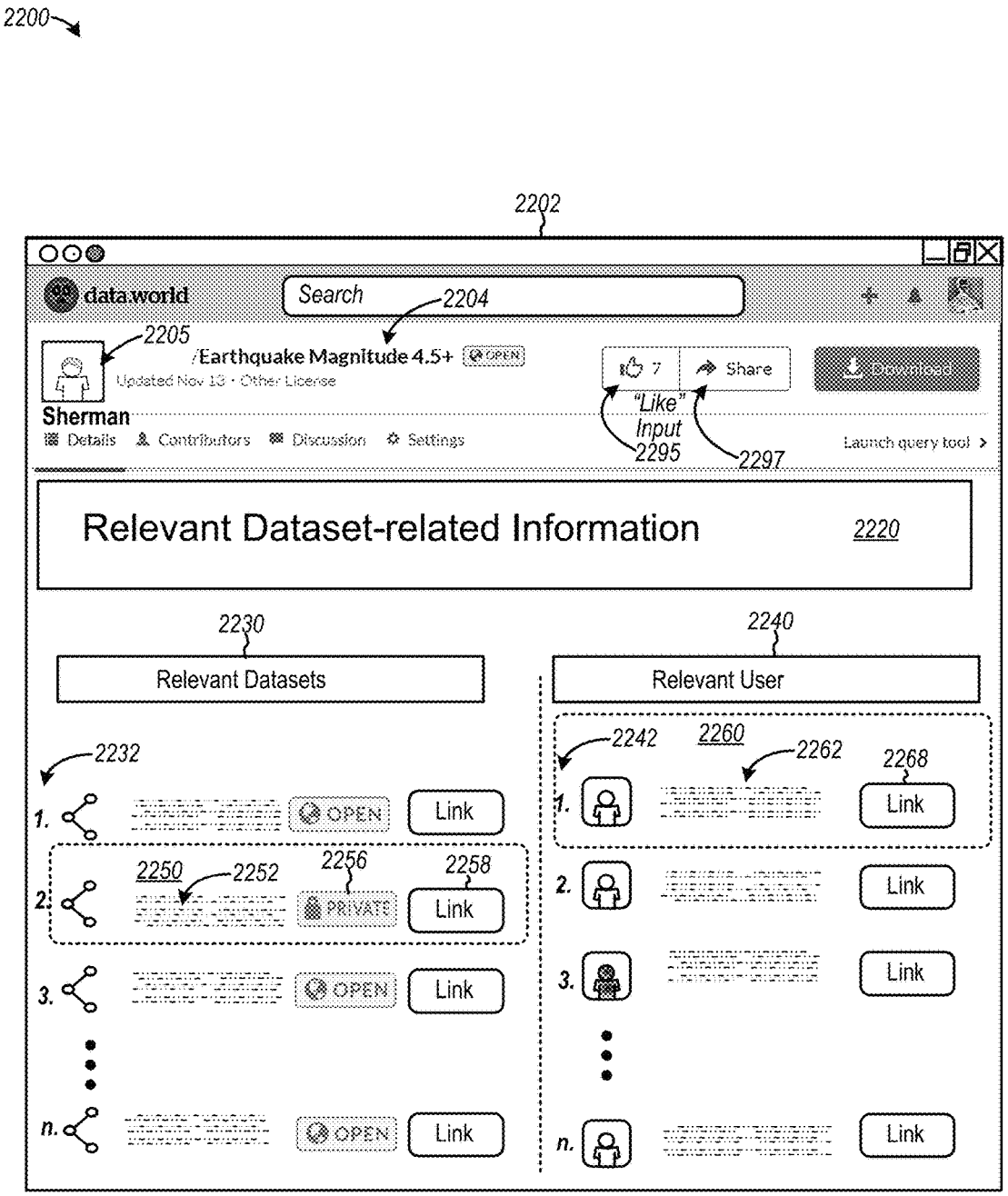
FIG. 22 is a diagram depicting other examples of relevancy-related dataset activity feeds to facilitate presentation and interaction with user interface elements, according to some embodiments.

FIG. 22 is a diagram depicting other examples of relevancy-related dataset activity feeds to facilitate presentation and interaction with user interface elements, according to some embodiments. Diagram 2200 depicts a user interface 2202 configured to present user interface elements, which may be interactive (e.g., via control user inputs), that constitute relevancy information. Relevant dataset-related information 2220 is shown to include relevant datasets 2230 and relevant users 2240, which may include user interface elements similar to trending datasets 2130 and trending users 2140, respectively, of FIG. 21. A portion of user interface 2202 that includes relevant datasets 2230 may be configured to present, for example, highest ranked user datasets 2250 that rank in accordance with their degree of relevancy to dataset 2204 (e.g., ranking "1" of rankings 2232 indicates the most relevant other user dataset). Relevant datasets 2230 may include user interface elements, such as "private" indication 2256, and a user interface element 2258 (e.g., a control element as a user input) configured to activate an overlay interface (not shown) to link relevant dataset 2250 to dataset 2204. Relevant users 2240 may include a user interface element 2268 configured to establish a link between relevant dataset 2250 and user 2205. Another portion of user interface 2202 includes relevant users 2240 that is configured to present, for example, highest ranked users 2260 that rank in accordance with their degree of relevancy to user 2205 (e.g., ranking "1" of rankings 2242 indicates the most relevant other user). In some examples, user interface 2202 may include user interface elements, such as user input 2295, for voting or otherwise expressing usefulness of dataset 2204. For example, user input 2295 may indicate a number of users or viewers that "like" dataset 2204. User input 2297 may be implemented to cause information regarding dataset 2204 to be transmitted (i.e., communicated) to third party social networking systems, such as Facebook™, Twitter™, and the like. According to some examples, elements depicted in diagram 2200 of FIG. 22 may include structures and/or functions as similarly-named or similarly-numbered elements depicted in other drawings.

Figure 23:
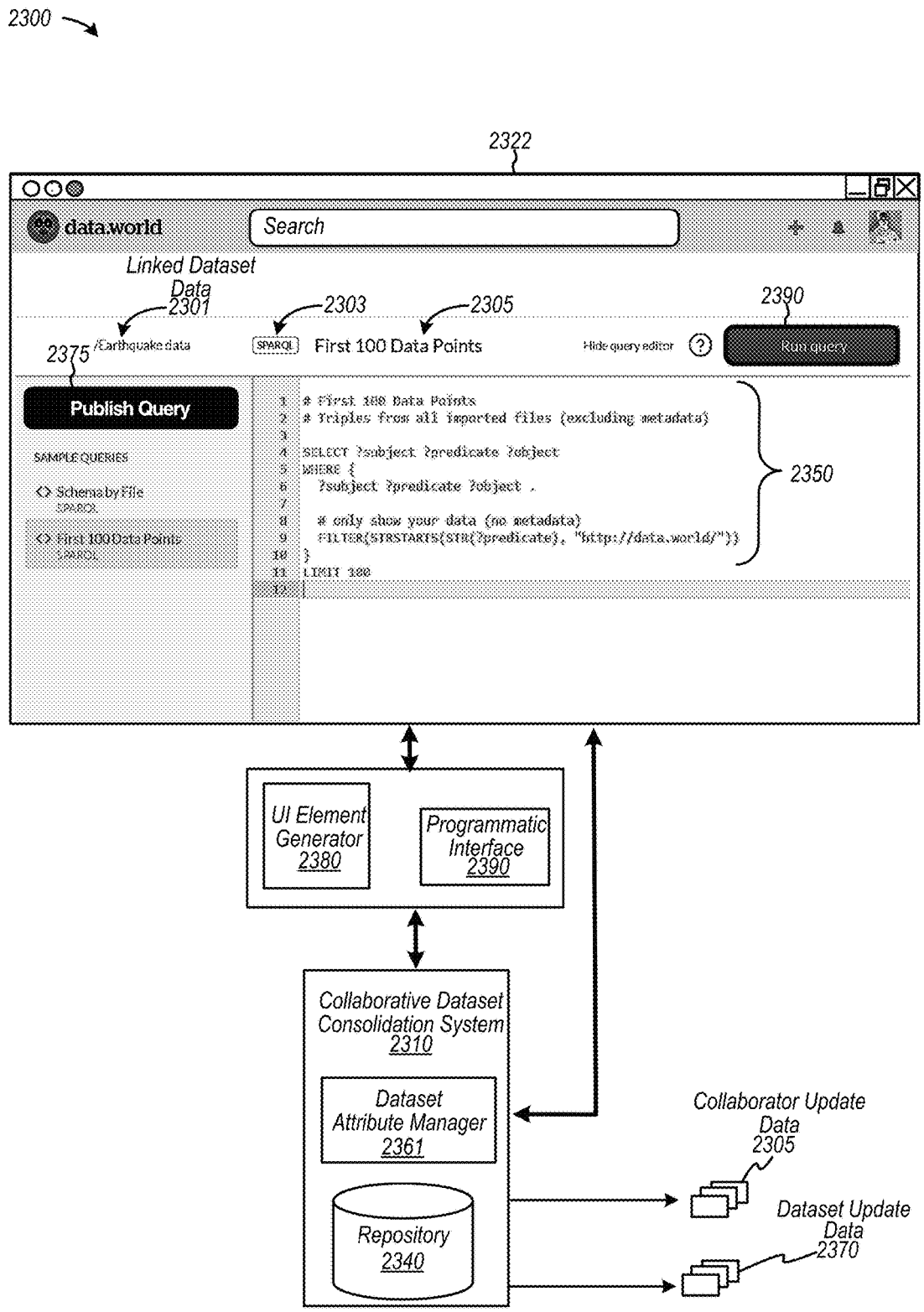
FIG. 23 is an example of a data entry interface to access atomized datasets, according to some examples.

FIG. 23 is an example of a data entry interface to access atomized datasets, according to some examples. Diagram 2300 depicts a collaborative dataset access interface 2322, which operates as a computerized tool to access a collaborative dataset (e.g., an atomized dataset) or perform other operations, such as a query. Also shown is a user interface element generator 2380, a programmatic interface 2390, and a collaborative dataset, consolidation system 2310, which, in turn, includes a dataset attribute manager 2361 and a repository 2340. According to some examples, elements depicted in diagram 2300 of FIG. 23 may include structures and/or functions as similarly-named or similarly-numbered elements depicted in other drawings. Collaborative dataset access interface 2322 includes a data entry interface 2350 to enter, for example, commands to access a graph data structure (e.g., an atomized dataset). A graph-level access or query language, such as SPARQL, or the like, may be used to enter a query into data entry interface 2350. When SPARQL is used, a "SPARQL" indicator 2303 may be presented. In this example, a query having a title ("First 100 Data Points") 2305 is entered into data entry interface 2350 for querying against a linked dataset 2301. The query may be executed upon activation of user input ("run query") 2390. Further, collaborative dataset consolidation system 2310 may generate collaborator update data 2305 to propagate or disseminate notifications that a user has performed a query against a dataset 2301. Also, collaborative dataset consolidation system 2310 may generate dataset update data 2370 to alert other datasets or users that a particular dataset has been queried. User input 2375 may cause a query to be published, which enables the query and results to become visible and shareable from, for example, a dataset homepage (not shown). Therefore, a community of data practitioners may be able keep informed about developments or dataset interactions regarding datasets in which they are interested.

Figure 24:
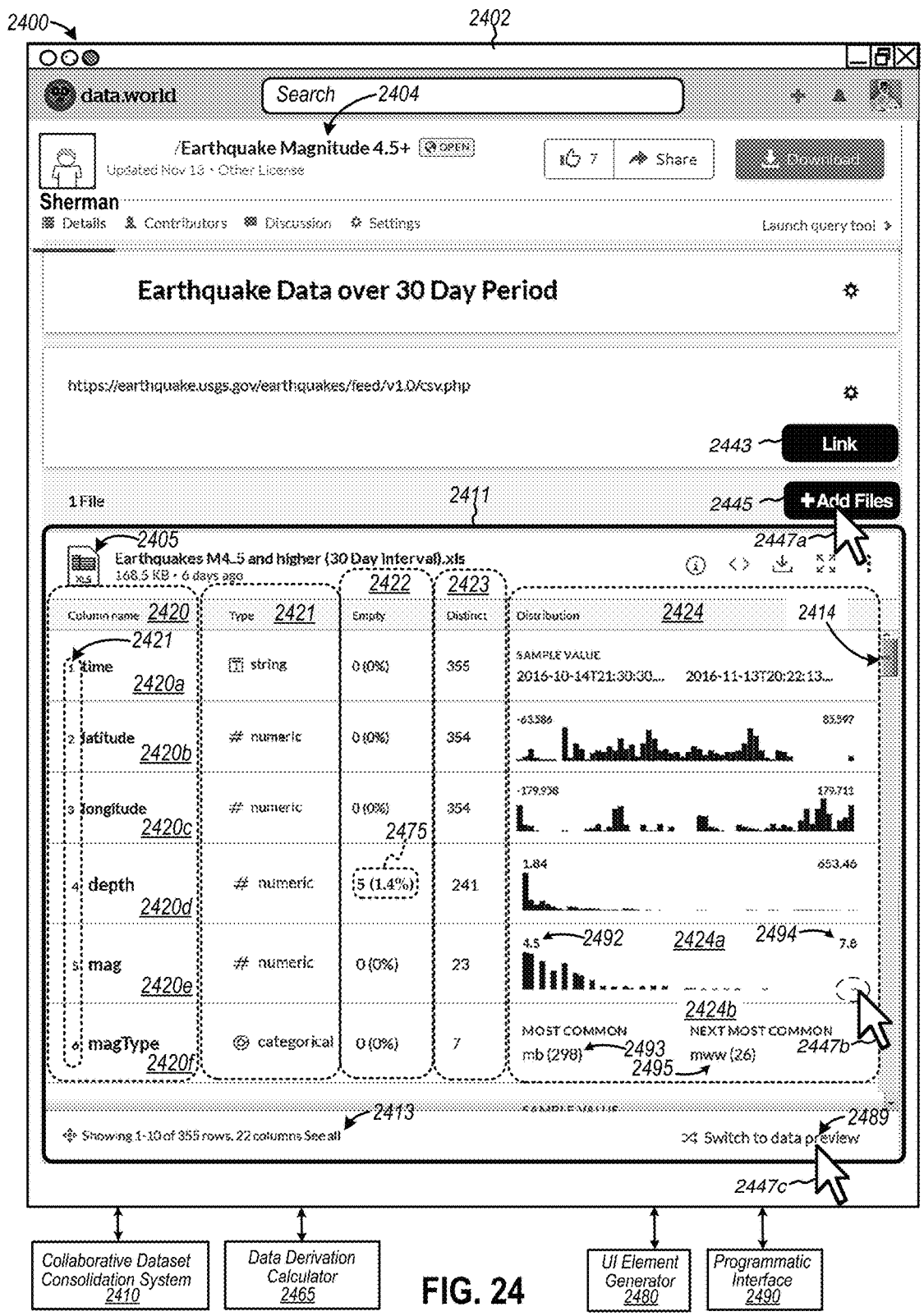
FIG. 24 is an example of a user interface to present interactive user interface elements to provide a data overview of a dataset, according to some examples.

FIG. 24 is an example of a user interface to present interactive user interface elements to provide a data overview of a dataset, according to some examples. Diagram 2400 depicts a user interface 2402 as an example of a computerized tool to provide access to summarized data, information and aspects of a dataset (e.g., an atomized dataset), including schema information, or to perform other operations. In some examples, "insight information" may be calculated and presented via user interface 2402, which may be generated during a dataset creation process, or subsequently thereafter, to present user interface elements that may include, for example, characterizations of the data in summary form shown in diagram 2400. For example, user interface elements may present information, (e.g., textually, statistically, graphically, etc.) that may convey characteristics of the data distribution and "shape," among other things. Diagram 2400 also depicts a user interface element generator 2480, a programmatic interface 2490, and a collaborative dataset consolidation system 2410, and a data derivation calculator 2465. According to some examples, elements depicted in diagram 2400 of FIG. 24 may include structures and/or functions as similarly-named or similarly-numbered elements depicted in other drawings.

Insight information may be generated during at one or more phases of a dataset creation process, or subsequently. "Insight information" may refer, in some examples, to information that may automatically convey (e.g., visually in text and/or graphics) dataset attributes of a created dataset, including derived dataset attributes, during or after (e.g., shortly thereafter) the creation of the dataset. Insight information presented in a user interface (e.g., responsive to dataset creation) may describe various aspects of a dataset, in summary form, such as, but not limited to, annotations (e.g., of columns, cells, or any portion of data), data classifications (e.g., a geographical location, such as a zip code, etc.), datatypes (e.g., a string data type, a numeric data type, a categorical data type, a Boolean data type, a derived classification data type, a date data type, a time data type, a geolocation data type, etc.), a number of data points, a number of columns, a "shape" or distribution of data and/or data values, a number of empty or non-empty cells in a data structure, a number of non-conforming data (e.g., a non-numeric data value in column expecting a numeric data, an image file, such as an image file embedded in a cell, etc., or some other erroneous or unexpected data) in cells of a data structure, a number of distinct values, etc. According to some embodiments, initiation of the dataset creation process invoked at a user input of user interface 2402 (not shown) may also perform statistical data analysis during or upon the creation of the dataset.

In view of the foregoing, algorithms (e.g., statistical algorithms or other analytic algorithms) may be applied against the dataset, during or subsequent to the creation of the dataset, to access insight information. A user need not download the data from a dataset to perform some sort of ad hoc data analysis (e.g., creating and running a Python script, or the like, against downloaded data to perform a statistical analysis) to identify characteristics of a distribution of data as well as visualization of the distribution. Therefore, insight information presented in user interface 2402 may provide (e.g., automatically) dataset attributes (and characteristics thereof) in a "snapshot view" so that data practitioners and users may readily determine whether a dataset may be of a quality or of a form that serves a desired purpose or objective. Further, user interface 2402 may automatically calculate and present dataset attributes of a "linked" dataset in which a link is established with, for example, an atomized dataset. In some examples, user interface 2402 may automatically convey dataset attributes, in summary form, for collaborative datasets that include links to protected (e.g., secured) atomized datasets that require authentication or permission to access in a collaborative dataset.

In the example shown, user interface 2402 is configured to present insight information for a dataset 2404. User interface 2402 is configured to convey insight information for a subset of data arrangements in a data arrangement overview interface 2411. In the example shown, data arrangement overview interface 2411 is configured to provide an overview (e.g., summary) or aggregation of, for instance, columnar data from a tabular data arrangement, such as an XLS file. As shown, each data arrangement, or column, of a set of data 2405, which is depicted as file "Earthquakes M4_5 and higher (30 Day Interval).xls," may be presented as a row in data arrangement overview interface 2411, with each row depicting an aggregation (e.g., summarization) of data attributes and thereof values.

As shown, a number of columns are depicted in orthogonal data arrangements (e.g., as rows) wherein a column header (or annotation) is provided in column ("column name") 2420, which describes a dataset attribute of the data disposed therein. In this example, an index 2421, or ranking, is depicted adjacent to text describing a column annotation. Indices 2421 for columns 1 ("time") to 6 ("magType") are shown in data arrangement overview interface 2411. Note that in this example, data preview mode 2413 indicates that there are twenty-two ("22") columns and 355 rows that may be summarized and viewed with, for example, the use of scroll bar 2414. Further, each column may include a datatype 2421 indicating a datatype for the column, a number 2422 (e.g., in percentage) of empty cells, and a number 2423 of distinct values for the columnar data, among many other types of data. In the example shown, a subset of column headers are disposed at 2420a, 2420b, 2420c, 2420d, 2420e, and 2420f, each having column headers (e.g., annotations) "time," "latitude," "longitude," "depth," magnitude ("mag"), and magnitude type ("magType"), respectively. Therefore, in this example, orthogonal arrangements of data associated with 2420a, 2420b, 2420c, 2420d, 2420e, and 2420f may be configured to display, respectively, aggregate or summary information regarding the "time" of an earthquake, the latitude and longitude of an earthquake, a depth at which an earthquake originates, a magnitude of the earthquake and a magnitude type of earthquake (e.g., "mb," or measured body-wave magnitude), among other dataset attributes (some of which are not shown and viewable via 2414).

Data arrangement overview interface 2411 also may include a column 2424 to present graphically a "shape" of the data for subsets of data ingested during uploading of file 2405. The shape and presentation of the data may be presented as a histogram, a line graph, a percentage, a top number of categorical values, or in any other visualization graphical format to convey summary information, visually, based on values of a subset of the dataset attributes for a column. To illustrate, consider shape data 2424a associated with a subset 2420a of data that presents earthquake magnitude ("mag") summary information. As shown, a histogram 2424a depicts the frequencies of earthquake magnitude ranging from a minimum magnitude 2492 of 4.5 (on the Richter scale) to a maximum magnitude 2494 of 7.8, with predominant frequencies are shown nearer minimum magnitude 2492. Also shown, top categories 2424b depict the most common and next most common categories of earthquake magnitudes. As shown, the most common category 2493, with 298 occurrences, is the "mb" category, which describes a number of occurrences in which an earthquake magnitude may be categorized as a measured body-wave magnitude. The next common category 2495, with 26 occurrences, is the "mmw" category, which describes a moment magnitude derived from a centroid moment tensor inversion of a W-phase. The 'mmw' category may be a very long period phase (e.g., 100 seconds to 1000 seconds) that may be derived to provide rapid characterization of a seismic source for tsunami warning purposes.

According to some examples, one or more of subsets of column headers disposed at 2420a ("time"), 2420b ("latitude"), 2420c ("longitude"), 2420d ("depth"), 2420e (magnitude, or "mag"), and 2420f (magnitude type, or "magType") may be derived. For example, any of the columns associated with 2420a to 2420f may include one or more derived dataset attributes and associated values. For example, one of subsets of column headers disposed at 2420a to 2420f may include "place" (e.g., name of a geographic location or city) derived from data in 2420b ("latitude") and 2420c ("longitude"), as well as associated values (e.g., distances to nearest cities to earthquake epicenters). Another example of a derived column may be depicted in FIG. 13, among others. Any one of the column headers disposed at one of 2420a to 2024f may be derived, whereby the column header may be associated with an annotation, which may be automatically provided or by the user. An annotation may be derived based on inferred or derived dataset attributes, and, as such, a column header (or any metadata associated with a subset of data in a dataset), may be derived or inferred, as described herein. Therefore, insight calculations and user interface elements presented in data arrangement overview interface 2411 may be based on a derived dataset attribute and/or associated values.

Data arrangement overview interface 2411 may be configured to function as an interactive display, whereby a display of graphically-displayed distributions 2424 of data, such as a histogram, may include user interface elements (e.g., control inputs or user inputs) that facilitate interaction with presented data, including some data representing derived or inferred dataset attributes. To illustrate, consider that a pointer element 2447*b* may be configured to select or hover over a portion of the histogram associated with the maximum magnitude value. In response, data arrangement overview interface 2411 may present an overlay window (not shown) that provides additional information about earthquake magnitudes at 7.8 on the Richter scale (e.g., the overlay window may provide information as to geographic location, a time, an affected country or city, etc.).

Furthermore, data arrangement overview interface 2411 may include user interface elements 2443 and 2445 to provide enhanced control of at least a portion of a data creation process, as described herein. "Link" user input 2443 may be configured to initiate another selection of another dataset with which to link to the present dataset 2404 to form a collaborative dataset. Consequently, logic of one or more of user interface element generator 2480, a programmatic interface 2490, and a collaborative dataset consolidation system 2410, and a data derivation calculator 2465 may be configured to re-calculate insight information based on a combination of data from the other set of data linked to the set of data 2405 to derive updated dataset attributes and associated updated values (e.g., updated aggregated dataset attributes and associated updated values). In some examples, "Link" user input 2443 may be configured to link a protected atomized dataset to present dataset 2404. Authorization data to access the protected atomized dataset may accompany control signals associated with user input 2443 to facilitate access to the protected atomized dataset to perform recalculations of the insight information. Thus, the values for the insight information may be recalculated and adapted to new versions of collaborative datasets during the linking (e.g., uploading) phase for presentation of an updated shape or distribution information for the combination of data that may be presented in column 2424.

"Add files" user input 2445 may be activated via pointer element 2447*a* to initiate adding (e.g., uploading) files to provide additional datasets or to correct data in set of data 2405. Thus, a new version of a file 2405 may be uploaded to form a new version of dataset 2404. For example, "depth" column insight information 2475 indicates that 5 of 355 rows (e.g., 1.4%) include "empty" data cells. A user may download the data file 2405 and address the empty data cells by correcting the data therein or adding appropriate data. Then, the revised file 2405 may be uploaded (e.g., via "add files" input 2445) so as to initiate re-calculation of the insight information, whereby "depth" column insight information 2475 may be revised to include "zero" empty cells (not shown). The foregoing implementations of presenting insight information are examples and are not intended to be limiting, and there are many variations that fall within the scope of the present disclosure. In some examples, a pointer element 2447*c* may be configured to select or hover over a portion 2489 of user interface 2402 to cause a transition to, or display of, a data overview 2511 of FIG. 25. Portion 2489 may include hyperlinked text "Switch to data preview," as an example.

Figure 25:
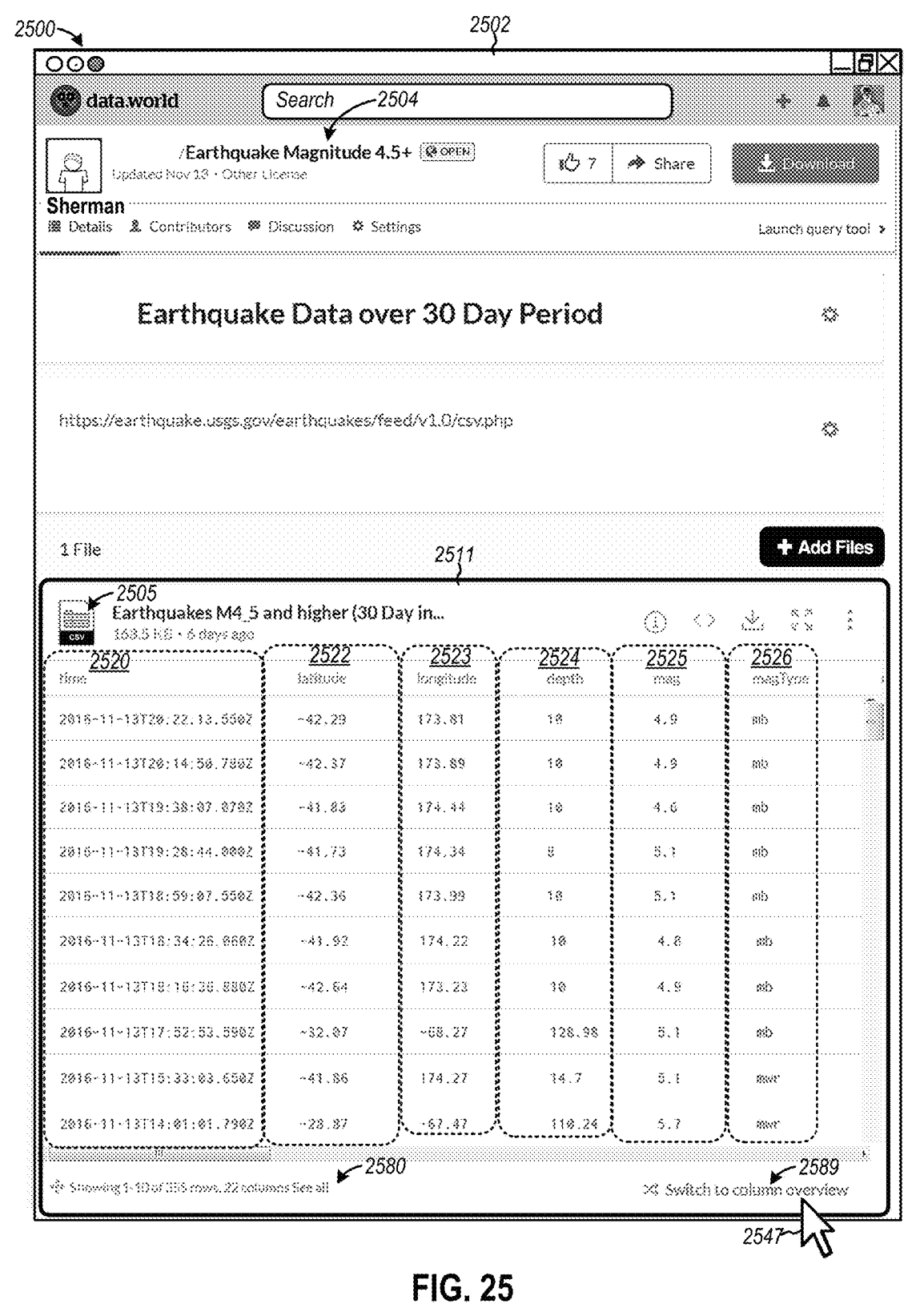

FIG. 25 is an example of a user interface to present interactive user interface elements for another data preview of a dataset, according to some examples. Diagram 2500 depicts a user interface 2502 as an example of a computerized tool to provide access to a portion of the dataset to present a data view 2511 as a portion of a dataset. According to some examples, data view 2511 presents the data in a tabular format. Hence, logic (not shown) may be configured to upload and ingest, during a dataset creation process, a set of data 2505 formatted in, for example, a comma separated value, or "CSV," format. The logic may be configured format the data for presentation via data view 2511 into a tabular format as depicted in diagram 2500, with cells (e.g., intersections of a row and a column, other than column headers, indices, etc.) including specific values of data. As shown, subsets of dataset data are disposed in columns 2520 ("time"), 2522 ("latitude"), 2523 ("longitude"), 2524 ("depth"), 2525 (magnitude, or "mag"), and 22526 (magnitude type, or "magType"). Diagram 2400 of FIG. 24 is an example of summary information of the data presented in data view 2511. "See all" text 2580 may hyperlinked to cause, upon activation, presentation of rows 1-355 and columns 1-22, which is beyond that shown in data view 2511. Further, user interface elements of user interface 2502 may include a user input 2589 (e.g., a link, or hyperlink) in association with text "Switch to column overview." Activation of user input 2589 may cause the presentation of data preview 2511 to transition to user interface 2402 or data arrangement overview interface 2411 of FIG. 25.

Figure 26:
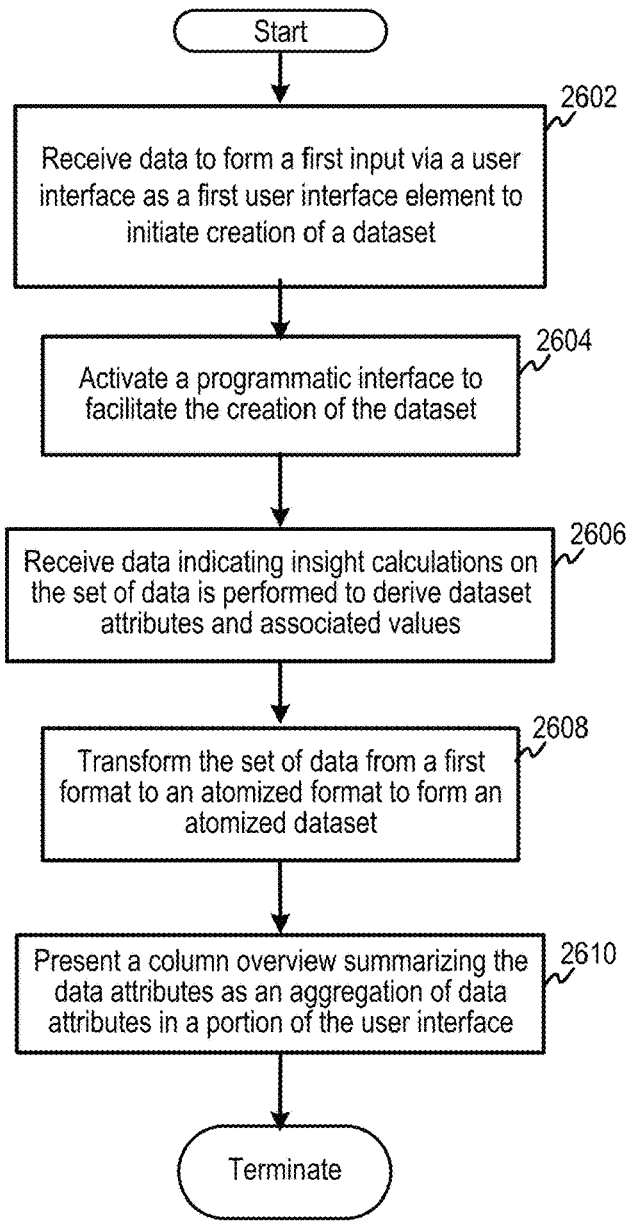
FIG. 26 is a diagram depicting a flow diagram to present interactive user interface elements for a data overview of a dataset, according to some embodiments.

FIG. 26 is a diagram depicting a flow diagram to present interactive user interface elements for a data overview of a dataset, according to some embodiments. Flow 2600 may be an example of generating insight formation for a created dataset to present to a user interface based on a set of data. At 2602, data to form an input as a user interface element may be received via a user interface. For example, a processor executing instruction data at a client computing device (or any other type of computing device, including a server computing device) may receive data to form a user interface element, which, upon activation, may initiate creation of an atomized dataset based on raw data in data file (e.g., a tabular data file, such as an XLS file, etc.). At 2604, which is optional, a programmatic interface may be activated to facilitate the creation of (or updating or modifying) a dataset responsive to receiving the first input, according to some examples. Insight information may be calculated during a phase, such as during a "Gathering Insights" 1024 phase of FIG. 10. Referring back to FIG. 26, a programmatic interface at 2604 may be implemented as either hardware or software, or a combination thereof. The programmatic interface also may be disposed at a client computing device or a server computing device, which may be associated with a collaborative dataset consolidation system, or may distributed over any number of computing devices whether networked together or otherwise. In some examples, the programmatic interface may be distributed as subsets of executable code (e.g., as scripts, etc.) to implement APIs in any number of computing devices. In some embodiments, programmatic interface may be optional and may be omitted.

At 2606, data may be received, for example, at a processor, and the data may be a result of insight calculations. Further, the resultant data may describe a portion of insight information regarding dataset attributes of the dataset. In some examples, the insight information may be computed based on, for example, a derived or inferred dataset attribute and/or associated values. At 2608, a set of data (e.g., a CSV file) may be transformed during an ingestion process into a particular format, such as into an atomized datasets. At 2610, a data arrangement overview interface summarizing the data attributes as an aggregation of data attributes in a portion of a user interface. Examples are depicted in FIGS. 24 and 25, among other drawings. The data arrangement overview interface may include an interactive display of a distribution of a subset of values for a data arrangement associated with a collaborative atomized dataset. In some examples, an interactive display and/or a nested overlay window may include an overlay interface (e.g., including a tool tip) in which summary insight information may be presented responsive to interactions with the user interface.

Figure 27:
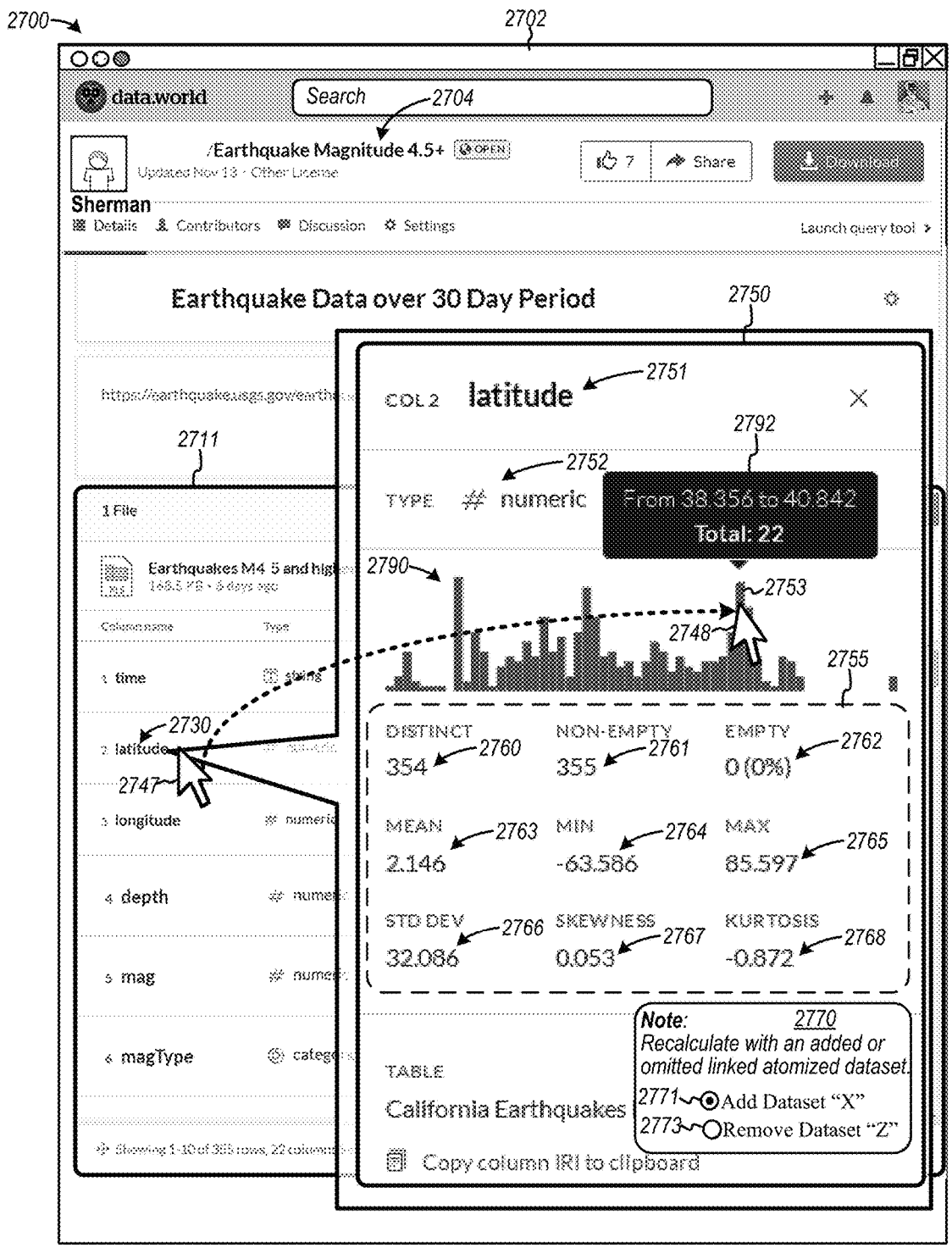
FIG. 27 is an example of a user interface to present interactive user interface elements for conveying summary characteristics of a dataset, according to some examples.

FIG. 27 is an example of a user interface to present interactive user interface elements for conveying summary characteristics of a dataset, according to some examples. Diagram 2700 depicts a user interface 2702 as an example of a computerized tool to provide access to various levels of detail for summarized data, information and aspects of a dataset (e.g., an atomized dataset). In the example shown, user interface includes a data arrangement overview interface 2711, which, may, in at least some cases, have structures and/or functionalities similar or equivalent to data arrangement overview interfaces described herein. According to some examples, elements depicted in diagram 2700 of FIG. 27 may include structures and/or functions as similarly-named or similarly-numbered elements depicted in other drawings.

Logic of one or more of a user interface element generator, a programmatic interface, a collaborative dataset consolidation system, and a data derivation calculator, none of which are shown, may be configured to facilitate interactivity of data arrangement overview interface 2711 with a pointer element, including a finger (e.g., for touch-sensitive screens), such as pointer element 2747. In some examples, logic disposed in a collaborative dataset consolidation system or at a client computing device, or both, may be configured to determine summary characteristics (e.g., statistical characteristics) as dataset attributes of a collaborative dataset. For instance, the logic can be configured to calculate summary characteristics, such as a mean of the dataset distribution, a minimum value, maximum value, a value of standard deviation, a value of skewness, a value of kurtosis, etc., among any type of statistic or characteristic. Summary characteristics and graphical representations of data distributions may be referred to as dataset attributes, according to some examples.

Pointer element 2747 may select or hover over a user interface element, such as user input 2730. In response, the logic may cause activation of interactive overlay window 2750. User input ("latitude") 2730 may be text (or an area thereof) that when selected may activate a subset of the executable code to cause generation of interactive overlay window 2750. As shown, user input 2730 may be associated with the text "latitude," which may be a hypertext link or another type of control input for invoking interactive overlay window 2750. Further, interactive overlay window 2750 may be configured to present data representing summary characteristic data for subsets of data, such as columns of data. As shown, user input ("latitude") 2730 is associated with a subset of dataset data that relates to a column of latitude data in, for example, a tabular representation of dataset 2704, which may be an atomized dataset. As pointer element 2747 selects or hovers over user input 2730, a subset of data relating to "latitude" is identified, interactive overlay window 2750 is activated, thereby presenting summary characteristics for the subset of data, which is shown to directed to column 2 ("col 2") having annotation ("latitude") 2751. Annotation 2751 may be derived from a column header.

Interactive overlay window 2750 may be configured to present an annotation 2751, a datatype ("numeric") 2752 for the subset of data, a graphical representation of a data distribution 2790 (e.g., a histogram), and aggregated data attributes 2755 including summary characteristics. In this example, a column of latitude data may have the following summary characteristics: distinct number of latitude values ("354") 2760, a number of non-empty data fields or cells ("355") 2761, a number of empty data fields or cells ("0(0%)") 2762, a mean of value of the latitude coordinates ("2.146") 2763, a minimum value of the latitude coordinates ("−63.586") 2764, a maximum value of the latitude coordinates ("85.597") 2765, a standard deviation ("32.086") 2766, a value of skewness ("0.053") 2767, a value of kurtosis ("−0.872") 2768, among other statistical characteristics or any other summary characteristics.

According to some embodiments, interactive overlay window 2750 may include user interface elements, as user inputs, to further perform data operations interactively with interactive overlay window 2750 to determine yet another level of details. For example, interactive overlay window 2750 may include an interface to enter text or other symbols into the interface. As shown, interface 2770 is configured to receive user input to recalculate the above-described summary characteristics and graphical representation 2790 based on adding or omitting datasets (or portions thereof). User input 2771 may be activated to add a particular dataset (e.g., add dataset "X"), whereas user input 2773 may be activated to remove a dataset (e.g., remove dataset "Z").

As another example, interactive overlay window 2750 may include one or more user interface elements to cause presentation of a nested overlay window 2792. Pointer element 2747 may transition to another position on user interface 2702, such as to a position depicted as pointer element 2748. At this position, pointer element 2748 may be configured to cause identification (e.g., through selection or hovering over) of a bar 2753 of graphical representation 2790, which is shown as a histogram. Responsive to pointer element 2748, nested overlay window 2792 may be generated to present relevant values of dataset attributes, such as a total number latitude data points (e.g., 22 latitude coordinates) and a range of latitude values (e.g., from 38.356 to 40.842) associated with bar 2753. As shown, histogram 2790 has a number of bars representing a frequency in which a latitude data value falls within a particular range of latitude data values. The above-described examples are not intended to be limiting, and an interactive overlay window and/or a nested overlay window may include any type of data and/or control inputs (as user inputs). And in view of the foregoing, a user need not download a dataset to perform ad hoc data analysis, such as creating and running a Python script at a client computing device against downloaded data to determine applicability. Therefore, such information may be presented via interactive overlay window 2750.

Figure 28:
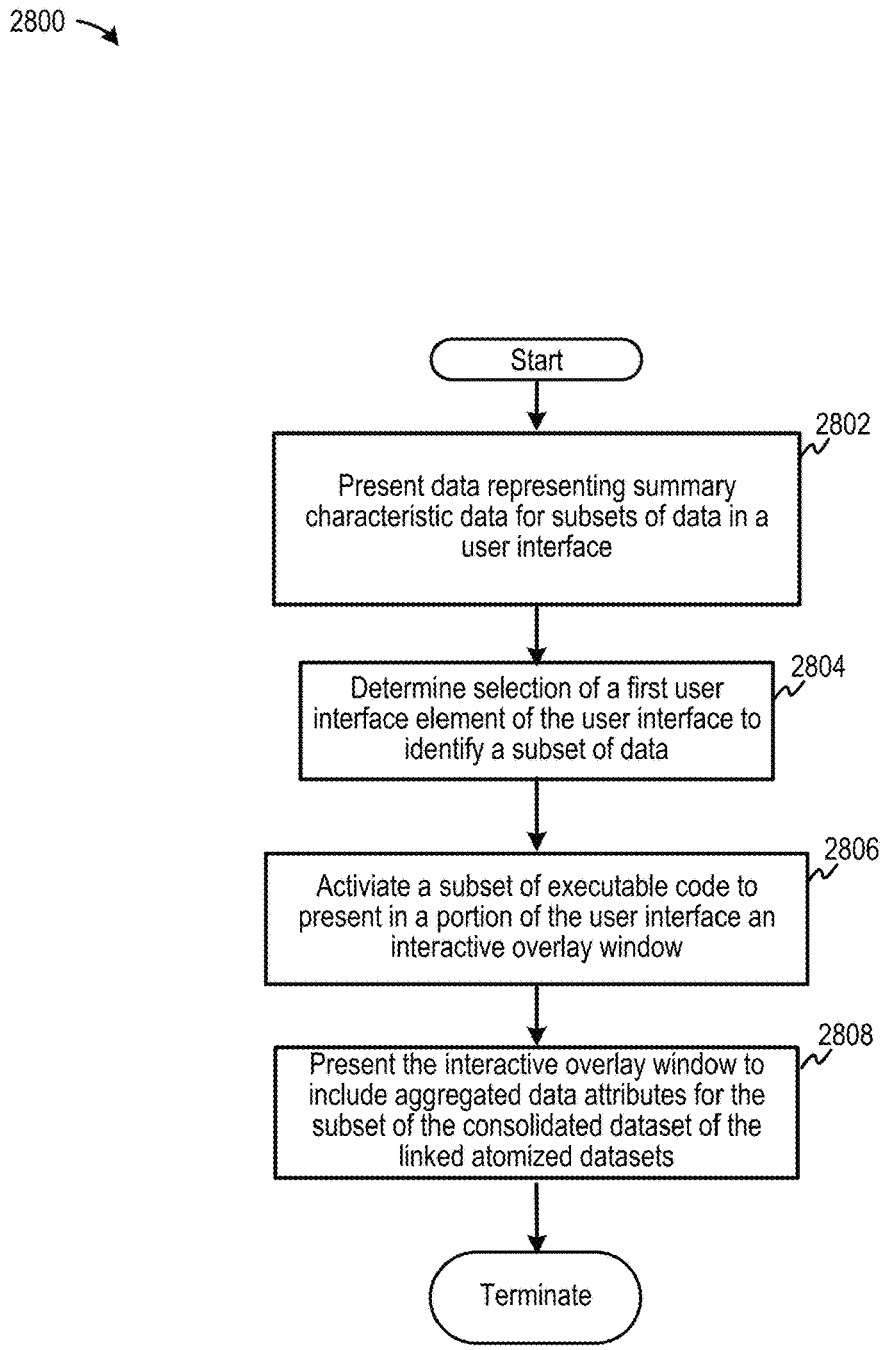
FIG. 28 is a diagram depicting a flow diagram to present summary characteristics for a dataset in an interactive overlay window, according to some embodiments.

FIG. 28 is a diagram depicting a flow diagram to present summary characteristics for a dataset in an interactive overlay window, according to some embodiments. At 2802, data representing summary characteristic data for subsets of data may be presented in a user interface. A summary characteristic may be a statistic or any other data characteristic or dataset attribute, whereby a subset of data may refer to a column of data in some examples. At 2804, a user interface element may be selected. An example of the user interface element may be a user input configured to activate presentation of an interactive overlay window. At 2806, a subset of executable code may be activated, responsive to identification or selection of the user input. When executed, the code causes presentation of an interactive overlay window to convey interactive summary characteristics for a column of data. At 2808, an interactive overlay window may be configured to include aggregated data attributes (e.g., an aggregation or collection of summary characteristics) for a column of data associated with, for example, an atomized dataset.

Figure 29:
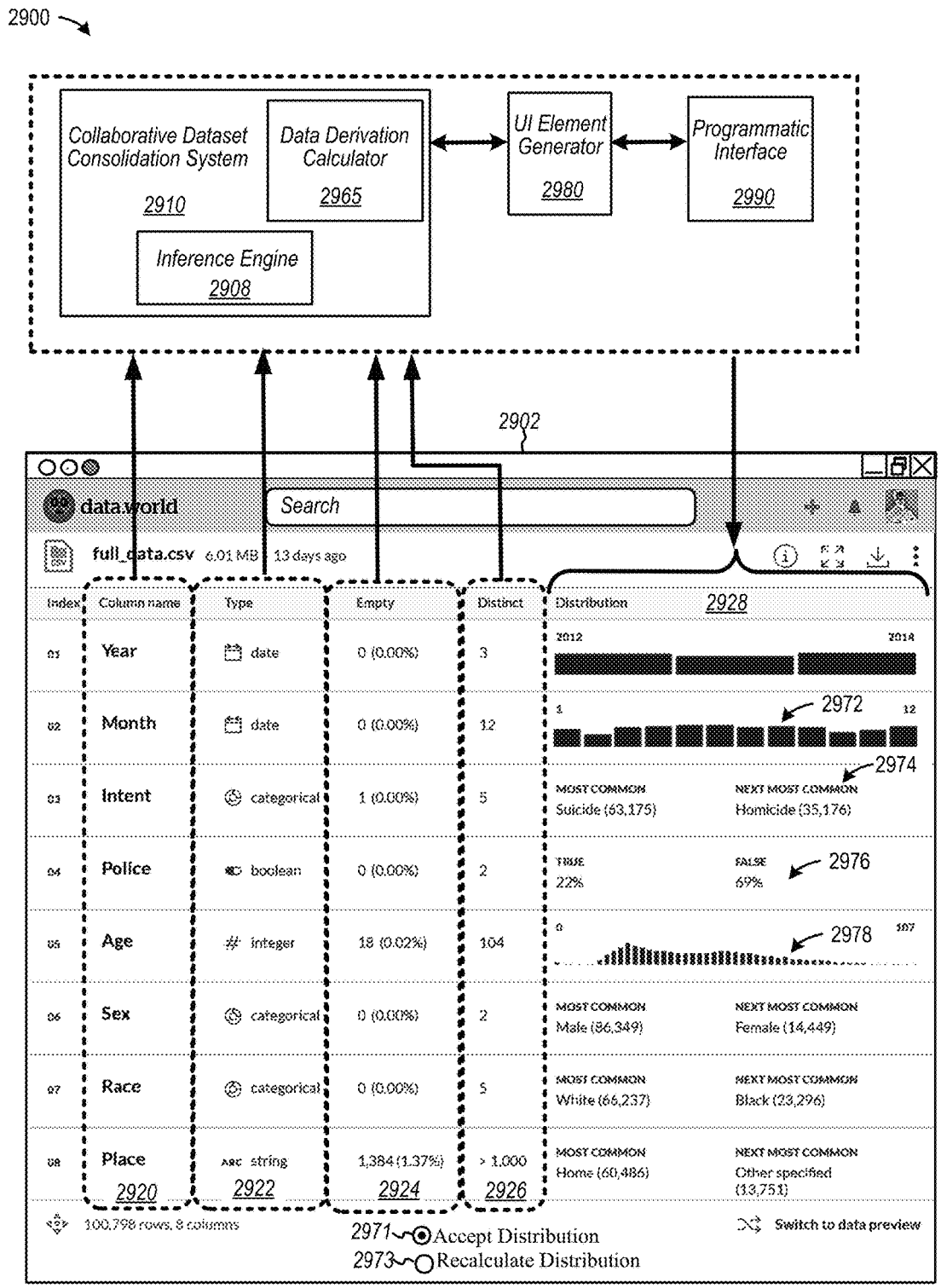
FIG. 29 is a diagram depicting an example in which a subset of data may be analyzed to determine a graphical representation of the data distribution, according to some examples.

FIG. 29 is a diagram depicting an example in which a subset of data may be analyzed to determine a graphical representation of the data distribution, according to some examples. Diagram 2900 depicts a user interface 2902 coupled communicatively to logic embodied in one or more portions of a collaborative dataset consolidation system 2910, which is shown to include a data derivation calculator 2965 and an inference engine 2908, a user interface element generator 2980 and a programmatic interface 2990. According to some examples, elements depicted in diagram 2900 of FIG. 29 may include structures and/or functions as similarly-named or similarly-numbered elements depicted in other drawings.

The logic is configured to acquire data representing annotations 2920 for subsets of data (e.g., column headings), datatypes 2922, a number of empty cells 2924, a number of distinct data values 2926, and any number of other dataset attribute values. According to various embodiments, the logic may be configured to determine (e.g., automatically) a suitable graphical format with which to present summary view data in graphical representations 2928. In some examples, the graphical format may be selected as a function of a shape of the data and, for example, shape attributes. Further, the graphical format may be selected as a function of one or more inferred dataset attributes (e.g., annotation "Place" in annotations column 2920 may be derive or inferred from other data). Therefore, logic may be configured to present insight data in a tabular format having a graphical representation of the data distribution being optimized based on inferred the dataset attributes and shape attributes.

For graphical representations 2928, the logic may be configured to determine time-based bar graph 2972 based on, for example, a datatype (e.g., "date"), distinct values 2926 (e.g., "12" distinct values associated with time-related data, such as, per month), an annotation 2920, as well as shape attributes. Shape attributes include characteristics that describe the amount, quality, and spread of a distribution due to various data values. Examples of shape attributes include symmetry, a number of peaks (e.g., unimodal or bell-shaped, bimodal, etc.), a degree of uniformity (e.g., measure of equal spreading of data), a degree of skewness (e.g., skewed left, skewed right, etc.), etc. Shape attributes may also refer to one or more summary characteristics, such as standard deviation, skewness, kurtosis, etc. The logic may be configured to determine categorical description 2974 based on datatype and a number of categories, as well as other dataset attributes. For example, a "most common" category may be associated with a greatest number of occurrences, whereby "suicide" has a greatest number of occurrences, followed by "homicide," which is the next common category. Further, logic may be configured to present two (2) values (and percentages thereof) as a graphical representation 2976 for Boolean datatypes, and based on other dataset attributes. Graphical representation 2978 may be presented as a histogram based on, for example, a number of occurrences, a datatype, a spread of data (e.g., standard deviation and ranges of values), and other data attributes. User interface 2902 may also include user inputs 2971 and 2973 to cause any of graphical representations 2928 to be accepted (as presented), or to be recalculated for presentation into a different graphical representation (e.g., a bar chart may be presented as a pie chart, etc.).

FIGS. 30A to 30F are diagrams depicting examples of interactive overlay windows, according to some examples. Interactive overlay windows 3000 and 3015 of FIGS. 30A and 30B, respectively, depict summary characteristics (e.g., values of dataset attributes) and graphical representations for subsets of data. For example, interactive overlay window 3000 includes an annotative description 3003 for a subset of data (e.g., column 3, denoted "col 03"), a datatype 3004, and graphical representations 3006 (e.g., as text) of the different categories and number of occurrences. Additionally, a horizontal bar chart 3008 may also be generated as part of graphical representations 3000. In some examples, logic may determine a distinct number of categories (e.g., four) and may generate graphical representations 3006 based on a threshold number of categories 3001 (e.g., less than five category types). In particular, with less than five categories, the format of graphical representations 3006 may be implemented.

By contrast, interactive overlay window 3015 includes an annotative description 3021 for a subset of data (e.g., column 7, denoted "col 07"), a datatype 3019, and graphical representation 3020 (e.g., as text) of the different categories and graphical representation 3022 for more the "five categories." In some examples, logic may determine a distinct number of categories (e.g., 36) and may generate graphical representation 3020, as a textual description of top two categories, and 3022, as a histogram, based on a threshold number 3018 of categories (e.g., greater than five category types).

Figures 30A, 30B, 30C:
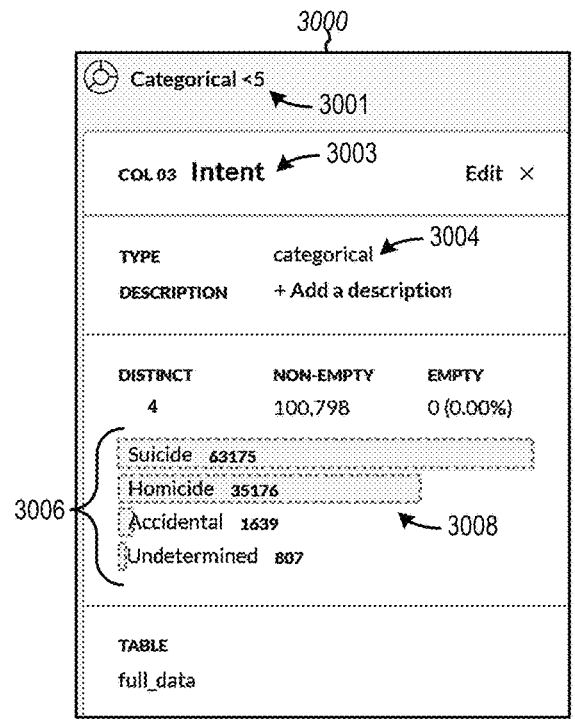

In FIG. 30C, interactive overlay window 3000 includes an annotative description ("Police") 3033 for a subset of data (e.g., column 4, denoted "col 04"), a datatype ("Boolean") 3034, and graphical representations 3036 (e.g., as text of one of two states or characteristics, such as "true" or "false") of the two different categories and percentages of occurrences. Additionally, a horizontal bar chart 3038 may also be generated as part of graphical representation 3036. In some examples, graphical representations 3036 for Boolean datatypes may include a third category, such as "null" to provide information on, for example, one occurrence of defective or absent data.

FIG. 30D depicts an example of an interactive overlay window 3045 including an annotative description ("Month") 3048 for a subset of data (e.g., column 2, denoted "col 02"), a datatype ("date") 3049, and a graphical representation 3051 as a bar chart depicting occurrences per month.

FIG. 30E depicts an example of an interactive overlay window 3060 including an annotative description ("Location") 3063 for a subset of data (e.g., column 10, denoted "col 10"), a datatype ("zip code") 3062, and a graphical representation 3066. In this example, graphical representation 3066 may include a map of, for example, a geographic location or region spanning multiple zip codes, whereby the map may include graphical representations 3068 of occurrences (e.g., as a function of pixel color values, or varied shades of "gray" using greyscale values) at certain locations (e.g., within a zip code). Thus, "heat maps" 3068 may be implemented to present variable densities of occurrences of "suicides" and "homicides" relative to a location (e.g., a zip code). Other graphical representations including maps are also within the scope of the present disclosure.

FIG. 30F depicts an example of an interactive overlay window 3075 including an annotative description ("Place") 3077 for a subset of data (e.g., column 8, denoted "col 08"), a datatype ("string") 3077, and descriptive text implemented as a graphical representation 3081.

Figure 31:
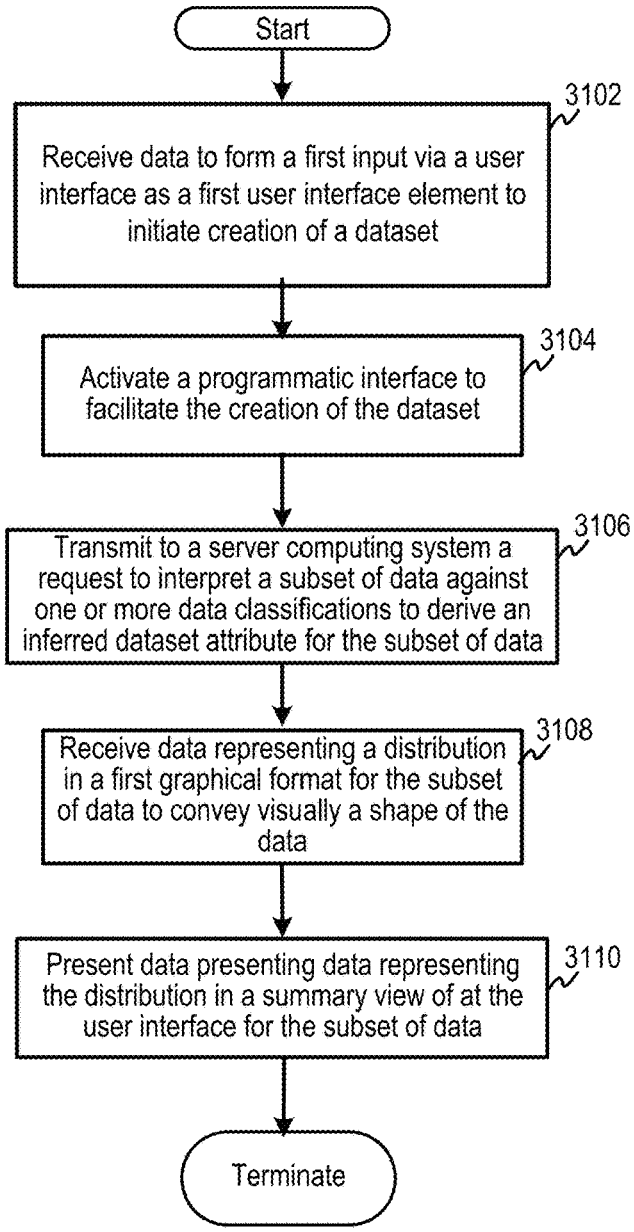
FIG. 31 is a diagram depicting a flow diagram to form various interactive overlay windows, according to some embodiments.

FIG. 31 is a diagram depicting a flow diagram to form various interactive overlay windows, according to some embodiments. At 3102, data to form a first input via a user interface may be received as a first user interface element. Activation of the user interface element, such as a user input, may be configured to ingest as set of data to initiate creation of an atomized dataset. A programmatic interface may be activated at 3104 to facilitate creation of a dataset, which may include the derivation of a dataset attribute that may be used in dataset creation. At 3106, a request to generate the dataset having a first format may be transmitted to a server computing system implementing a collaborative dataset consolidation system. The computing system may operate to interpret a subset of data (e.g., a column) of the set of data (e.g., a number of columns) against one or more data classifications at an inference engine to derive an inferred dataset attribute for the subset of data.

In some examples, interpreting a subset of data may include identifying a data type for an inferred dataset attribute, determining shape attributes to form the a graphical representation of a distribution, and selecting a first graphical format based on, for example, a datatype. An example of the first graphical format may be a histogram. Interpreting the subset of data, at least in some cases, may include identifying a data type for an inferred dataset attribute as a numeric data type, forming a histogram user interface element as a distribution (e.g., a graphical representation) for presentation as summary view (e.g., within an interactive overlay window) in a first graphical format based on the numeric data type. Further, interpreting the subset of data may include causing presentation of a histogram user interface element in a user interface.

Interpreting the subset of data may include identifying a data type (for the inferred dataset attribute) as a categorical datatype, according to some examples. The categorical datatype may be associated with a value for data points (e.g., a value representing a number of categories) within a threshold amount (e.g., a threshold number of categories) under which a graphical representation (e.g., histogram) may be implemented. In some examples, interpreting the subset of data may also include forming one or more textual user interface elements as a distribution for presentation in a summary view in a text-based descriptive format based on the categorical datatype and number of categories. Therefore, textual user interface elements may be presented in the user interface, whereby the textual user interface elements may specify one or more categories having greatest values.

By contrast, identifying the datatype as a categorical datatype may further include determining the value of the data points exceeds a threshold amount (e.g., more than 5 distinct categories may trigger a change in format of a graphical representation). That is, when a number of distinct values for the data points exceed a threshold amount, another graphical representation may be implemented. Further, a histogram user interface element may be formed as a distribution for presentation as a summary view based on the categorical data type. The histogram user interface element may be presented in the user interface, whereby the histogram user interface element specifies a distribution of a number of categories.

At 3108, data representing a distribution in a first graphical format may be received for a subset of data. The first graphical format may convey visually a shape of the data. In some cases, a second input may be implemented to recalculate a second graphical format with which to present the shape of the data for the distribution. Subsequent to activation, the distribution may be presented using the second graphical format. At 3110, data representing a distribution in a summary view may be presented at a user interface for the subset of data. The distribution may be a summary representation that represents a shape of values for one or more dataset attributes associated with an inferred dataset attribute.

Figure 32:
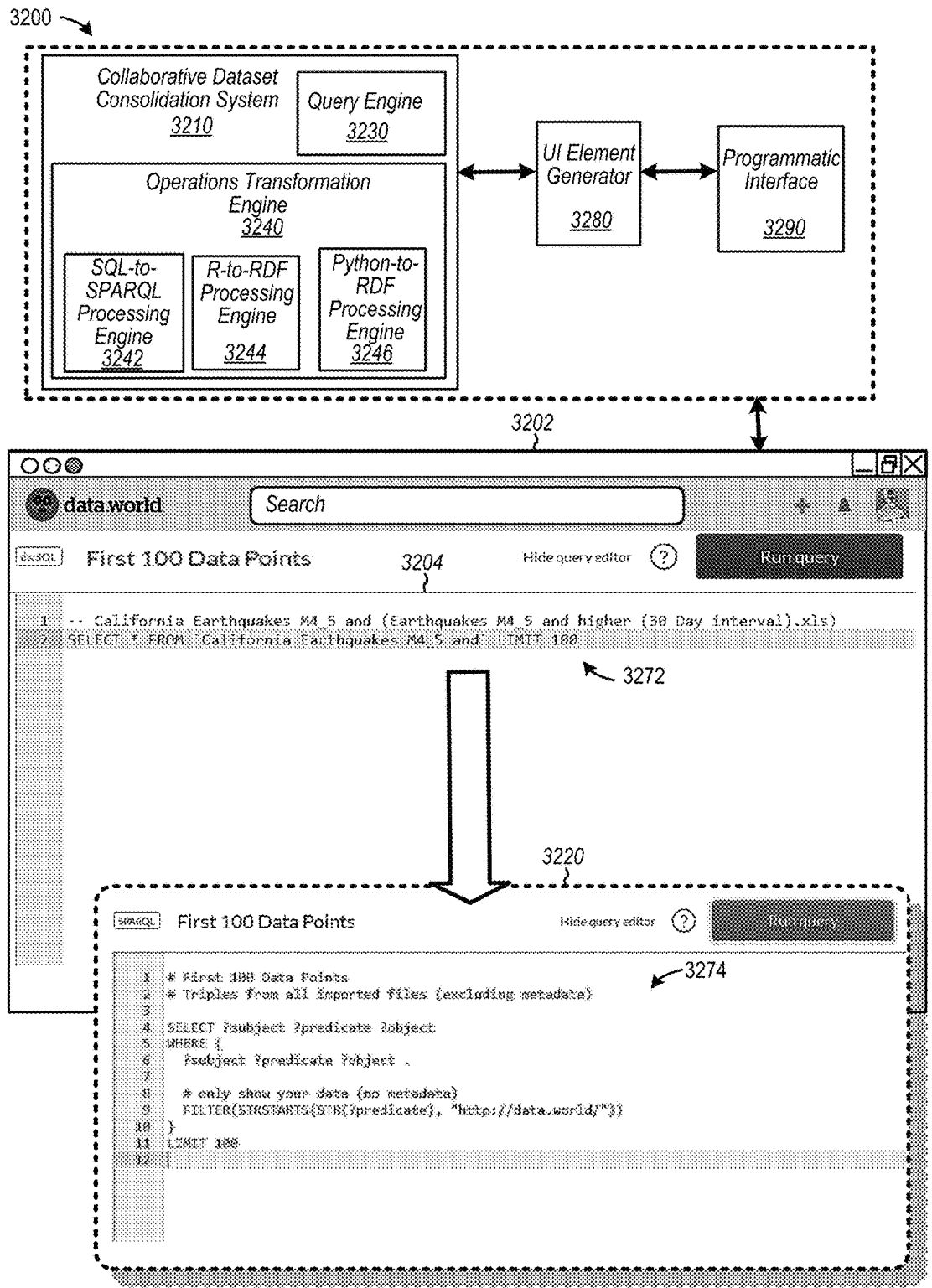
FIG. 32 is a diagram depicting an example of a dataset access interface, according to some examples.

FIG. 32 is a diagram depicting an example of a dataset access interface, according to some examples. Diagram 3200 depicts a user interface 3202 coupled communicatively to logic embodied in one or more portions of a collaborative dataset consolidation system 3210, which is shown to include a query engine 3230 and an operations transformation engine 3240, a user interface element generator 3280 and a programmatic interface 3290. According to some examples, elements depicted in diagram 3200 of FIG. 32 may include structures and/or functions as similarly-named or similarly-numbered elements depicted in other drawings.

In this example, user interface 3202 may be implemented as a computerized tool that may be configured to access or otherwise query a collaborative database through a data entry interface 3204. According to some examples, data entry interface 124 may be configured to accept commands (e.g., queries) in high-level language (e.g., high-level programming languages, including object-oriented languages), such as in Python™ and structured query language ("SQL"), as well as dwSQL (i.e., as dialect of SQL developed by data.world™), among others. Further, commands in a high-level language may be converted into a graph-level access or query language, such as SPARQL, other RDF query languages, or the like. Thus, a query may be initiated via data entry interface 3204 to query data associated with an atomized dataset, including linked collaborative atomized datasets. In some examples, data entry interface 3204 may be configured to accept programming languages for facilitating other data operations, such as statistical and data analysis. Examples of programming languages to perform statistical and data analysis include "R," among others.

Further to diagram 3200, operations transformation engine 3240 may include a "SQL-to-SPARQL" processing engine 3242, which may be configured to transform SQL-based commands into SPARQL or other RDF query languages. Operations transformation engine 3240 may include an "R-to-RDF" processing engine 3244, which may be configured to transform statistics-based commands (e.g., R) into RDF or other graph-level languages. Further, operations transformation engine 3240 may include a "Python-to-RDF" processing engine 3246, which may be configured to transform Python-based commands into RDF or RDF query languages. Note that other transformations between high-level programming languages and graph-level languages are possible.

In view of the foregoing, a user need not rely on graph-level languages, such as SPARQL, but may implement high-level programming languages that may be more familiar with users and data practitioners. In some examples, an overlay window 3220 (or any other user interface element) may be presented concurrently (or substantially concurrently) with the presentation of data entry interface 3204. Thus, as a query 3272 may be entered in a high-level programming language, a low-level version (e.g., in SPARQL) may be presented in interface 3274 in a mirrored fashion. This is, interface 3274 may be referred to as a "mirrored data entry interface" in user interface 3302. Mirrored data entry interface 3274 may be configured to detect entry of an operation instruction in data entry interface 3272 and replicate a transformed operation instruction in mirrored data entry 3274 as a graph-related data instruction (e.g., in real-time). Thus, users that are less familiar with low-level languages may begin to learn or adapt queries from entry and the high-level programming language to, for example, SPARQL or the like. By contrast, users that may be familiar with both high- and low-level programs may wish to validate an appropriately crafted query by reviewing interface 3274 while the query is entered via data entry interface 3204.

Figure 33:
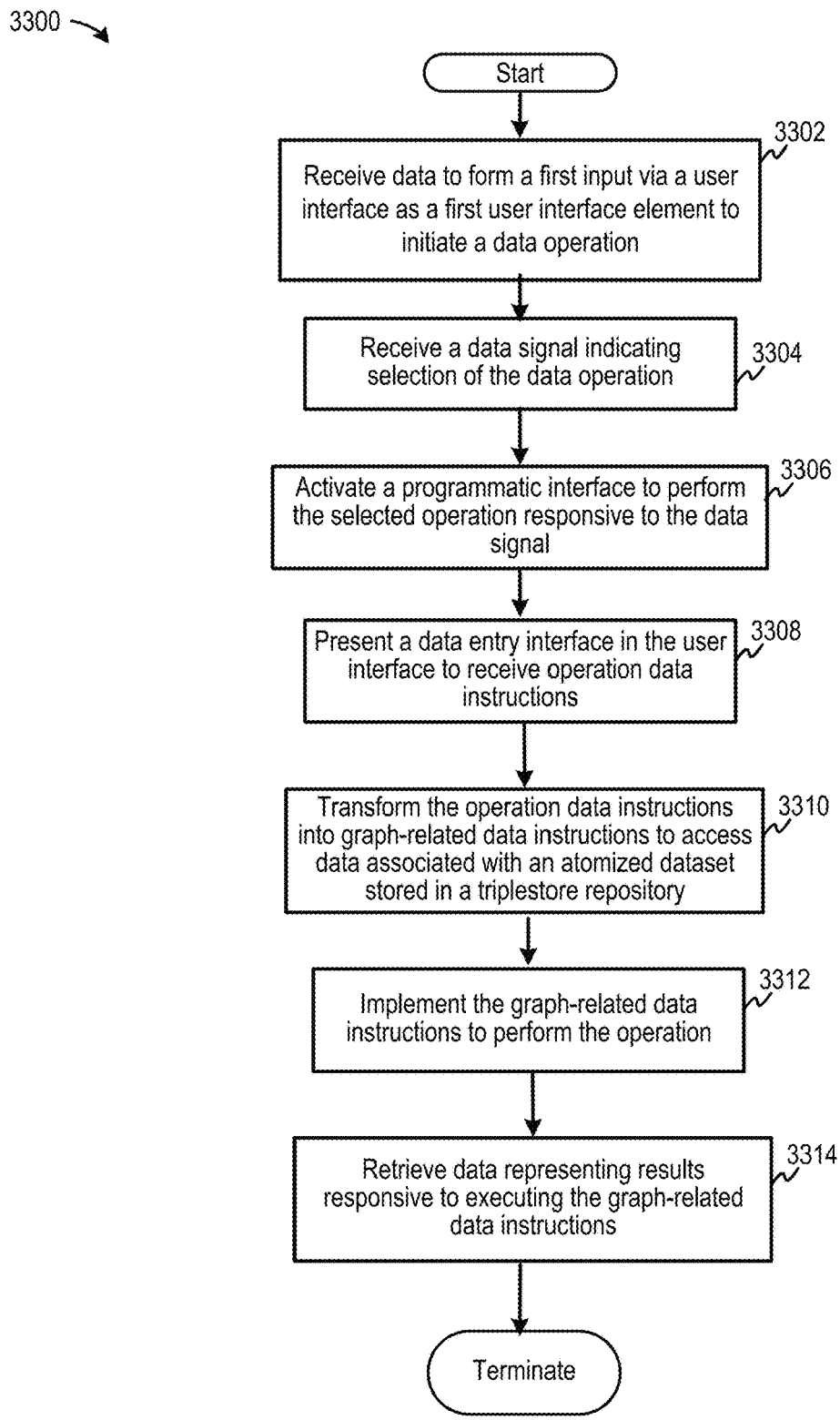
FIG. 33 is a diagram depicting a flow diagram to implement a dataset access interface, according to some embodiments.

FIG. 33 is a diagram depicting a flow diagram to implement a dataset access interface, according to some embodiments. At 3302, data may be received to form a first input via a user interface as a first user interface element. The first user interface element may be configured to initiate a data operation on an atomized dataset based on a set of data. Examples of a data operation include dataset accesses, dataset queries, statistical operations on a dataset, etc. At 3304, a data signal indicating selection of the data operation may be received (e.g., initiate "run query"). A programmatic interface may be activated at 3306 to perform a selected data operation responsive to the data signal. At 3308, a data entry interface may be presented in the user interface to receive operation data instructions. The operation data instructions may transform the data instructions into graph-related data instructions, at 3310, to access data associated with an atomized dataset stored in, for example, a triplestore repository. At 3312, graph-related data instructions may be implemented to perform the operation (e.g., at a low-level). At 3314, data representing results (e.g., query results) may be received responsive to executing the graph-related data instructions.

Figure 34:
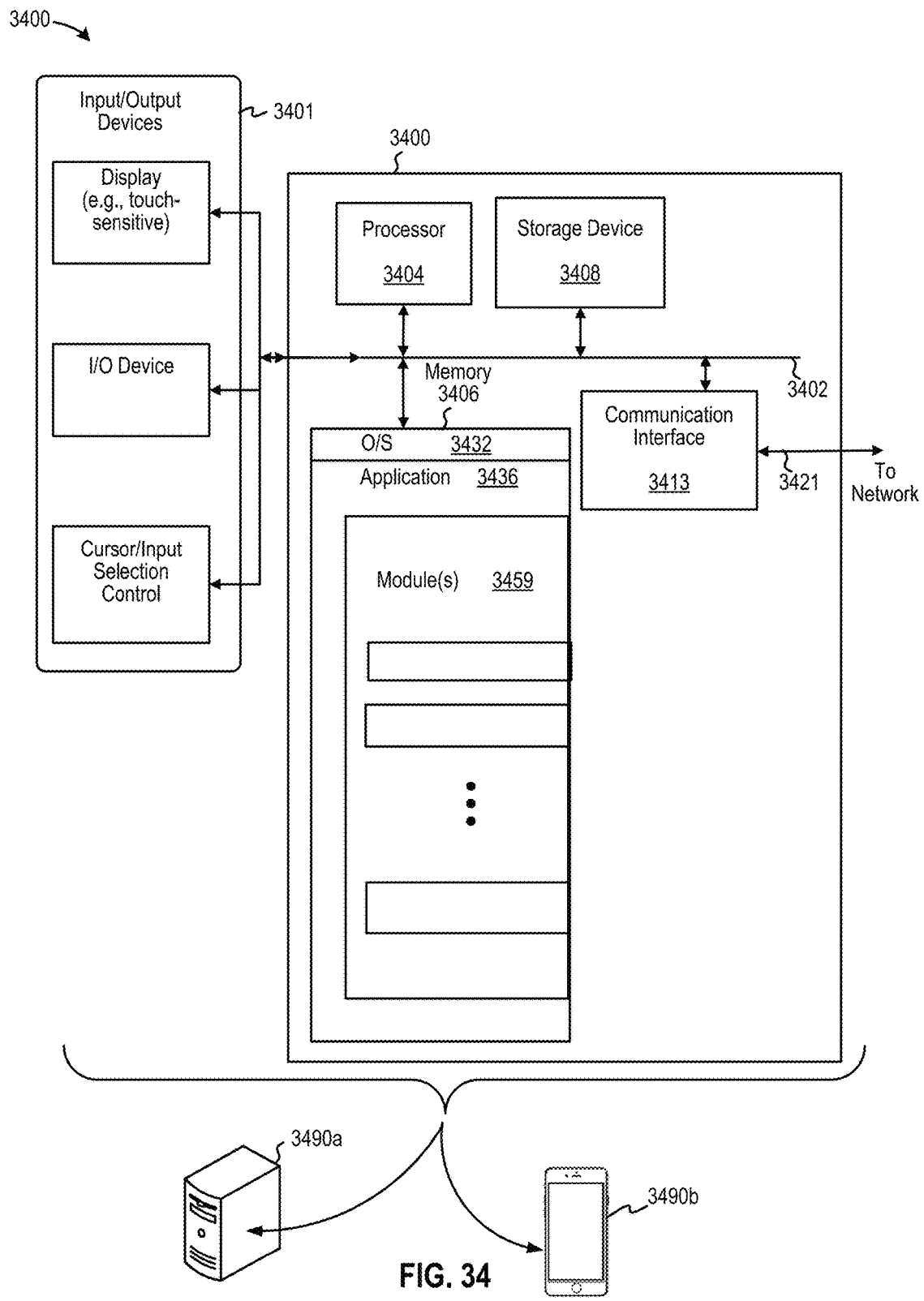
FIG. 34 illustrates examples of various computing platforms configured to provide various functionalities to components of a collaborative dataset consolidation system, according to various embodiments.

FIG. 34 illustrates examples of various computing platforms configured to provide various functionalities to components of a collaborative dataset consolidation system, according to various embodiments. In some examples, computing platform 3400 may be used to implement computer programs, applications, methods, processes, algorithms, or other software, as well as any hardware implementation thereof, to perform the above-described techniques.

In some cases, computing platform 3400 or any portion (e.g., any structural or functional portion) can be disposed in any device, such as a computing device 3490a, mobile computing device 3490b, and/or a processing circuit in association with initiating the formation of collaborative datasets, as well as analyzing and presenting summary characteristics for the datasets, via user interfaces and user interface elements, according to various examples described herein.

Computing platform 3400 includes a bus 3402 or other communication mechanism for communicating information, which interconnects subsystems and devices, such as processor 3404, system memory 3406 (e.g., RAM, etc.), storage device 3408 (e.g., ROM, etc.), an in-memory cache (which may be implemented in RAM 3406 or other portions of computing platform 3400), a communication interface 3413 (e.g., an Ethernet or wireless controller, a Bluetooth controller, NFC logic, etc.) to facilitate communications via a port on communication link 3421 to communicate, for example, with a computing device, including mobile computing and/or communication devices with processors, including database devices (e.g., storage devices configured to store atomized datasets, including, but not limited to triplestores, etc.). Processor 3404 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 3400 exchanges data representing inputs and outputs via input-and-output devices 3401, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 3401 may be implemented as, or otherwise substituted with, a user interface in a computing device associated with a user account identifier in accordance with the various examples described herein.

According to some examples, computing platform 3400 performs specific operations by processor 3404 executing one or more sequences of one or more instructions stored in system memory 3406, and computing platform 3400 can be implemented in a client-server arrangement, peer-to-peer arrangement, or as any mobile computing device, including smart phones and the like. Such instructions or data may be read into system memory 3406 from another computer readable medium, such as storage device 3408. In some examples, hard-wired circuitry may be used in place of or in combination with software instructions for implementation. Instructions may be embedded in software or firmware. The term "computer readable medium" refers to any tangible medium that participates in providing instructions to processor 3404 for execution. Such a medium may take many forms, including but not limited to, non-volatile media and volatile media. Non-volatile media includes, for example, optical or magnetic disks and the like. Volatile media includes dynamic memory, such as system memory 3406.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 3402 for transmitting a computer data signal.

In some examples, execution of the sequences of instructions may be performed by computing platform 3400. According to some examples, computing platform 3400 can be coupled by communication link 3421 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 3400 may transmit and receive messages, data, and instructions, including program code (e.g., application code) through communication link 3421 and communication interface 3413. Received program code may be executed by processor 3404 as it is received, and/or stored in memory 3406 or other non-volatile storage for later execution.

In the example shown, system memory 3406 can include various modules that include executable instructions to implement functionalities described herein. System memory 3406 may include an operating system ("O/S") 3432, as well as an application 3436 and/or logic module(s) 3459. In the example shown in FIG. 34, system memory 3406 may include any number of modules 3459, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 3459 of FIG. 34, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 3459 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 3459 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 3459 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
   receiving data to form a first input via a user interface at a computing device as a first user interface element to initiate creation of a dataset based on a set of data;
   activating a programmatic interface to facilitate the creation of the dataset responsive to receiving the first input;
   causing transformation of the set of data from a first format to an atomized format to form an atomized dataset;
   monitoring the creation of the dataset;

presenting data representing a status on the user interface of at least a portion of the creation of the dataset, the status depicting that the atomized dataset is linked to at least one other dataset to form a linked dataset, wherein one or more portions of a created dataset are disposed in different data repositories;

calculating automatically dataset attributes of the linked dataset in which a link is established with the atomized dataset;

generating a plurality of sub-queries each of which is configured to access at least one of different data repositories; and retrieving data representing query results from the at least one of the different data repositories.

2. The method of claim 1 further comprising:

receiving data to form a second input via the user interface as a second user interface element to upload the set of data; and transmitting an upload instruction to a server computing system implementing a collaborative dataset consolidation system to import the set of data.

3. The method of claim 2 further comprising:

receiving data to form via the user interface a third user interface element specifying a first phase of an uploading status during which data representing insights of the set of data is formed, the insights specifying at least one dataset attribute;

receiving data to form via the user interface a fourth user interface element specifying a second phase of the uploading status during which data representing linking of the atomized dataset to other datasets including at least one other atomized dataset; and presenting the third user interface element and the fourth user interface element at the user interface.

4. The method of claim 1 further comprising:

receiving data to form a first subset of user interface elements associated with a plurality of dataset interactions, the plurality of dataset interactions are each characterized at a computing system implementing a collaborative dataset consolidation system to form characterized dataset interactions; and presenting user input interface elements in association with the characterized dataset interactions for each user interface element in the first subset of user interface elements, at least one of the user input interface elements being configured to initiate access to data describing a dataset interaction.

5. The method of claim 4 wherein receiving the data to form the first subset of user interface elements comprises:

receiving a plurality of notifications constituting a dataset activity feed in a portion of the user interface.

6. The method of claim 4 wherein the characterized dataset interactions comprise:

one or more of a new dataset is created, a dataset is queried, a dataset is linked to another dataset, a comment relating to a dataset is associated thereto, and a dataset is relevant to another dataset.

7. The method of claim 4 wherein data representing the characterized dataset interactions comprise:

one or more of dataset update data and collaborator update data generated at a dataset attribute manager.

8. The method of claim 1 further comprising:

receiving a data signal via the user interface requesting access to dataset attribute manager data;

transmitting data representing the request to access a portion of the dataset attribute manager data;

presenting data representing the portion of the dataset attribute manager data at the user interface.

9. The method of claim 8 wherein presenting data representing the portion of the dataset attribute manager data at the user interface comprises:

presenting relevant dataset data that specifies a subset of datasets having dataset attributes calculated to be relevant to the atomized dataset.

10. The method of claim 8 wherein presenting data representing the portion of the dataset attribute manager data at the user interface comprises:

presenting relevant collaborator data that specifies a subset of user accounts having user account attributes calculated to be relevant to a user account associated with the atomized dataset.

11. The method of claim 8 wherein presenting data representing the portion of the dataset attribute manager data at the user interface comprises:

presenting trending dataset data that specifies a subset of datasets having dataset attributes calculated to include greater dataset attribute values relative to a superset of datasets.

12. The method of claim 8 wherein presenting data representing the portion of the dataset attribute manager data at the user interface comprises:

presenting trending collaborator data that specifies a subset of user accounts having user account attributes calculated to include greater user account attributes values relative to a superset of user accounts.

13. The method of claim 1 further comprising:

receiving data to form a fifth input via the user interface as a fifth user interface element to link the atomized dataset to the at least one other dataset;

presenting via the user interface a sixth user interface element including specifying the at least one other dataset is protected, the at least one other dataset being a protected dataset;

receiving data via the sixth user interface element to facilitate authorized access to the protected dataset.

14. The method of claim 13 further comprising:

transmitting authorization data to a computing system implementing a collaborative dataset consolidation system to link the atomized dataset to the at least one other dataset; and receiving via the user interface to access a collaborative data in collaborative dataset that includes the atomized dataset and the at least one other dataset.

15. The method of claim 1 wherein activating the programmatic interface comprises:

activating an application programming interface ("API").

16. The method of claim 15 wherein activating the application programming interface ("API") comprises:

activating the application programming interface ("API") via a processor at a client computing device that includes the user interface.

17. The method of claim 15 wherein activating the application programming interface ("API") comprises:

activating the application programming interface ("API") via a processor at a server computing device associated with a data repository configured as a triplestore to storing the atomized dataset.

18. The method of claim 1 wherein the atomized dataset and the other dataset include subsets of linked data points.

19. The method of claim 18 wherein linked data points comprise triples.

20. The method of claim 19 wherein at least one triple of the triples are formatted to comply with a Resource Description Framework ("RDF") data model.

\* \* \* \* \*